United States Patent
Baghdadi et al.

(10) Patent No.: US 11,987,684 B2
(45) Date of Patent: *May 21, 2024

(54) FOAM COMPOSITIONS AND USES THEREOF

(71) Applicant: NIKE, Inc., Beaverton, OR (US)

(72) Inventors: Hossein A. Baghdadi, Portland, OR (US); Jay Constantinou, Beaverton, OR (US); Joseph Thomas Muth, North Plains, OR (US); Brian G. Prevo, Portland, OR (US); Bradley C. Tutmark, Aloha, OR (US)

(73) Assignee: NIKE, INC., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,039

(22) Filed: Aug. 8, 2022

(65) Prior Publication Data

US 2023/0002577 A1 Jan. 5, 2023

Related U.S. Application Data

(63) Continuation of application No. 17/018,843, filed on Sep. 11, 2020, now Pat. No. 11,447,615.
(Continued)

(51) Int. Cl.
*C08J 9/12* (2006.01)

(52) U.S. Cl.
CPC .......... *C08J 9/122* (2013.01); *C08J 2203/06* (2013.01); *C08J 2369/00* (2013.01); *C08J 2469/00* (2013.01)

(58) Field of Classification Search
CPC .... C08J 9/122; C08J 2203/06; C08J 2369/00; C08J 2469/00
See application file for complete search history.

(56) References Cited

U.S. PATENT DOCUMENTS

| 4,667,423 A | 5/1987 | Autry et al. |
| 4,876,805 A | 10/1989 | Peoples |

(Continued)

FOREIGN PATENT DOCUMENTS

| CN | 103717657 A | 4/2014 |
| CN | 106459353 A | 2/2017 |

(Continued)

OTHER PUBLICATIONS

Written Opinion of the International Preliminary Examining Authority for PCT/US2019/021926 dated Dec. 16, 2019.
(Continued)

*Primary Examiner* — K. Boyle
*Assistant Examiner* — K. B Boyle
(74) *Attorney, Agent, or Firm* — THOMAS | HORSTEMEYER, LLP

(57) ABSTRACT

Components for articles of footwear and athletic equipment including a foam are provided. The foam portion of the components and articles include a composition which includes a thermoplastic copolyester, the composition having a foam structure. A polymer layer is provided on at least on surface of the foam portion. The polymer layer can control or reduce the water uptake of the foam portion. Methods of making the compositions, foams, and components are provided, as well as methods of making an article of footwear including one of the foam components. In some aspects, the foams and foam components can be made by injection molding, or injection molding followed by compression molding.

20 Claims, 20 Drawing Sheets

Related U.S. Application Data

(60) Provisional application No. 62/899,688, filed on Sep. 12, 2019, provisional application No. 62/899,742, filed on Sep. 12, 2019, provisional application No. 62/899,696, filed on Sep. 12, 2019.

(56) References Cited

U.S. PATENT DOCUMENTS

| | | | |
|---|---|---|---|
| 4,984,376 | A | 1/1991 | Walter et al. |
| 4,988,740 | A | 1/1991 | Walter et al. |
| 5,202,069 | A | 4/1993 | Pontiff |
| 5,642,575 | A | 7/1997 | Norton et al. |
| 6,267,692 | B1 | 7/2001 | Higuchi et al. |
| 6,833,428 | B1 | 12/2004 | Kato |
| 10,314,364 | B2 | 6/2019 | Schiller et al. |
| 10,974,447 | B2 | 4/2021 | Constantinou et al. |
| 2003/0172548 | A1 | 9/2003 | Fuerst |
| 2005/0015907 | A1 | 1/2005 | Georgi et al. |
| 2005/0183287 | A1 | 8/2005 | Schindler |
| 2011/0206926 | A1 | 8/2011 | Marc |
| 2012/0167416 | A1 | 7/2012 | Christensen et al. |
| 2014/0162050 | A1 | 6/2014 | Kodama et al. |
| 2015/0038605 | A1* | 2/2015 | Baghdadi .................. C08J 9/06 521/137 |
| 2015/0038606 | A1 | 2/2015 | Baghdadi |
| 2017/0253710 | A1 | 9/2017 | Smith et al. |
| 2018/0133995 | A1 | 5/2018 | Wan |
| 2018/0273715 | A1 | 9/2018 | Luo et al. |
| 2018/0345575 | A1 | 12/2018 | Constantinou et al. |
| 2019/0343223 | A1 | 11/2019 | Mason |
| 2021/0076772 | A1 | 3/2021 | Baghdadi et al. |

FOREIGN PATENT DOCUMENTS

| | | | |
|---|---|---|---|
| CN | 107075163 | A | 8/2017 |
| CN | 107641293 | A | 1/2018 |
| DE | 102014003017 | A1 | 9/2015 |
| EP | 0402883 | A2 | 12/1990 |
| EP | 0608143 | A1 | 7/1994 |
| EP | 1225199 | A1 * | 7/2002 ............. C08G 18/12 |
| EP | 1225199 | A1 | 7/2002 |
| EP | 2508922 | A1 | 10/2012 |
| EP | 3244240 | A1 | 11/2017 |
| GB | 2114869 | A1 | 9/1983 |
| GB | 2164291 | A * | 3/1986 ......... B29C 44/0415 |
| GB | 2164291 | A1 | 3/1986 |
| JP | 2002-361768 | A | 12/2002 |
| JP | 2007-319356 | A2 | 12/2007 |
| JP | 2012159589 | A | 8/2012 |
| KR | 101472929 | B1 | 12/2014 |
| KR | 20160098772 | A | 8/2016 |
| TW | 200628089 | A | 8/2006 |
| WO | 03095657 | A2 | 11/2003 |
| WO | 2016030333 | A1 | 3/2016 |
| WO | 2017042707 | A2 | 3/2017 |
| WO | 2017171031 | A1 | 10/2017 |
| WO | 2018134166 | A1 | 7/2018 |
| WO | 2018222714 | A1 | 12/2018 |
| WO | 2019178150 | A1 | 9/2019 |
| WO | 2019178154 | A1 | 9/2019 |

OTHER PUBLICATIONS

International Preliminary Report on Patentability for PCT/US2020/050484, dated Dec. 6, 2021.
International Search Report and Written Opinion for PCT/US2019/021931 dated May 9, 2019.
International Search Report and the Written Opinion of the International Searching Authority for PCT/US2020/050360, dated Nov. 20, 2020.
International Preliminary Report on Patentability for PCT/US2019/021931 dated Mar. 2, 2020.
Written Opinion of the International Preliminary Examining Authority for PCT/US2019/021931 dated Dec. 16, 2019.
International Search Report and Written Opinion for PCT/US2019/021926 dated May 9, 2019.
International Preliminary Report on Patentability for PCT/US2019/021926 dated Mar. 2, 2020.
International Preliminary Report on Patentability for PCT/US2019/021926, dated Nov. 26, 2020.
International Preliminary Report on Patentability for PCT/US2020/050489, dated Dec. 6, 2021.
International Preliminary Report on Patentability for PCT/US2020/050361, dated Nov. 29, 2021.
Veenstra, "Formation and stability of co-continuous blends with a poly(ether-ester)block copolymer around its order-disorder temperature," Polymer, vol. 40 (1999) p. 1119-1130. (Year: 1999).
International Preliminary Report on Patentability for PCT/US2020/050360, dated Mar. 24, 2022.
Written Opinion of the International Preliminary Examining Authority for PCT/US2020/050489, dated Apr. 28, 2021.
International Search Report and Written Opinion for PCT/US2020/050361, dated Nov. 20, 2020.
International Search Report and the Written Opinion of the International Searching Authority for PCT/US2020/050484, dated Dec. 21, 2020.
Written Opinion of the International Preliminary Examining Authority for PCT/US2020/050484, dated Jun. 15, 2021.
International Search Report and Written Opinion for PCT/US2020/050489 dated Dec. 21, 2020.
Chambon, et al., "Is midsole thickness a key parameter for the running pattern?", Gait & Posture, vol. 40 (2014), pp. 58-63.
"Practical Technology of Plastic Injection Molding", Zhiming Jin, May 31, 2009, pp. 141-143, Printing Industry Press.
Deleglise et al., "Simulation of LCM processes involving induced or forced deformations," Composites: Part A 37 (2006), pp. 874-880.

* cited by examiner

| COF TEST DATA FOR WOOD COURT SAMPLE | Durometer | Density (g/cc) | DIN abrasion loss (mg) | Wood court surface dry | | Wood court surface wet | | Comment |
|---|---|---|---|---|---|---|---|---|
| | | | | DCOF | 3*SD | DCOF | 3*SD | |
| Estane 2350-75A | 75 A | 1.17 | 67 | 1.74 | 0.1 | 0.4 | 0.02 | nonmarking |
| Kurarity LA2250 | 70A | | 350 | 1.82 | | 0.44 | | marking |
| Kurarity LA4285 | 90 A | | 264 | 0.51 | | 0.32 | | nonmarking |
| Monoprene IN 15056 | 60 A | 0.89 | 117.5 | 1.67 | 0.43 | 0.64 | 0.17 | marking |
| Monoprene CP 281601 | 65 A | 0.89 | 89 | 1.93 | 0.1 | 0.35 | 0.21 | marking |
| Monoprene IN 15074 | 75 A | 0.777 | 88.000 | 1.98 | 0.18 | 0.27 | 0.14 | marking |
| Sarlink TPV 3160 | 65 A | 0.95 | 213.8 | 1.7 | 0.17 | 0.31 | 0.07 | marking |
| Sarlink TPV 6755B | 60 A | 0.915 | 326.7 | 1.3 | 0.21 | 0.63 | 0.12 | marking |
| Sarlink TPV 6755N | 60 A | 0.915 | 197.5 | 1.5 | 0.15 | 0.57 | 0.16 | marking |
| TPSiV 50A | 50 A | 1.07 | 156 | 1.01 | 0.03 | 0.44 | 0.07 | nonmarking |
| TPSiV 60A | 60 A | 1.08 | 118 | 0.93 | 0.18 | 0.48 | 0.08 | nonmarking |
| Tuftec P1500 | 70 A | | 198 | 2 | | 0.57 | | marking |
| Tuftec P5051 | 90 A | | 350 | low | | low | | nonmarking |
| Zeotherm 100-70B | 70 A / 20 D | 1.05 | 350 | 1.74 | 0.43 | 0.43 | 0.07 | marking |
| Zeotherm 100-80B | 80 A | 1.09 | 183.9 | 1.65 | 0.42 | 0.44 | 0.06 | marking |
| Zeotherm 110-70B | 70 A / 20 D | 1.05 | 246.7 | 1.78 | 0.24 | 0.4 | 0.04 | marking |
| Zeotherm 130-90B | 90 A | 1.07 | 149.8 | 1.45 | 0.23 | 0.41 | 0.07 | marking |

FIG. 11

| 2mm flat plaque geometry | | | | | Smooth Dry Concrete Dynamic COF | Smooth Dry Concrete 3 × Std Dev | Smooth Wet concrete Dynamic COF | Smooth Wet concrete 3 × Std Dev | Wet/Dry Smooth | Dry - Wet | (Dry-Wet)/Dry Smooth |
|---|---|---|---|---|---|---|---|---|---|---|---|
| Material Grade | Form | Durometer (Shore A) | Specific Gravity | DIN abrasion mass loss (mg) | | | | | | | |
| Apilon 52 | Solid | 85 A | 1.2 | 124 | 1.420 | 0.160 | 0.650 | 0.063 | 0.17 | 0.17 | 0.17 |
| BT 1030D | Solid | 30 D | 1.07 | 68 | 1.280 | 0.095 | 0.216 | 0.035 | 0.10 | 0.10 | 0.10 |
| Ellastolan b70a | Solid | 70 A | 1.2 | 94 | 1.100 | 0.016 | 0.464 | 0.016 | 0.02 | 0.02 | 0.02 |
| Ellastolan SP9800 | Solid | 70 A | 1.21 | 62 | 1.054 | 0.018 | 0.503 | 0.013 | 0.02 | 0.02 | 0.02 |
| Estane 2360-75a-030 | Solid | 75 A | 1.17 | 67 | 0.988 | 0.015 | 0.486 | 0.014 | 0.01 | 0.01 | 0.01 |
| Estane 58238 | Solid | 75 A | 1.17 | 65 | 1.039 | 0.012 | 0.483 | 0.044 | 0.01 | 0.01 | 0.01 |
| Estane t470a-3 | Solid | 77 A | 1.14 | 74 | 1.055 | 0.017 | 0.463 | 0.010 | 0.02 | 0.02 | 0.02 |
| HPF AD1035 | Solid | 35 D | 0.96 | 86.4 | 0.790 | 0.039 | 0.490 | | 0.04 | 0.04 | 0.04 |
| HPF AD1172 | Solid | | | | | | | | | | |
| Hytrel 3078 | Solid | 30 D | 1.07 | 71 | 0.930 | 0.053 | 0.215 | 0.030 | 0.06 | 0.06 | 0.06 |
| Hytrel 4556 | Solid | 45 D | 1.14 | 26 | 0.700 | 0.070 | 0.380 | 0.040 | 0.07 | 0.07 | 0.07 |
| KP3240 | Solid | 41 D | 1.13 | 34 | 0.660 | 0.030 | 0.340 | 0.060 | 0.03 | 0.03 | 0.03 |
| KP3347 | Solid | 47 D | 1.15 | 30 | 0.595 | 0.075 | 0.330 | 0.060 | 0.08 | 0.08 | 0.08 |
| Kuranty LA2280 | Solid | 70 A | | 380 | | | | | | | |
| Kuranty LA4286 | Solid | 90 A | | 264 | | | | | | | |
| Monprene 66070 | Solid | 76 A | 0.897 | 374 | 1.211 | 0.024 | 0.873 | 0.022 | 0.02 | 0.02 | 0.02 |
| Monprene CP28180-01 | Solid | 65 A | 0.89 | 89 | | | | | | | |
| Monprene IN15036 | Solid | 60 A | 0.89 | 117.5 | | | | | | | |
| Monprene IN15074 | Solid | 75 A | 0.888 | 66 | 1.235 | 0.030 | 0.470 | 0.020 | 0.03 | 0.03 | 0.03 |
| Monprene SP16074H | Solid | 75 A | 0.89 | | 1.635 | 0.020 | 0.549 | 0.060 | 0.02 | 0.02 | 0.02 |
| Monprene SP16975 | Solid | 75 A | 0.94 | 120 | 1.395 | 0.030 | 0.700 | 0.060 | 0.03 | 0.03 | 0.03 |

FIG. 12

2mm flat plaque geometry

| Material Grade | Form | Durometer (Shore A) | Specific Gravity | DIN abrasion mass loss (mg) | Smooth Dry Concrete Dynamic COF | Smooth Dry Concrete 3^ Std Dev | Smooth Wet concrete Dynamic COF | Smooth Wet concrete 3^ Std Dev | Wet/Dry Smooth | Dry - Wet | (Dry-Wet)/Dry Smooth |
|---|---|---|---|---|---|---|---|---|---|---|---|
| Santoprene 123-40 | Solid - Herringbone | 41 D | 0.96 | | 0.720 | 0.020 | 0.460 | 0.030 | 0.64 | 0.26 | 0.36 |
| Santoprene 201-64 | Solid - Herringbone | 60 A | 0.97 | 97 | | | | | | 0.00 | |
| Santoprene 103-50 | Solid - Herringbone | 51 D | 0.96 | | 0.580 | 0.020 | 0.440 | 0.010 | 0.76 | 0.14 | 0.24 |
| Sarlink 3160 | Solid | 65 A | 0.96 | 213.8 | | | | | | 0.00 | |
| Sarlink 6755B | Solid | 60 A | 0.915 | 326.7 | | | | | | 0.00 | |
| Sarlink 6755N | Solid | 60 A | 0.915 | 197.5 | | | | | | 0.00 | |
| Septon blends w/PP (16-011-4 | Solid | 60 A | 0.88 | 141 | | | | | | 0.00 | |
| Septon blends w/PP (16-051-1 | Solid | 60 A | 0.88 | 300 | | | | | | 0.00 | |
| Septon blends w/PP (16-078-2 | Solid | 60 A | 0.88 | 300 | | | | | | 0.00 | |
| Surlyn 8150 | Solid | 65 D | 0.97 | 46.5 | 0.410 | 0.042 | 0.410 | | 1.00 | 0.00 | 0.00 |
| Surlyn 8320 | Solid | 36 D | 0.95 | 76 | 0.660 | 0.061 | 0.630 | | 0.95 | 0.03 | 0.05 |
| Surlyn 9320 | Solid | 40 D | 0.96 | 67.2 | 0.870 | 0.009 | 0.680 | | 0.78 | 0.19 | 0.22 |
| Topgreen RH 1502-2 | Solid | 27 D | 1.1 | 118 | 0.700 | 0.330 | 0.300 | 0.040 | 0.43 | 0.40 | 0.57 |
| Topgreen RH1801-7 | Solid | 23 D | 1.09 | 199 | 0.800 | 0.205 | 0.300 | 0.030 | 0.38 | 0.50 | 0.63 |
| TPSIV-50A | Solid | 50 A | 1.07 | 156 | | | | | | 0.00 | |
| TPSIV-60A | Solid | 60 A | 1.08 | 118 | | | | | | 0.00 | |
| Triel 5202SP | Solid | 70 A / 20 D | 1.1 | | 0.823 | 0.019 | 0.397 | 0.071 | 0.48 | 0.43 | 0.52 |
| Triel 5300 | Solid | 30 D | 1.08 | 46 | 0.800 | 0.060 | 0.200 | 0.020 | 0.25 | 0.60 | 0.75 |
| Triel 5401A | Solid | 40 D | 1.12 | 50 | 0.750 | 0.105 | 0.350 | 0.035 | 0.47 | 0.40 | 0.53 |
| Triel SY 5280 | Solid | 28 D | 1.07 | | 1.050 | 0.255 | 0.300 | 0.025 | 0.29 | 0.75 | 0.71 |

FIG. 12, continued

| 2mm flat plaque geometry | | | | | | Smooth Dry Concrete Dynamic COF | Smooth Dry Concrete 3 × Std Dev | Smooth Wet concrete Dynamic COF | Smooth Wet concrete 3 × Std Dev | Wet/Dry Smooth | Dry - Wet | (Dry-Wet)/Dry Smooth |
|---|---|---|---|---|---|---|---|---|---|---|---|---|
| Material Grade | Form | Durometer (Shore A) | Specific Gravity | DIN abrasion mass loss (mg) | | | | | | | | |
| Tuftec P1500 | Solid | 70 A | | 198 | | | | | | | 0.00 | 0.00 |
| Tuftec P5051 | Solid | 90 A | | 350 | | | | | | | 0.00 | 0.00 |
| Zeotherm 100-70B | Solid | 70 A / 20 D | 1.05 | | | | | | | | 0.00 | 0.00 |
| Zeotherm 100-80B | Solid | 80 A | 1.09 | 183.9 | | | | | | | 0.00 | 0.00 |
| Zeotherm 110-70B | Solid | 70 A / 20 D | 1.05 | 246.7 | | | | | | | 0.00 | 0.00 |
| Zeotherm 130-90B | Solid | 90 A | 1.07 | 149.8 | | | | | | | 0.00 | 0.00 |

FIG. 12, continued

| 2mm flat plaque geometry | | | | | | Smooth Dry Concrete | | Smooth Wet concrete | | | | |
|---|---|---|---|---|---|---|---|---|---|---|---|---|
| Material Grade | Form | Supplier | Durometer (Shore A) | Specific Gravity | DIN abrasion mass loss (mg) | Dynamic COF | 3 * Std Dev | Dynamic COF | 3 * Std Dev | Wet/Dry Smooth Conc. | Dry - Wet | (Dry-Wet)/Dry Smooth Conc. |
| Desmopan 8795A | Foam | Covestro | | 0.715 | | 0.894 | 0.018 | 0.622 | 0.043 | 0.70 | 0.27 | 0.30 |
| Ellastolan SP9339 | Foam | BASF | | 0.7944 | | 1.434 | 0.148 | 0.629 | 0.062 | 0.44 | 0.80 | 0.56 |
| Hytrel 3078 | Foam | DuPont | | 0.71 | | 1.076 | 0.294 | 0.285 | 0.025 | 0.26 | 0.79 | 0.74 |
| Hytrel 3078 | Solid | DuPont | 30 D | 1.07 | 71 | 0.930 | 0.055 | 0.215 | 0.030 | 0.23 | 0.72 | 0.77 |
| Hytrel 4068 | Foam | DuPont | | 0.84 | | 0.913 | 0.182 | 0.275 | 0.021 | 0.30 | 0.64 | 0.70 |
| Monprene 12990 | Foam | Teknor Apex | | 0.798 | | 0.992 | 0.076 | 0.439 | 0.030 | 0.44 | 0.55 | 0.56 |
| Monprene IN15074 | Foam | Teknor Apex | 75 A | 0.777 | 88 | 1.291 | 0.024 | 0.509 | 0.015 | 0.39 | 0.78 | 0.61 |
| Monprene IN15074 | Solid | Teknor Apex | 75 A | 0.898 | 66 | 1.235 | 0.030 | 0.470 | 0.020 | 0.38 | 0.77 | 0.62 |
| Triel 5202SP | Foam | SamYang | | 0.80 | | 0.952 | 0.074 | 0.441 | 0.050 | 0.46 | 0.51 | 0.54 |
| Triel 5202SP | Solid | SamYang | 70 A / 20 D | 1.1 | | 0.823 | 0.019 | 0.397 | 0.071 | 0.48 | 0.43 | 0.52 |

FIG. 13

| Resin | Hardness (Shore) | S.G. | S.G. foamed flat | S.G. foamed waffle | SG reduction flat | SG reduction waffle |
|---|---|---|---|---|---|---|
| Desmopan 8795A | 95 A | 1.21 | 0.715 | 0.8503 | 41% | 30% |
| Ellastolan SP9339 | 70 A | 1.21 | 0.7944 | 0.804 | 34% | 34% |
| Hytrel 307C | 30 D | 1.07 | 0.7102 | 0.7677 | 34% | 28% |
| Hytrel 4068 | 40 D | 1.11 | 0.8409 | 0.8425 | 24% | 24% |
| Monprene 12990 | 92 A | 0.89 | 0.798 | 0.7873 | 10% | 12% |
| Monprene IN15074 | 75 A | 0.89 | 0.7767 | 0.7826 | 13% | 12% |
| Triel 5202SP | 70 A | 1.1 | 0.8024 | 0.8607 | 27% | 22% |

FIG. 14 ental applications, including
FOAM COMPOSITIONS AND USES THEREOF

CROSS-REFERENCE TO RELATED APPLICATIONS

This application is continuation application of co-pending U.S. nonprovisional application entitled "FOAM COMPOSITIONS AND USES THEREOF" having Ser. No. 17/018,843, filed on Sep. 11, 2020, which claims priority to, and the benefit of, U.S. provisional applications entitled "FOAM COMPOSITIONS AND USES THEREOF" having serial nos. 62/899,688, 62/899,696, and 62/899,742, each filed on Sep. 12, 2019, the contents of which are incorporated by reference in their entireties.

TECHNICAL FIELD

The present disclosure generally relates to foams formed of thermoplastic copolyesters, and in particular to foams formed of thermoplastic copolyesters which are suitable for the footwear and related industries and uses thereof.

BACKGROUND

The design of athletic equipment and apparel as well as footwear involves a variety of factors from the aesthetic aspects, to the comfort and feel, to the performance and durability. While design and fashion may be rapidly changing, the demand for increasing performance in the market is unchanging. To balance these demands, designers employ a variety of materials and designs for the various components that make up athletic equipment and apparel as well as footwear.

BRIEF DESCRIPTION OF THE DRAWINGS

Further aspects of the present disclosure will be readily appreciated upon review of the detailed description, described below, when taken in conjunction with the accompanying drawings.

(FIG. 9A); 190 degrees C. (FIG. 9B); 205 degrees C. (FIG. 9C); and 245 degrees C. (FIG. 9D).

FIG. 11 shows representative coefficient of friction on a wood surface data for various polymeric materials.

FIG. 12 shows representative coefficient of friction on a concrete surface data for various polymeric materials.

FIG. 13 shows representative coefficient of friction on a concrete surface data for various polymeric materials used in a blown outsole.

FIG. 14 shows representative specific gravity data for various polymeric materials in unfoamed samples and various foamed samples.

FIGS. 16A-16C show photographic images of foam cross-sections obtained from the regions identified respectively as A, B, and C in the image for a component injection molded with the four-gate configuration shown in FIG. 16G. and FIGS. 16D-16F show photographic images of foam cross-sections obtained from the regions identified respectively as D, E, and F in the image for a component injection molded with the four-gate configuration shown in FIG. 16H. FIG. 16I shows a representative defect free foam microstructure characteristic of either gating scenario.

DETAILED DESCRIPTION

Figure 1:
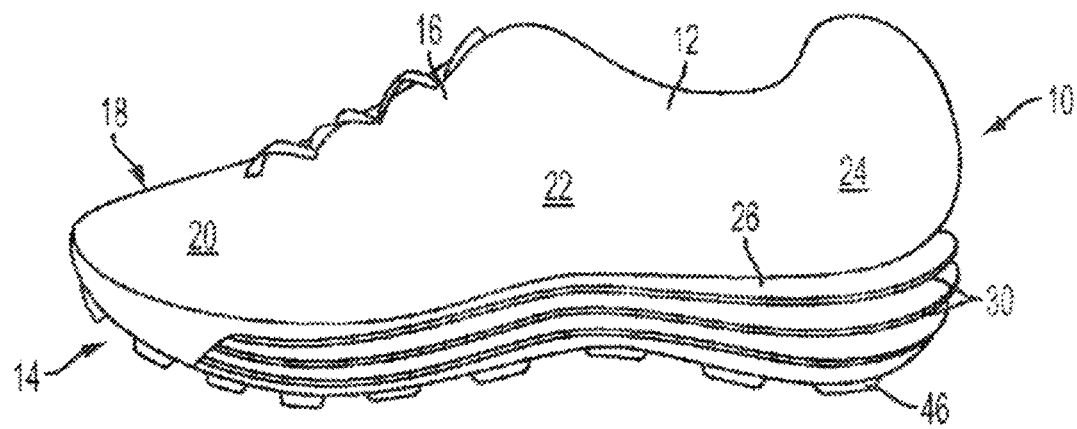
FIG. 1 is an elevation view of an article of footwear with a sole component according to an aspect of the invention.

The present disclosure is directed to a foam article which includes a first component, i.e., a foam component comprising a foamed thermoplastic copolyester composition, and a second component comprising a second polymeric composition. The disclosed foam article includes the second component disposed on at least a portion of the first component. The first component is a foam component that includes a foamed thermoplastic copolyester composition having a microcellular open-cell or closed-cell foam structure. The second component has a second polymeric composition that includes a second polymeric material which can one or more thermoplastic copolyesters, or a polymeric material that can be substantially free of thermoplastic copolyesters. The second polymeric composition can comprise a thermoplastic elastomer or thermoplastic vulcanizate material. of the first component of the foam article can be a midsole or a midsole component. The second component of the foam article can be a ground contacting component such as an outsole or a rand on an article of footwear, a reinforcing skin or a containment layer on a cushioning element, or other application.

Conventionally, vulcanized and peroxide-cured natural and synthetic rubbers such as isoprene and polybutadiene rubbers have been used to form durable, abrasion-resistant outer protective layers for a wide variety of articles, including outsoles for articles of footwear. Rubber formulations used for outsoles also typically provide traction. One disadvantage of using conventional rubber materials is that these materials are highly crosslinked during the curing process, rendering the cured rubber a thermoset material and making it difficult to recycle or reuse the cured rubber. Also, it can be difficult to bond other materials to the cured rubber. Both the rubber materials and foam materials typically used in a wide variety of consumer good are highly crosslinked materials, which are formed and cured separately and then adhered to each other using an adhesive system. These adhesive systems require several manually-intensive processing steps, such as cleaning the surfaces, priming the surfaces, applying adhesive to the surfaces, and pressing the surfaces together to bond them.

It has been found that thermoplastic copolyester compositions (i.e., polymeric compositions comprising one or more thermoplastic copolyester) can be used to form microcellular foams having advantageous properties for use in consumer article such as cushioning elements. When foamed as described herein, these foams retain thermoplastic properties, making it possible to readily recycle and reuse the foams. Additionally, it has been found that these foams can be directly molded and foamed onto other polymeric materials (i.e., onto second polymeric materials as described herein), which bonds the foam securely to the second polymeric material without the need for additional adhesives, or the manual process steps of applying an adhesive system. The second polymeric material which is bonded to the thermoplastic copolyester-based foam is a thermoplastic elastomeric material, such as a second thermoplastic copolyester composition or a thermoplastic vulcanizate material as described herein. Examples of both second thermoplastic copolyester compositions and thermoplastic vulcanizate materials which, when used either in solid form or in a lightly foamed form (e.g., having a specific gravity of 0.85 or greater) have been found which both bond well to the thermoplastic copolyester-based foam during a molding and foaming process, and which also provide high levels of abrasion resistance and traction under wet and dry conditions. When the second polymeric material is a second thermoplastic copolyester material, the fact that the foam comprises a first thermoplastic copolyester composition and that the protective layer comprises a second thermoplastic copolyester compositions provides the advantage that the entire article can easily be melted down and combined material can be recycled. In this scenario, the second copolyester composition can each individually include one or more of the same individual copolyesters present in the first thermoplastic copolyester composition, either in the same proportions or in different proportions. Alternatively, the first and second copolyester compositions can each individually comprise different copolyesters.

The foam components disclosed herein are formed by foaming polymeric compositions comprising one or more thermoplastic copolyester into a microcellular foam having an open-cell or closed-cell foam structure. Examples of thermoplastic copolyesters include polymers which have one or more carboxylic acid moiety present in the polymeric backbone, on one or more side chains, or both in the polymeric backbone and on one or more side chains. The one or more carboxylic acid moiety of the thermoplastic copolyester can include a free carboxylic acid, a salt of a carboxylic acid, or an anhydride of a carboxylic acid. In particular examples, the carboxylic acid moiety can be an acrylic acid moiety or a methacrylic acid moiety. The foam articles comprising a microcellular open-cell or closed-cell thermoplastic copolyester foam and a polymeric layer of the present disclosure are suitable for use in a variety of articles including for athletic equipment and apparel, particularly footwear (e.g., athletic footwear midsoles/outsoles). As discussed below, the microcellular open-cell or closed-cell thermoplastic copolyester foam exhibits a unique balance of properties such as high energy efficiency or energy return, high split tear, low specific gravity, and low compression set.

The presence of the layer on at least a portion of the exterior surface of the foam reduces liquid uptake by the microcellular foams, particularly microcellular open-cell foams, increasing their performance when used under conditions where the foam come into contact with liquids. Furthermore, the thermoplastic copolyester foam can also be reprocessed with minimal loss in physical properties (e.g., for recycling), providing a solution for materials sustainability.

The second polymeric material of the polymeric layer can be selected to allow the entire foam article to be recycled in a single step, without the need to remove or separate the polymeric layer from the foam. For example, the second polymeric material can comprise one or more thermoplastic copolyesters.

The foam article or foam component comprising the thermoplastic copolyester foam can be formed by injection molding and foaming the thermoplastic copolyester polymeric material as described herein, or by injection molding and foaming the thermoplastic copolyester polymeric material as described herein into a foam pre-form and subsequently compression molding the foam-preform into a finished foam. The second polymeric material can be disposed onto an exterior surface of the foam component during an injection molding and foaming process, in which the first thermoplastic material is injected into a mold which includes the second polymeric material, and the second polymeric material bonds to the foam during the molding process. Alternatively or additionally, the second polymeric material can be disposed onto the exterior surface of the foam component during a compression molding step, in which the foam component is compression molded in a mold which includes the second polymeric material, and the second polymeric material bonds to the foam during the molding process. Alternatively or additionally, the second polymeric material can be disposed onto the foam component after the foam component has been formed, such as, for example.

Articles Manufactured Using the Disclosed Foams.

Footwear 10 is an exemplary article of athletic footwear that includes the thermoplastic copolyester foam of the present disclosure. While illustrated as a running shoe, footwear 10 may alternatively be configured for any suitable athletic performance, such as baseball shoes, basketball shoes, soccer/global football shoes, American football shoes, running shoes, cross-trainer shoes, cheerleading shoes, golf shoes, and the like. While an athletic shoe is exemplified in FIG. 1, it will be readily understood that some of the terminology employed will also apply to other articles of footwear or to other styles of shoe. Footwear 10 includes an upper 12 and a sole component 14 secured to upper 12. Sole component 14 can be secured to upper 12 by adhesive or any other suitable means. As used herein, the sole component 14 can be a monolithic component formed entirely of the thermoplastic copolyester foam material as described herein, or a multi-component assembly formed of a plurality of monolithic components, where at least one of the monolithic components is formed entirely of the thermoplastic copolyester foam material as described herein.

Footwear 10 has a medial, or inner, side 16 and a lateral, or outer, side 18. For ease of discussion, footwear 10 can be divided into three portions: a forefoot portion 20, a midfoot portion 22, and a heel portion 24. Portions 20, 22, and 24 are not intended to demarcate precise areas of footwear 10. Rather, portions 20, 22, and 24 are intended to represent respective areas of footwear 10 that provide a frame of reference during the following discussion. Unless indicated otherwise, directional terms used herein, such as rearwardly, forwardly, top, bottom, inwardly, downwardly, upwardly, etc., refer to directions relative to footwear 10 itself. Footwear 10 is shown in FIG. 1 in a substantially horizontal orientation, as it would be positioned on a horizontal surface when worn by a wearer. However, it is to be appreciated that footwear 10 need not be limited to such an orientation. Thus, in FIG. 1, rearwardly is toward heel portion 24 (to the right as seen in FIG. 1), forwardly is toward forefoot portion 20 (to the left as seen in FIG. 1), and downwardly is toward the bottom of the page as seen in FIG. 1. Top refers to elements toward the top of the view in FIG. 1, while bottom refers to elements toward the bottom of the view in FIG. 1. Inwardly is toward the center of footwear 10, and outwardly is toward the outer peripheral edge of footwear 10.

The component can be a sole component, such as a sole component 14 depicted in FIGS. 1-5, that includes a thermoplastic copolyester foam described herein. The component can be an insert such as insert 36 or insert 60 depicted in FIGS. 4-5 that includes a thermoplastic copolyester foam described herein. The sole components and inserts for sole components can be made partially or entirely of a thermoplastic copolyester foam described herein. Any portion of a sole component or an insert for a sole component can be made of a thermoplastic copolyester foam described herein. For example, first portion 26 of the sole component (optionally including the ground engaging lower surface 44, such as the plurality of projections 46 and/or the groove 48 surrounding the projections), the entire insert 36, portions 62 or 64 of insert 60, a separate outsole component, or any combination thereof, can include a thermoplastic copolyester foam as described herein. The sole components and inserts can be made by foaming thermoplastic copolyester compositions as described herein, for example by injection molding or by injection molding followed by compression molding as described herein. In some aspects, the thermoplastic copolyester foams can be formed by physical foaming of the compositions. The thermoplastic copolyester foams and components can demonstrate improved physical properties including one or more of an enhanced energy efficiency or energy return, and enhanced split tear, a decreased specific gravity, or a combination thereof.

Sole component 14, which is generally disposed between the foot of the wearer and the ground, provides attenuation of ground reaction forces (i.e., imparting cushioning), traction, and may control foot motions, such as pronation. As with conventional articles of footwear, sole component 14 can include an insole (not shown) located within upper 12. In some aspects, the sole component is an insole or sockliner or is a multi-component assembly including an insole or sockliner, can further include an insole or sockliner located within the upper, where the insole or sockliner is formed entirely or partially of a thermoplastic copolyester foam described herein. Articles of footwear described herein can include an insole or sockliner formed entirely or partially of a thermoplastic copolyester foam described herein.

Figure 2:
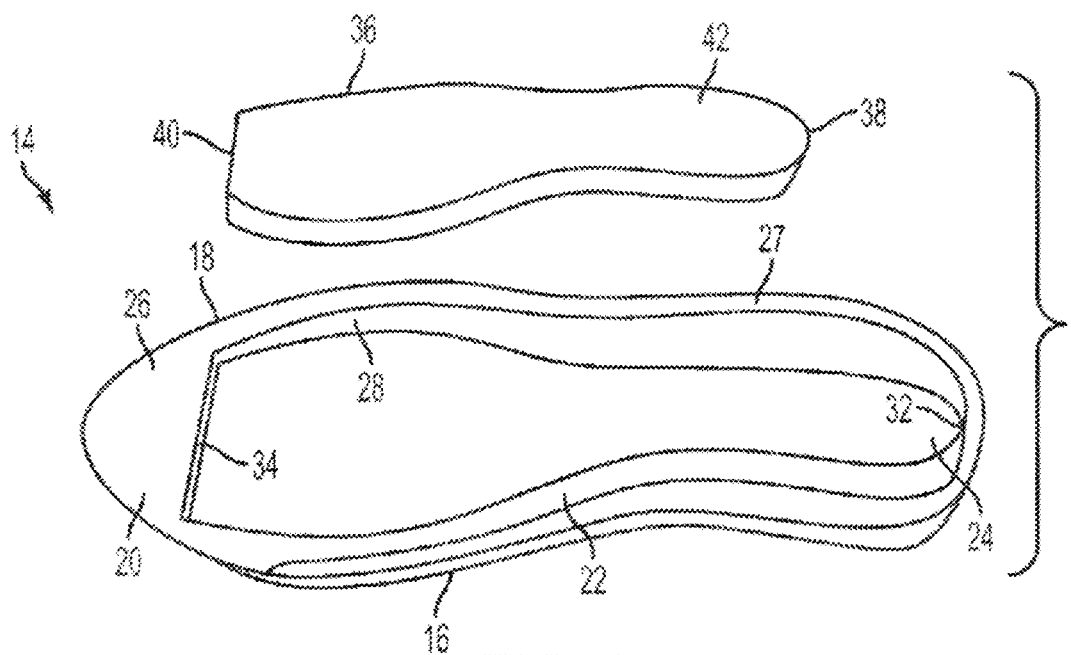
FIG. 2 is an exploded view of the sole component of the article of footwear of FIG. 1.

As can be seen in FIG. 2, sole component 14 consists of a first portion 26 having an upper surface 27 with a recess 28 formed therein. Upper surface 27 is secured to upper 12 with adhesive or other suitable fastening means. A plurality of substantially horizontal ribs 30 is formed on the exterior of first portion 26. In certain aspects, ribs 30 extend from a central portion of forefoot portion 20 on medial side 16 rearwardly along first portion 26, around heel portion 24 and forwardly on lateral side 18 of first portion 26 to a central portion of forefoot portion 20.

First portion 26 provides the external traction surface of sole component 14. In certain aspects it is to be appreciated that a separate outsole component could be secured to the lower surface of first portion 26. When a separate outsole component is secured to the lower surface of first portion 26, the first portion 26 is a midsole component. In some aspects, the article is a midsole component for an article of footwear. In other aspects, the article is a combination midsole-outsole component for an article of footwear.

The article can be an insert. An insert 36 can be received in recess 28. As illustrated in FIG. 2, insert 36 can provide cushioning or resiliency in the sole component. First portion 26 can provide structure and support for insert 36. In such aspects, first portion 26 can be formed of a material of higher specific gravity and/or hardness as compared to insert 36 such as, for example, non-foam materials including rubber and thermoplastic polyurethane, as well as foam materials. In certain aspects, insert 36 can be formed of a thermoplastic copolyester foam as disclosed herein.

Insert 36 has a curved rear surface 38 to mate with curved rear surface 32 of recess 28 and a transverse front surface 40 to mate with transverse front surface 34 of recess 28. An upper surface 42 of insert 36 is in contact with and secured to upper 12 with adhesive or other suitable fastening means. For example, when there is an insert 36, a recess 28 can extend from heel portion 24 to forefoot portion 20. In certain aspects, the rear surface 32 of recess 28 is curved to substantially follow the contour of the rear of heel portion 24 and the front surface 34 of recess 28 extends transversely across first portion 26.

Figure 3:
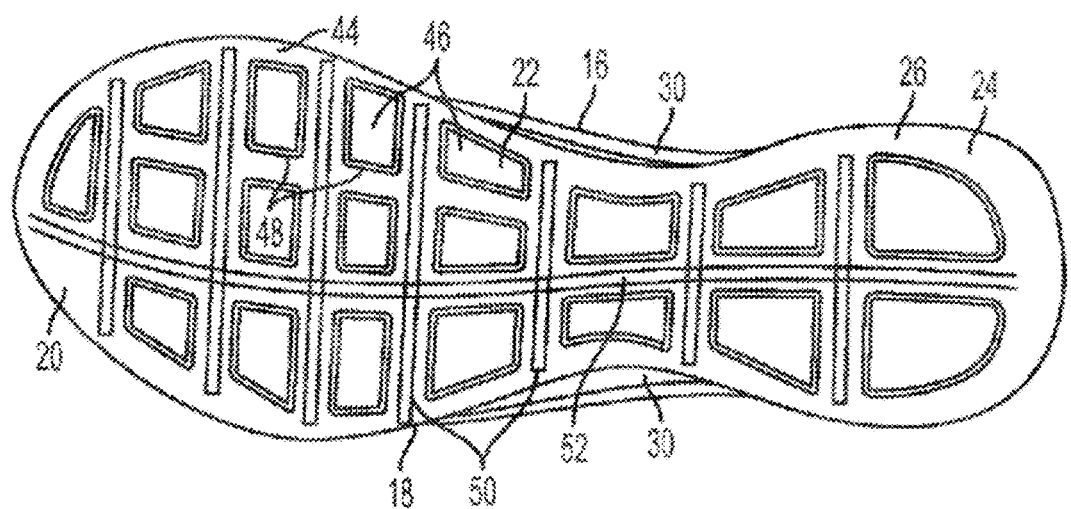
FIG. 3 is a plan view of the bottom of the sole component of the article of footwear of FIG. 1.

As seen best in FIG. 3, a ground engaging lower surface 44 of first portion 26 includes a plurality of projections 46. Each projection 46 is surrounded by a groove 48. A plurality of transverse slots 50 are formed in lower surface 44, extending between adjacent projections 46. A longitudinal slot 52 extends along lower surface 44 from heel portion 26 to forefoot portion 20.

Figure 4:
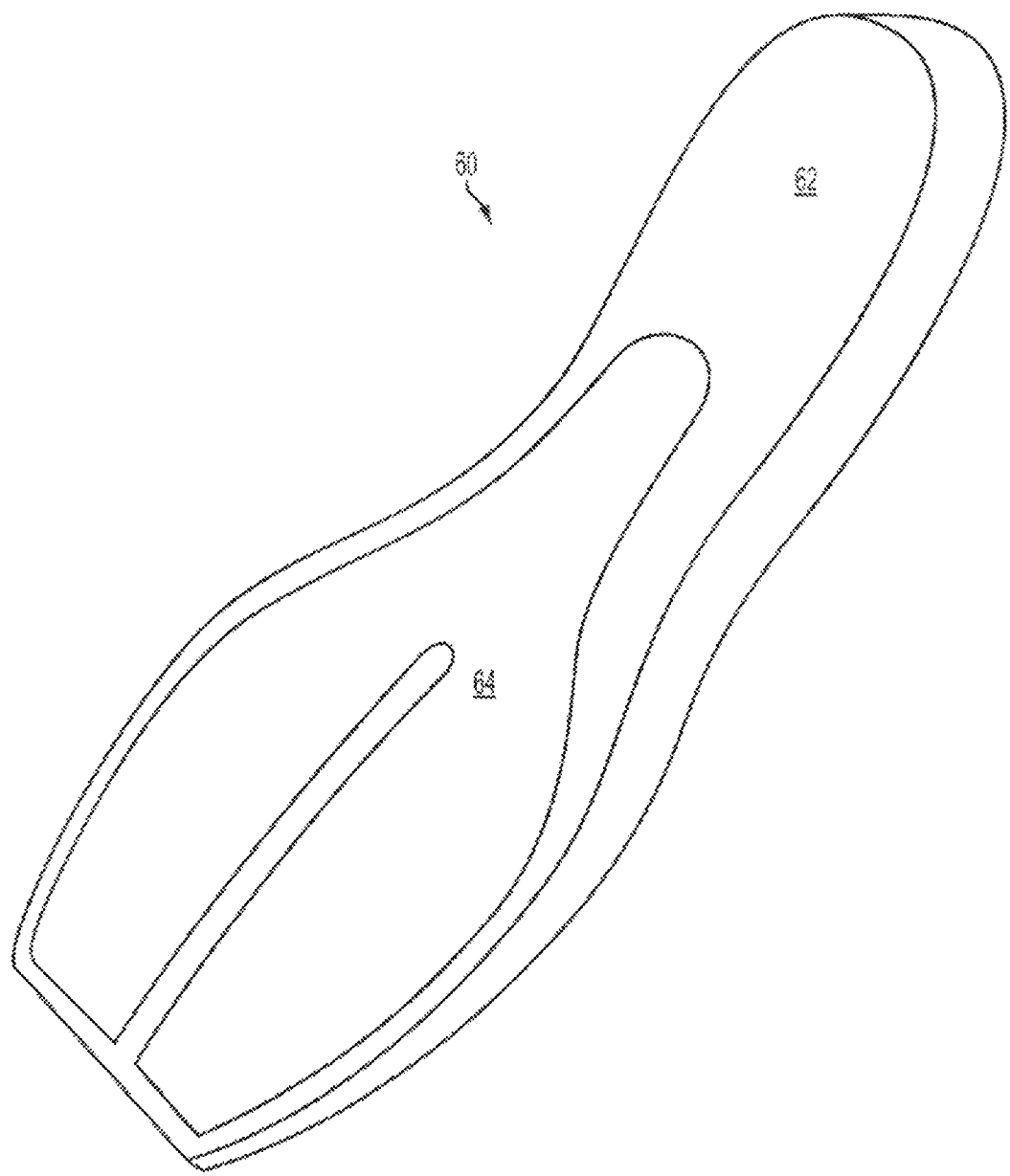
FIG. 4 is a bottom view of an insert for use in a sole component of an article of footwear.
Figure 5:
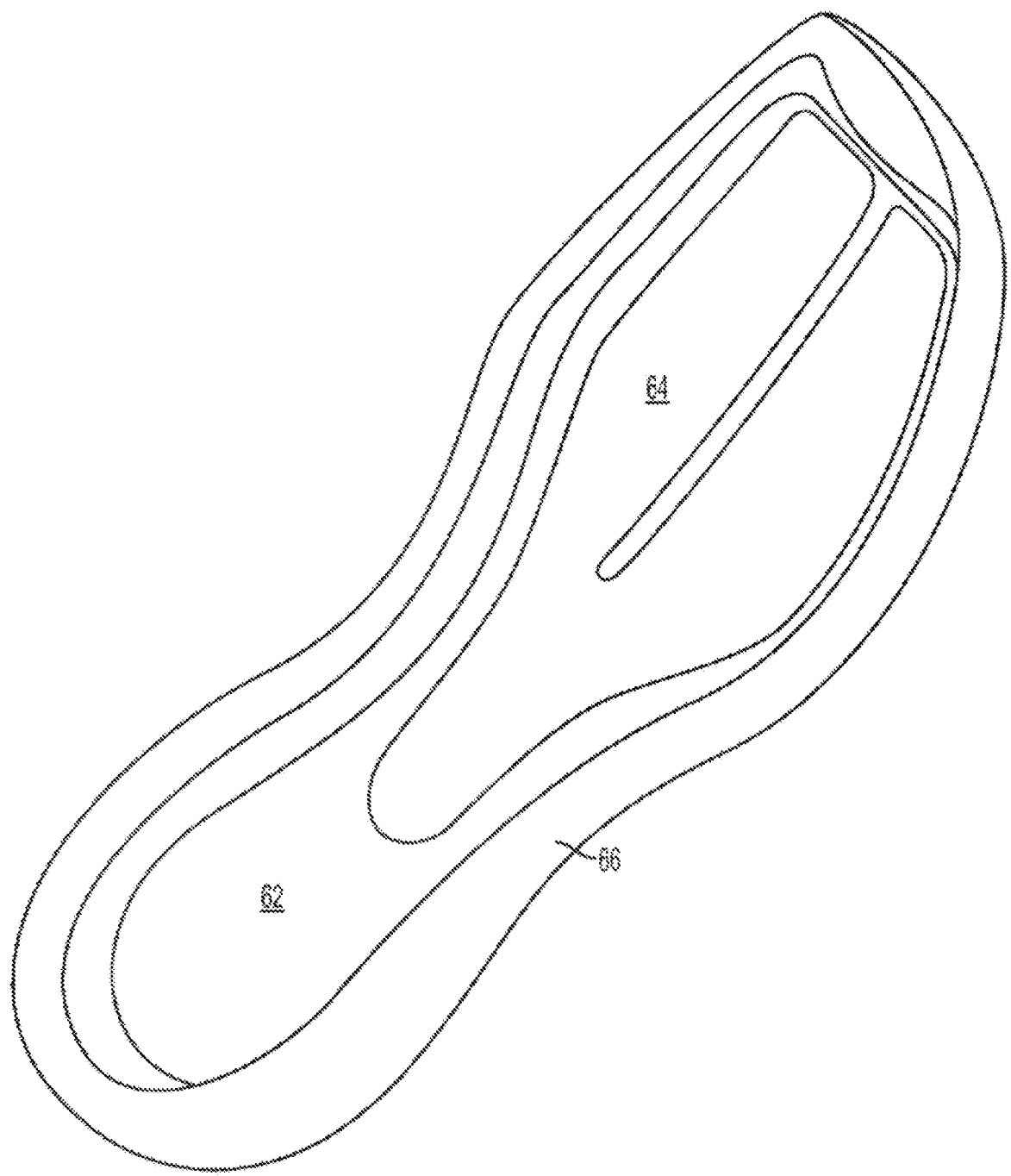
FIG. 5 is a top view of the insert of FIG. 4 inserted in a first portion to form a sole component.

FIGS. 4 and 5 show bottom and top views of an insert 60 which can be used in a sole component as described herein. Insert 60 is similar to insert 36, but as illustrated in FIGS. 4 and 5, insert 60 is formed of two types of materials 62 and 64, where at least one of the materials is a thermoplastic copolyester foam as disclosed herein. FIG. 4 shows a bottom view of insert 60, while FIG. 5 shows a top view of insert 60 formed of two types of materials 62 and 64, with the insert placed inside a first portion 66 to form a sole component 14. Inserts with more than two types of materials, at least one of which is a thermoplastic copolyester foam as disclosed herein, can also be used. In the example illustrated in FIGS. 4 and 5, a portion of a first material 62 can be used in the heel region of the insert, and a portion of a second material 64 can be used in the toe region of the insert. A higher specific gravity material can be used to support the heel region, while a lower specific gravity material can be used to support the toe region. For example, the specific gravity of the first material can be at least 0.02 units greater than the specific gravity of the second material. The shape of the portions of the two materials 62 and 64 of the insert can be any suitable shape. For example, the heel region can be in the shape of a wedge. Inserts formed of two types of materials can be useful in running shoes, as well as in basketball shoes.

Figure 7:
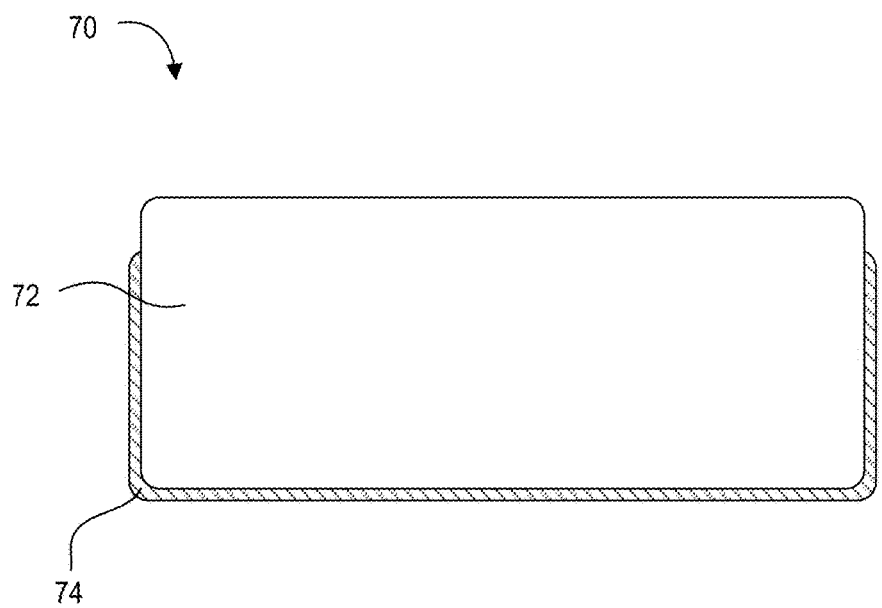
FIG. 7 shows a representative schematic illustrating a disclosed foam component or article with a second polymeric material.

In the articles comprising the foam articles or components including the thermoplastic copolyester microcellular open-cell or closed-cell foam and the layer of a second polymeric material disposed on at least a portion of an exterior surface of the foam as described herein. Referring to FIG. 7, in an aspect, a foam component 70 can have a foam portion 72, comprising a polymeric material that comprises a thermoplastic copolyester microcellular open-cell or closed-cell foam. The foam portion 72 has one or more sides that, when the foam component 70 is disposed in an article such as an article of footwear, are oriented toward an exterior facing side or surface of the article (e.g. an outer peripheral edge of article of footwear 10 of FIG. 1). A polymeric layer 74 is disposed on at least a portion of an exterior facing side or surface of the foam portion 72. The polymeric layer 74 comprises a second polymeric material that may be the same as or different from the polymeric material of the foam portion 72. According to aspects, the polymeric layer 74 is not a foamed material. The polymeric layer 74 can function as an outsole, for example, which can provide improved abrasion resistance on one or more surfaces of the foam portion 72.

In some aspects, the article can be something other than a sole component. For example, the article can be an upper or an upper component. An upper component refers to a piece that is stitched or otherwise joined with one or more other pieces to form an upper. The materials in the upper generally contribute to characteristics such as breathability, conformability, weight, and suppleness or softness. A lower component refers to a piece that is joined with one or more other pieces to form the lower portion of an article of footwear. The lower can include, for example, the outsole and midsole. The choice of outsole materials and design will contribute, for instance, to the durability, traction, as well as to the pressure distribution during use. The midsole materials and design contribute to factors such as the cushioning and support. Grindery components include all of the additional components that can be attached to the upper, lower, or both. Grindery components can include, for example, eyelets, toe puffs, shanks, nails, laces, velcro, catches, backers, linings, padding, heel backings, heel foxings, toe caps, etc.

The upper can be a lasted upper. A "lasted upper," as used herein, refers to an upper that is formed into the shoe shape prior to attachment to the sole by one or more mechanical means. The lasted upper can include a heel counter formed to shape the heel of the upper. The lasted upper can include a strobel or a strobel board attached to the upper, typically via a strobel stitch.

While the thermoplastic copolyester microcellular open-cell or closed-cell foams described herein can be used for making any of a variety of components, including a variety of components for an article of footwear, in particular aspects the components include a midsole, an outsole, an insole, or an insert. Additional articles can include a tongue padding, a collar padding, and a combination thereof. As described above and detailed more completely below, the articles comprising the thermoplastic copolyester foams described herein can exhibit a unique balance of beneficial physical properties such as high energy efficiency or energy return, high split tear, low specific gravity, and low compression. Furthermore, the thermoplastic copolyester foam can also be reprocessed with minimal loss in physical properties (e.g., for recycling), providing a solution for materials sustainability.

In some instances a disclosed article can comprise a first component comprising a foamed thermoplastic copolyester composition and a second component comprising a second polymeric material. An article comprising the first component with the second polymeric material can be characterized by good bonding strength between the second polymeric material and the foam component. The ply adhesion strength between the second polymeric material and the foam component is greater than 2.5 kg force/centimeter or greater than 3.0 kg force/centimeter, when determined using the Ply Adhesion Test method described herein.

First Components.

The first component is a foam component comprising a thermoplastic copolyester composition. The first component can be a component such as, but not limited to, a component of a midsole or a midsole component. It is understood that the first component comprises a foamed thermoplastic copolyester composition. i.e. For example, a thermoplastic copolyester composition includes at least 90 weight percent, or at least 95 weight percent, or at least 99 weight percent of the thermoplastic copolyester disclosed herein, based on the total weight of the thermoplastic copolyester composition. In some instances, the polymeric component of the thermoplastic copolyester composition includes essentially only one or more disclosed thermoplastic copolyester.

Second Components.

The second component comprising a second polymeric composition can be a component such as, but not limited to, a component of an outsole or an outsole component. It is understood that the second component can be foamed, partially foamed, or essentially non-foamed. In some instances the second component is foamed component, i.e., a second foam component. In other instances, the second component is an unfoamed component, i.e., a solid component. The second polymeric composition comprises a disclosed second polymeric material. In some instances, the second polymeric material is a disclosed thermoplastic copolyester composition. For example, a second polymeric material can include at least 90 weight percent, or at least 95 weight percent, or at least 99 weight percent of thermoplastic copolyesters disclosed herein, based on the total weight of the second polymeric material. In some instances, the second polymeric material includes essentially only one or more disclosed thermoplastic copolyesters. In other instances, the second polymeric material can include a polymeric material essentially free of a disclosed thermoplastic copolyester, e.g., a thermoplastic elastomer or thermoplastic vulcanizate material as disclosed herein. In still other instances, a second polymeric material can include a mixture of a disclosed thermoplastic copolyester and a polymeric material that is not a disclosed thermoplastic copolyester, e.g., a thermoplastic elastomer or thermoplastic vulcanizate material.

Characteristics of Thermoplastic Copolyester Foam Components.

As discussed herein above, a first component can be foam component, i.e., a first foam component, comprising a disclosed thermoplastic copolyester. In some instances, a second component can be foam component, i.e., a second foam component, comprising a disclosed thermoplastic copolyester. That is, each of the first or second foam components can independently comprise a disclosed thermoplastic copolyester foam component. It is understood herein throughout that reference to a "thermoplastic copolyester foam" is inclusive of a first foam component, a second component, or both a first and a second foam components, and that each of the first and second foam components can independently comprise one or more disclosed thermoplastic copolyester polymeric materials as disclosed herein below. A disclosed thermoplastic copolyester foam can exhibit various beneficial properties.

For example, the thermoplastic copolyester foam can exhibit a beneficial split tear, for example a high split tear for a sole component in an article of footwear. In some aspects, the thermoplastic copolyester foam can have a split tear value of greater than about 1.5 kilogram/centimeter (kg/cm), or greater than about 2.0 kg/cm, or greater than about 25 kg/cm, when determined using the Split Tear Test Method described herein. In some aspects, the thermoplastic copolyester foam can have about 1.0 kg/cm to 4.5 kg/cm, about 1.5 kg/cm to 4.0 kg/cm, about 2.0 kg/cm to 4.0 kg/cm, about 2.0 kg/cm to 3.5 kg/cm, or about 2.5 kg/cm to 3.5 kg/cm, when determined using the Split Tear Test method described herein. In some aspects, the thermoplastic copolyester foam is injection molded (i.e., is not exposed to a separate compression molding step after being formed by injection molding and removed from the injection mold), or is injection molded and subsequently compression molded in a separate compression mold having different dimensions than the mold used in the injection molding step. The thermoplastic copolyester foam can have a split tear of about 0.08 kg/cm to 4.0 kg/cm, about 0.9 kg/cm to 3.0 kg/cm, about 1.0 to 2.0 kg/cm, about 1.0 kg/cm to 1.5 kg/cm, or about 2 kg/cm. In some aspects, the thermoplastic copolyester foam the thermoplastic copolyester foam is injection molded, and has have a split tear of about 0.07 kg/cm to 2.0 kg/cm, or about 0.8 kg/cm to 1.5 kg/cm, or about 0.9 to 1.2 kg/cm, about 1.5 kg/cm to 2.2 kg/cm.

The specific gravity of a disclosed thermoplastic copolyester foam is also an important physical property to consider when using a foam for in an article of footwear or athletic equipment. As discussed above, the thermoplastic copolyester foam of the present disclosure exhibits a low specific gravity, which beneficially reduces the weight of midsoles or other components containing the thermoplastic copolyester foam. The thermoplastic copolyester foams of the present disclosure can have a specific gravity of from 0.02 to 0.22, or of from 0.03 to 0.12, or of from 0.04 to 0.10, or from 0.11 to 0.12, or from 0.10 to 0.12, from 0.15 to 0.2; 0.15 to 0.30, when determined using the Specific Gravity Test Method described herein. Alternatively or in addition, the thermoplastic copolyester foam can have a specific gravity of from 0.01 to 0.10, or of from 0.02 to 0.08, or of from 0.03 to 0.06; 0.08 to 0.15; or from 0.10 to 0.12, when determined using the Specific Gravity Test Method described herein. For example, the specific gravity of the thermoplastic copolyester foam can be from or from 0.15 to 0.2, or can be from 0.10 to 0.12. The thermoplastic copolyester foam can be injection molded, or can be injection molded and subsequently compression molded. In some aspects, the thermoplastic copolyester foam has a specific gravity of about 0.7 or less, or 0.5 or less, or 0.4 or less, or 0.3 or less, when determined using the Specific Gravity Test Method described herein. In some aspects, the thermoplastic copolyester foam, including thermoplastic copolyester foam present in midsoles and midsole components, can have a specific gravity of about 0.05 to 0.25, about 0.05 to 0.2, about 0.05 to 0.15, about 0.08 to 0.15, about 0.08 to 0.20, about 0.08 to 0.25, or about 0.1 to 0.15, when determined using the Specific Gravity Test Method described herein. In some aspects the thermoplastic copolyester foam has a specific gravity of about 0.15 to 0.3, about 0.2 to 0.35, or about 0.15 to 0.25, when determined using the Specific Gravity Test Method described herein.

The thermoplastic copolyester foam portion of the article or component of an article can have a stiffness of about 200 kPa to about 1000 kPa, or about 300 to about 900 kPa or about 400 to about 800 kPa or about 500 to about 700 kPa, when determined using the Cyclic Compression Test with the 45-millimeter diameter cylindrical sample. The thermoplastic copolyester foam portion of the article or component of an article can have a stiffness of about 200 kPa to about 1000 kPa, or about 300 to about 900 kPa or about 400 to about 800 kPa or about 500 to about 700 kPa, when determined using the Cyclic Compression Test with the footform sample. The thermoplastic copolyester foam article or article component can be formed by injection molding, or by injection molding and subsequently compression molding.

The thermoplastic copolyester foam portion of the article or component of an article can have an Asker C durometer hardness of from about 30 to about 50, or from about 35 to about 45, or from about 30 to about 45, or from about 30 to about 40, when determined using the Durometer Hardness Test described herein The energy input of a foam is the integral of the force displacement curve during loading of the foam during the Cyclic Compression test. The energy return of a foam is the integral of the force displacement curve during unloading of the foam during the Cyclic Compression test. The thermoplastic copolyester foam portion of the article or component of an article can have an energy return of about 200 millijoules (mJ) to about 1200 mJ, or from about 400 mJ to about 1000 mJ, or from about 600 mJ to about 800 mJ, when determined using the Cyclic Compression Test with a 45-millimeter diameter cylindrical sample.

The energy efficiency, a measure of the percentage of energy the thermoplastic copolyester foam portion of the article or component returns when it is released after being compressed under load, can provide improved performance for athletic shoes, e.g. for reducing energy loss or dissipation when running. This is especially true for running and other athletic shoes. In some aspects, the thermoplastic copolyester foam portion of the articles and components provided herein have an energy efficiency of about 50 percent to 97 percent, about 60 percent to 95 percent, about 60 percent to 90 percent, about 60 percent to 85 percent, about 65 percent to 85 percent, or about 70 percent to 85 percent, when determined using the Cyclic Compression Test with a 45-millimeter diameter cylindrical sample.

In particular examples, the energy efficiency of the subsequently compression molded thermoplastic copolyester foam can be at least at least 6 percentage points, or at least 7 percentage points, or at least 8 percentage points, or at least 9 percentage points, or at least 10 percentage points, or at least 12 percentage points greater than the energy efficiency of the injection molded thermoplastic copolyester foam which has not subsequently been compression molded, when the compression molded thermoplastic copolyester foam has an energy efficiency greater than 45 percent, or greater than 50 percent, or greater than 55 percent, or greater than 60 percent, or greater than 65 percent, and the compression molded thermoplastic copolyester foam can have a specific gravity of from 0.02 to 0.15, or of from 0.03 to 0.12, or of from 0.04 to 0.10 or from 0.11 to 0.12, from 0.15 to 0.2; or 0.15 to 0.30.

The resulting foams can have a microcellular closed-cell or open-cell foam structure. Cells are the hollow structures formed during the foaming process, in which bubbles are formed in the polymeric material by the blowing agents. The cell walls are generally defined by the polymeric material. The cells can be entirely enclosed by the polymeric material, or they can be at least partially open, e.g., interconnected with one or more adjacent cells. "Closed-cell" structures refer to structures in which at least 60 percent or more of the cells are closed cells, or at least 80 percent of the cells are closed cells, or at least 90 percent of the cells are closed cells, or at least 95 percent of the cells are closed cells. As described herein "open-cell" structures refers to foam structures in which less than about 5 percent or less than 4 percent, or less than 3 percent or less than 1 percent of the cells are closed cells.

The disclosed foams may have a cell diameter of from about 50 micrometer to about 1000 micrometer, or from about 80 micrometer to about 800 micrometer, or from about 100 micrometer to about 500 micrometer.

The proportion of cells in the foam having a cell diameter of about 50 micrometer to about 1000 micrometer is preferably not less than 40 percent relative to all the cells, or not less than 50 percent or not less than 60 percent relative to all the cells. If the proportion of cells is less than 40 percent, the cell structure will tend to be nonuniform and/or have a coarse cell structure. As used herein, a "coarse cell structure" refers to a foam structure in which the average cell diameter is greater than 1 millimeter, and/or for greater than 20 percent of the cells, a 1 millimeter line drawn across the largest dimension of the cell, will not cross a cell wall or a strut (i.e., an open cell wall or portion thereof).

The number of open cells and/or closed cells and cell diameter of the cells of the foam can be determined visually, for example by capturing an image of a cut surface with a camera or digital microscope, determining the number of cells, number of open cells and/or number of closed cells, and determining an area of a cell, and converting it to the equivalent circle diameter.

Methods of Manufacturing Disclosed Foams.

In some examples, the disclosed foamed polymeric materials can be prepared by various methods as disclosed herein and as known in the art. That is, disclosed articles or components of articles such as midsoles, midsole components, inserts and insert components can be prepared by injection molding a melt composition comprising a polymeric material as described herein using a physical blowing agent and/or chemical blowing agent. A disclosed foam component, e.g., a disclosed first foam component or a disclosed foam second foam component, can be prepared by the methods disclosed herein below.

Disclosed herein are methods for making a foam article or component, the method comprising: forming a mixture of molten polymeric material and a blowing agent, wherein the polymeric material comprises a disclosed thermoplastic copolyester; injecting the mixture into a mold cavity; foaming the molten polymeric material, thereby forming a foamed molten polymeric material; solidifying the foamed molten polymeric material, thereby forming a foam article having a microcellular foam structure; and removing the foam article from the mold cavity.

Also disclosed are methods for making a foam article or component, the method comprising: forming a mixture of molten polymeric material and a blowing agent, wherein the polymeric material comprises a disclosed thermoplastic copolyester; injecting the mixture into a mold cavity; foaming the molten polymeric material, thereby forming a foamed molten polymeric material; solidifying the foamed molten polymeric material, thereby forming a foam article having a microcellular foam structure; and removing the foam article from the mold cavity; wherein the mixture has an injection temperature; and wherein the injection temperature is from about the melting temperature of the thermoplastic copolyester to about 50 degrees C. above the tail temperature of the thermoplastic copolyester.

Also disclosed are methods for making a foam article or component, the method comprising: forming a mixture of molten polymeric material and a blowing agent, wherein the polymeric material comprises a disclosed thermoplastic copolyester; injecting the mixture into a mold cavity; foaming the molten polymeric material, thereby forming a foamed molten polymeric material; solidifying the foamed molten polymeric material, thereby forming a foam article having a microcellular foam structure; and removing the foam article from the mold cavity; wherein the foaming occurs at a foaming temperature; and wherein the foaming temperature is from about the melting temperature of the thermoplastic copolyester to about 50 degrees C. above the tail temperature of the thermoplastic copolyester.

Figure 8:
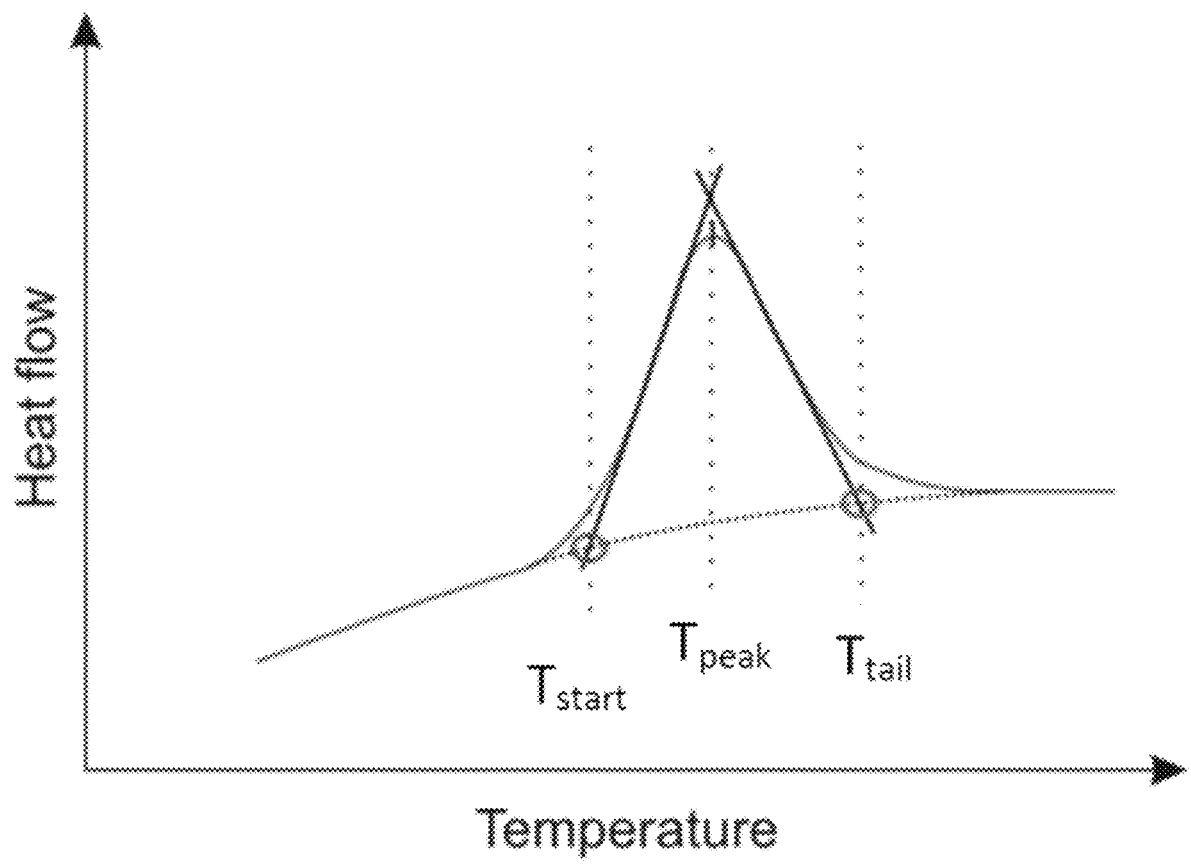
FIG. 8 shows a representative schematic illustrating a disclosed method for determining peak and tail temperatures.
Figure 9A:
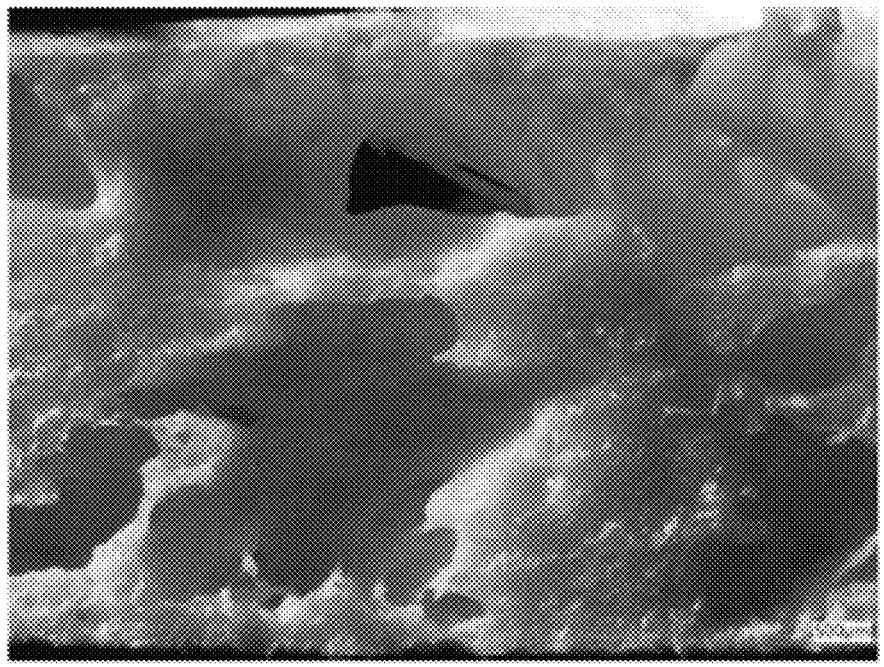
FIGS. 9A-9D show representative images of cross-sectional views of foam plaques prepared using a disclosed thermoplastic copolyester elastomer at different temperatures. Each image shows a scalar bar (500 micrometers). Foamed plaques were prepared at the following temperatures: 175 degrees C.
Figure 9B:
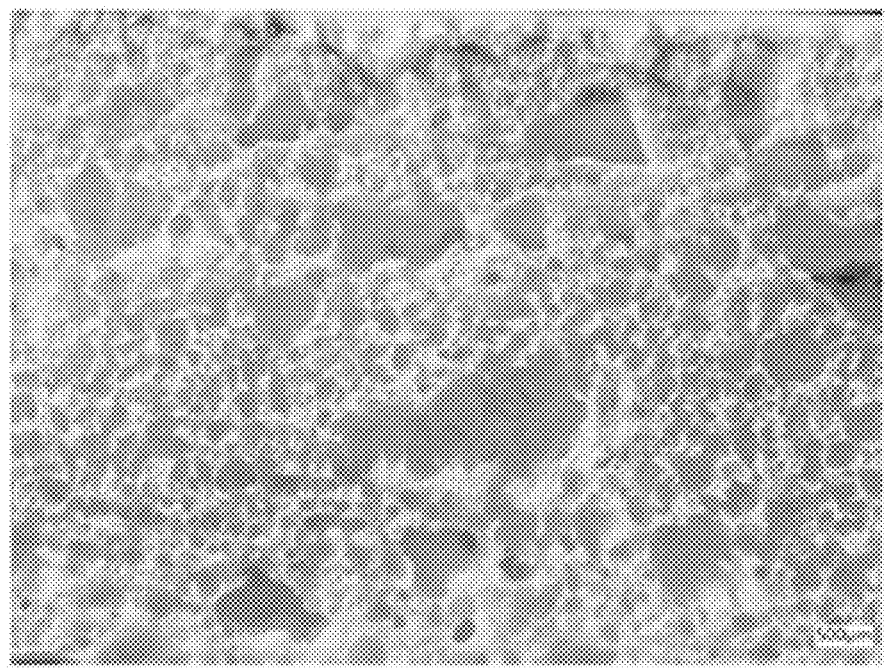
Figure 9C:
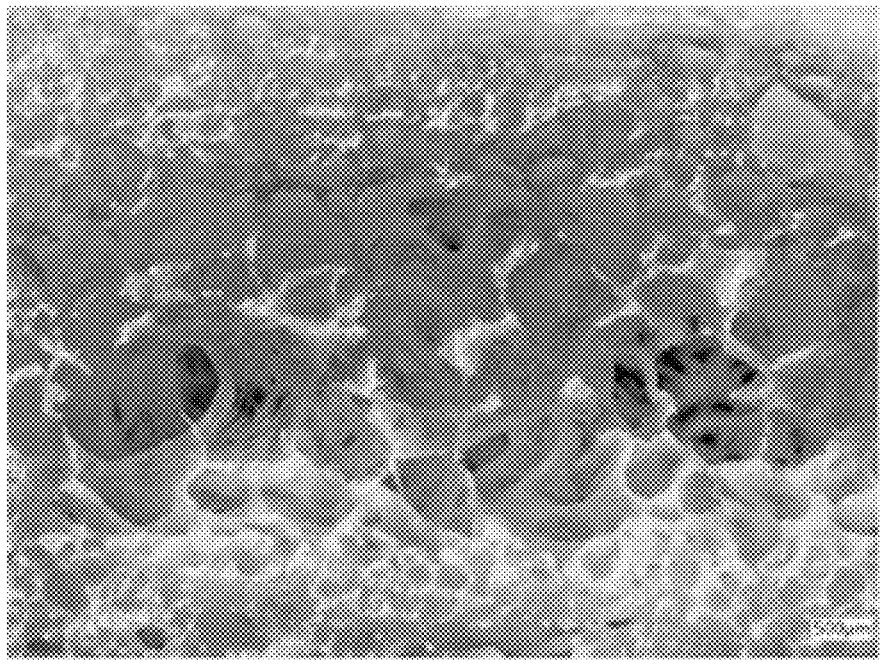
Figure 9D:
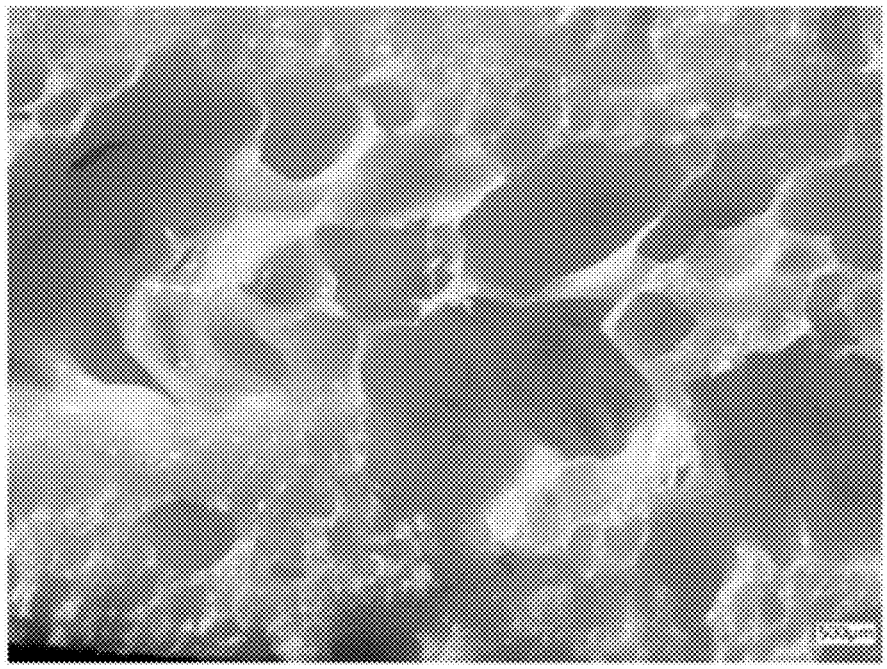

Dynamic scanning calorimetry (DSC) is used to determine the melting temperature and the tail temperature of a thermoplastic copolyester, and an exemplary method is described herein below. Briefly, 10-30 mg pieces of undried resin pellets are cycled from −90 degrees C. to 225 degrees C. at 20 degrees C./min and cooled to −90° C. at 10° C./min. In some instances, experiments are run using a heat-cool-heat profile with a ramp rate of 10 degrees C. per min, minimum temperature of 0 degrees C. and maximum temperature of 250 degrees C. Analyses should be determined in duplicate. The $T_m$ and $T_g$ values are recorded from the second cycle. The melt "peak" is identified as the local maximum of the second heating cycle. If there is more than one peak in the DSC curve, the peak occurring at hotter temperatures is chosen as the temperature reference. The tail is identified as the intersection of the tangent of the line of the higher temperature side of the melt peak with the extrapolated baseline. A schematic illustrating the method for determining peak and tail temperatures is shown in FIG. 8.

For example, the disclosed foamed polymeric materials can be prepared using a suitable extruder. An extruder (e.g., single or twin screw) can be used to provide a composition. The extruder can have a motor to turn a screw inside the extruder. Extruder may be a single screw or twin screws made of individual elements of various sizes and pitches appropriate for mixing or kneading the specific materials used. In some examples, the extruder has a twin screw.

The various components that make up the compositions used to form the thermoplastic copolyester foam of the various examples described herein are added into the extruder through one or more port. The various components can be added as a melt or as appropriately-sized solid particles, for example chips or pellets, that are melted in section as they are mixed in the barrel of the extruder. The contents of the extruder can be heated to melt the composition. A supercritical fluid can be added into the melt as a physical blowing agent. In particular examples, the thermoplastic copolyester foam is prepared by using a physical blowing agent which foams the composition after it exits the extruder, and the thermoplastic copolyester foam is thus substantially free of a chemical blowing agent or decomposition product thereof.

The compositions can be added as a melt at a temperature close to the melting temperature of the polymeric component of the composition.

If a chemical blowing agent is used, the processing (melting) temperature used can be sufficiently below the temperature that would trigger the blowing agent. In order to foam the composition, the temperature near the exit of the extruder can be increased to a temperature close to or at the triggering temperature of a chemical blowing agent, thereby producing a chemically foamed thermoplastic copolyester foam as the composition exits the extruder (e.g., as the composition is injected into an injection mold).

Alternatively or in addition, a physical blowing agent can be used for foam the composition to form a physically foamed thermoplastic copolyester foam, or a physically and chemically foamed thermoplastic copolyester foam. For example, a supercritical fluid such as supercritical carbon dioxide or supercritical nitrogen can be mixed with the molten polymeric composition in the barrel of the extruder to form a single-phase solution. As the single-phase solution exits the extruder, the pressure drop between the higher pressure in the extruder and the lower pressure outside the extruder causes the supercritical fluid to transition to the gas phase and foam the molten polymeric composition.

Various examples include methods of manufacturing an article of footwear or components for an article of footwear. In some examples, the methods of manufacturing an article of footwear include injection molding a composition to form a thermoplastic copolyester foam described herein to produce a foam article or component of an article, such as an article of footwear. The article or component of an article can be a midsole or a component of a midsole, and the method can include providing an upper and an outsole for an article of footwear; and combining the midsole or midsole component, the upper, and the outsole to make an article of footwear. In some examples, the method of manufacturing the article of footwear includes combining an article comprising a thermoplastic copolyester foam, an upper, and an outsole to make an article of footwear.

The articles or components of articles such as midsoles, midsole components, inserts and insert components can be prepared by injection molding a melt composition described herein using a physical blowing agent. The injection molding can use a screw-type injector that allows for maintaining and controlling the pressure in the injector barrel. The injection molding machine can allow metering and delivering a supercritical fluid such as carbon dioxide or nitrogen into the composition prior to injection. The supercritical fluid can be mixed into the composition within the injection barrel and then injected into the mold. The supercritical fluid can then expand to create cell nuclei to form the physical foam within the mold. The injection molding can include physical foaming of the compositions described herein using a microcellular foam injection molding process, such as, for example the "MUCELL" process (Trexcel Inc., Royal Oak. Michigan, USA).

The thermoplastic copolyester foams described herein can be made using a process that involves impregnating a polymeric composition (e.g., at or above a softening temperature of the composition) with a physical blowing agent at a first concentration or first pressure. As used herein, the term "impregnating" generally means dissolving or suspending a physical blowing agent in a composition. The impregnated composition can then be foamed, or can be cooled (when applicable) and re-softened (when applicable) for blowing at a later time. In particular examples, the impregnated composition is a single-phase solution comprising carbon dioxide or nitrogen and the molten thermoplastic copolymer composition.

The impregnated composition is foamed by reducing the solubility of the physical blowing agent in the polymer matrix through pressure or temperature changes. The reduction in solubility of the physical blowing agent can release additional amounts (e.g., to create a secondary expansion of an originally-formed microcell in the composition) of the impregnated physical blowing agent from the composition, to further blow the composition, forming a foam composition (e.g., a foam composition having a microcellular structure).

In addition to injection molding, the thermoplastic copolyester foam of the present disclosure can be foamed and molded using various processes known in the art. For example, the thermoplastic copolyester foam can be formed into slab foam, filament or strand foams, particulate (e.g., bead) foams of various shapes and sizes, etc. These various forms of foam can then be used in different ways. For example, like injection molded foam, slab foam and filament or strand foam can be used directly as a finished foam article, or can be shaped (e.g., cut, buffed, or trimmed) to form a finished foam article, or can be compression molded to form a finished foam article. Optionally, the thermoplastic copolyester foam can be subjected to annealing processes as part of forming the finished foam article. Pellets of the compositions can be used to form individual particulate thermoplastic copolyester foams, or can be foamed and molded to form unitary molded foam articles composed of individual portions of foam affixed to each other.

The thermoplastic copolyester foams of the various examples described herein may be further shaped or molded by any of the methods known for forming articles from thermoplastic materials. Optionally, the thermoplastic copolyester foams of the present disclosure which have been foamed using any suitable blowing process (e.g., blowing using a physical and/or chemical blowing agent), including by injection molding using only a physical blowing agent, can then be compression molded to form a compression molded foam.

The thermoplastic copolyester foam of the present disclosure can be prepared by a process comprising (i) softening a composition (e.g., by heating at a first temperature at or above a softening temperature of the composition); (ii) simultaneously or sequentially with the softening (when applicable), contacting the composition with a first concentration or first pressure of a physical blowing agent sufficient to drive an amount of the physical blowing agent into the composition or combine the physical blowing agent with the composition; (iii) changing the concentration or pressure (e.g., decreasing the pressure or concentration) of the physical blowing agent to a second concentration or second pressure that is effective to foam the composition, thereby forming a thermoplastic copolyester foam (e.g., a thermoplastic copolyester foam having a microcellular structure); and, (iv) following the changing, cooling (when applicable) the thermoplastic copolyester foam to (e.g., cooling to a temperature below the softening temperature of the composition), to form a solidified thermoplastic copolyester foam.

The thermoplastic copolyester foam of the present disclosure can be prepared by (i) contacting (e.g., dissolving or suspending) the composition with a first concentration of a chemical blowing agent, in some examples, at or above a softening temperature of the composition (ii) triggering the chemical blowing agent to foam the composition, thereby forming a thermoplastic copolyester foam (e.g., a thermoplastic copolyester foam having a microcellular structure); and, (iii) following the triggering, in some examples, cooling the thermoplastic copolyester foam to, e.g., a temperature below its softening temperature, to form a solidified thermoplastic copolyester foam. In some examples, the "triggering" of the chemical blowing agent is performed by any suitable method, including heating the composition comprising a concentration of the chemical blowing agent to a temperature sufficient to "trigger" the chemical blowing agent, wherein the concentration of the chemical blowing agent is effective to foam the composition, thereby forming a thermoplastic copolyester foam (e.g., a thermoplastic copolyester foam having a microcellular structure). In some examples, the contacting comprises contacting at a pressure of from about 10 MPa to about 100 MPa (e.g., from about 30 MPa to about 100 MPa, about 20 MPa to about 80 MPa, about 30 MPa to about 60 MPa or about 40 MPa to about 70 MPa).

Chemical foaming agents may be endothermic or exothermic, which refers to a type of decomposition they undergo to produce the gas for foaming. The decomposition may be a result of thermal energy in the system. Endothermic foaming agents absorb energy and typically release a gas, such as carbon dioxide, upon decomposition. Exothermic foaming agents release energy and generate a gas, such as nitrogen, when decomposed. Regardless of the chemical foaming agent used, thermal variables of the polymer composition being molded and thermal variables of the foaming agent to be decomposed are coupled together such that process parameters are selected so that the polymer can be molded and the foaming agent can decompose at an appropriate phase of the molding operation.

The disclosed foamed polymeric materials and articles can be prepared by using systems such as those disclosed in U.S. Patent Appl. No. 62/734,912, which is incorporated herein by reference. Briefly, the system provides for decreased pressure losses across the system as well as to control (e.g., deliberately increase or decrease) the elongation, apparent shear, and/or zero shear viscosities of the molten polymeric material that is flowed into the mold. The method includes flowing a molten polymeric material into a shot tuning chamber from an upstream device and adjusting a temperature, a pressure, or both, within the shot tuning chamber to create a tuned molten polymeric material. The method additionally includes flowing the tuned molten polymeric material into a mold cavity from the shot tuning chamber. It will be appreciated that fine-tuning the temperature of and/or pressure applied to the molten polymeric material enables the system to have a desired impact on the physical and mechanical properties of the molded article. In particular, the temperature of the molten polymeric material may be controlled to achieve a desired range of shear/extensional viscosities, which reduces (e.g., substantially eliminates) uncontrolled bubble growth and/or nucleation. In one example, the method may also include adjusting (e.g., increasing and/or decreasing) a pressure in the mold cavity via a gas counter pressure (GCP) assembly prior to or while the molten polymeric material is flowed from the shot tuning chamber into the mold cavity. In such an example, the molten polymeric material may be flowed into the mold cavity at pressures well above ambient pressure. Furthermore, GCP may be introduced into the mold cavity to control nucleation and bubble growth during polymer foaming as well as increase surface quality of the molded article. Nucleation and bubble growth control enhances cell density uniformity and mechanical properties of the molded polymeric material. In some examples, the improvement in cell density homogeneity may be particularly beneficial in articles having low densities such as articles that have a density less than or equal to 0.3 grams per cubic centimeter and/or in articles having large dimensions such as articles having a thickness that is ≥1.0 cm, for instance.

The system can include a shot tuning chamber configured to receive a molten polymeric material from an upstream device. The shot tuning chamber is also configured to adjust one or more of a temperature of and a pressure applied to the molten polymeric material to create an adjusted molten polymeric material and to dispense the adjusted molten polymeric material. In this way, the system can selectively adjust tuning chamber temperature and/or pressure to achieve desired properties, as previously mentioned. In one example, the system may further include an adjustable mold runner configured to regulate fluidic communication between the shot tuning chamber and a mold cavity in a mold. In another example, the system can further include a GCP assembly coupled to the mold cavity and configured to regulate an amount of counter pressure gas flow into and out of the mold cavity. Providing GCP adjustment allows for additional tuning of the polymeric material as it enters and cools in the mold.

Alternatively, the disclosed foamed polymeric materials and articles can be prepared using methods and systems as described in International Patent Appl. No. PCT/US2018/035128. Briefly, the method can comprise a method for molding a single-phase solution comprised of a polymer composition and a gas. The polymer composition and the gas are maintained under pressure during the molding operation to prevent a cellular structure from being formed by the dissolved gas in the polymer composition coming out of solution. The mold cavity in which the single-phase solution is introduced for molding purposes is pressurized to a mold pressure that is sufficient to maintain the single-phase solution as a single-phase solution as the mold cavity is filled. Subsequent to filling the mold cavity with the single-phase solution under pressure, the resulting article may solidify entrapping the compressed gas, or the article may be exposed to a reduction in pressure causing the entrapped gas to form a microcellular structure.

The method can include forming the single-phase solution, such as through introduction of pressurized gas with a polymer composition that is melted, e.g., from about the $T_m$ up to about 50 degrees C. above the $T_{tail}$ of the thermoplastic copolyester as described elsewhere, in an injection molding apparatus's barrel (e.g., screw) that is effective to mix and dissolve the gas with the polymer composition while under pressure. The method continues with pressurizing a mold cavity of a mold above atmospheric pressure to a mold pressure. Atmospheric pressure is a pressure of the environment in which the mold cavity is exposed (e.g., general environment pressure). The mold pressure is at least a pressure to maintain the single-phase solution as a single single-phase. The method further includes injecting the single-phase solution into the pressurized mold cavity. The method also includes maintaining at least the mold pressure in the mold cavity during the injecting of the single-phase solution. As a result, the pressure in the mold cavity prevents the gas from coming out of solution to form a two-phase mixture (e.g., foaming) upon exit from the injection molding apparatus. As the pressure is maintained, premature foaming as the polymer composition is injected from the injection molding apparatus is avoided to allow a decoupling of process parameters associated with the foaming agent and the polymer composition.

A molding system can be utilized to prepare the disclosed foamed polymeric materials that includes a device configured to receive a polymeric material and heat the polymeric material to form a molten polymeric material. The molding system additionally includes a shot tuning chamber configured to receive the molten polymeric material from the device and adjust a temperature of or a pressure applied to the molten polymeric material. The molding system also includes an adjustable mold runner configured to regulate the flow of the molten polymeric material between the shot tuning chamber and a mold cavity. In one example, the device may be an injection device or an extrusion device. The molding system allows the characteristics of the polymeric material to be adapted to achieve desired end-use goals.

In some aspects, the present disclosure is directed to a compression molded thermoplastic copolyester foam, and to a method of forming compression molded thermoplastic copolyester foam for, among other applications, articles of footwear or athletic equipment. In some examples, the method can be a process comprising providing (e.g., preparing) a thermoplastic copolyester foam preform and then compression molding the thermoplastic copolyester foam preform to form a compression molded thermoplastic copolyester foam. For example, the thermoplastic copolyester foam can be compression molded by placing the thermoplastic copolyester foam preform in a compression mold having a height less than the initial height of the thermoplastic copolyester foam preform and closing the mold, thereby compressing the thermoplastic copolyester foam preform to the height of the mold. Simultaneously or sequentially with the compressing, the thermoplastic copolyester foam preform can be heated in the closed compression mold. During the compression molding, the temperature of at least a portion of the thermoplastic copolyester foam preform in the closed mold can be raised to a temperature within ±30 degrees C. of the softening temperature of the composition. The temperature can be raised by heating the closed mold. Following the raising of the temperature, while the thermoplastic copolyester foam preform remains closed in the compression mold, the temperature of at least a portion of the thermoplastic copolyester foam preform can be lowered. The temperature can be lowered by cooling the closed mold. The lowering can lower the temperature of at least a portion of the thermoplastic copolyester foam preform to a temperature at least 35 degrees C. below the softening temperature of the composition, thereby forming the compression molded thermoplastic copolyester foam. Following the cooling, the compression mold can be opened, and the compression molded thermoplastic copolyester foam can be removed from the compression mold.

Examples contemplated herein are directed to methods of manufacturing articles of footwear or athletic equipment. For example, the method can comprise providing components such as midsoles and inserts of an article of footwear in accordance with the present disclosure, and combining the component with a footwear upper and an outsole to form the article of footwear.

One method of making compression molded thermoplastic copolyester foam articles such as midsoles and inserts or components of articles such as components of midsoles or components of inserts described herein comprises forming a thermoplastic copolyester foam preform and compression molding the thermoplastic copolyester foam preform to make a compression molded thermoplastic copolyester foam. In some examples, the foam preforms of the various examples described herein are obtained by blowing the composition by about 150 percent to about 240 percent (e.g., from about 150 percent to about 220 percent; about 150 percent to about 200 percent, about 175 percent to about 225 percent, about 180 percent to about 230 percent or about 160 percent to about 240 percent) in at least one dimension (e.g., the vertical dimension) using a blowing agent. In some examples, the blown composition can be compression molded to about 120 percent to about 200 percent (e.g., from about 120 percent to about 180 percent; about 130 percent to about 190 percent; about 150 percent to about 200 percent; or about 160 percent to about 190 percent) in at least one dimension.

Thus for example, if the foaming of the composition is about 200 percent, the blown composition can be compression molded by a net 20 percent by compression molding to about 180 percent. In another example, if the composition is blown into a 20 millimeter (height)×10 centimeter (width)×5 centimeter (depth) slab (wherein hereinafter, "mm" will be used to indicate millimeter and "cm" will be used to indicate centimeter), and the slab is compression molded in the height direction by 20 percent, the compression molded slab would have the dimensions 18 mm (height)×10 cm (width)×5 cm (depth). In some examples, the compression molding is substantially maintained.

The thermoplastic copolyester foam can be made using a process that involves impregnating a composition (e.g., at or above a softening temperature of the composition) with a physical blowing agent at a first concentration or first pressure. The impregnated composition can then be foamed, or can be cooled (when applicable) and re-softened (when applicable) for blowing at a later time. In some instances, the impregnated composition is foamed by reducing the temperature or pressure, impacting the solubility of the physical blowing agent. The reduction in solubility of the physical blowing agent can release additional amounts of the impregnated physical blowing agent from the composition to further blow the composition forming a thermoplastic copolyester foam (e.g., a thermoplastic copolyester foam having a microcellular structure).

The compression molding process can be conducted by heating the thermoplastic copolyester foam preform in a closed compression mold. The thermoplastic copolyester foam preform is heated to a temperature close to its softening temperature, to allow the foam to retain the shape of the compression mold. For example, the foam preform can be heated to a temperature within plus or minus 30 degrees C. of its softening temperature, or within plus or minus 20 degrees C. of its softening temperature, or within plus or minus 10 degrees C. of its softening temperature, or within plus or minus 5 degrees C. of its softening temperature. For example, the thermoplastic copolyester foam preform can be heated to a temperature of from about 100 degrees C. to about 250 degrees C., or of from about 140 degrees C. to about 220 degrees C., or of from about 100 degrees C. to about 150 degrees C., or of from about 130 degrees C. to about 150 degrees C.

The material used to form the compression mold can be any material which can withstand the temperatures used during the process, such as machined metals, including aluminum. The compression mold can be made using two pieces, such as a top and a bottom mold. Depending on the shape of the foam component to be molded, a multiple-piece mold may be used in order to more easily release the compression molded foam from the mold.

The injection molded thermoplastic copolyester foam can have a closed skin. A closed skin can be formed by foaming and molding a thermoplastic copolyester foam in a closed mold. A closed skin can also be formed by compression molding a thermoplastic copolyester foam preform in a compression mold. However, care should be taken during the compression molding not to subject the thermoplastic copolyester foam preform to conditions such that more than a desired amount of the closed cell structures of the foam collapse. One way to avoid collapsing more than a desired amount of the closed cell structures is to control the temperature of the thermoplastic copolyester foam during the compression molding process, for example, by controlling the temperature of the mold. For example, during the compression molding step, the heating of the thermoplastic copolyester foam preform in the compression mold can be conducted for time of from 100 seconds to 1,000 seconds, or of from 150 seconds to 700 seconds.

Once the thermoplastic copolyester foam has been heated in the compression mold at the appropriate temperature for the desired length of time to soften the thermoplastic copolyester foam to the desired level, the softened preform is cooled, for example, to a temperature at least 35 degrees C. below its softening temperature, or at least 50 degrees C. below its softening temperature, or at least 80 degrees C. below its softening temperature, to re-solidify the softened foam, thereby forming the compression molded foam. Once cooled, the compression molded thermoplastic copolyester foam is removed from the compression mold. Following the heating, the cooling of the foam preform in the compression mold can be conducted for a time of from 50 to 1,000 seconds, or for a time of from 100 to 400 seconds.

The thermoplastic copolyester foam can be foamed using any one of the methods described above. The thermoplastic copolyester foam can be included in components of articles of footwear as described above, for example a midsole 146 as depicted in FIGS. 1A-1B.

Also disclosed herein are methods for preparation of foamed articles or components having improved foam quality. In particular, disclosed herein are methods for preparation of foamed articles or components comprising injection using high aspect ratio injection cavity molds. As understood herein, the improved foam quality achieved using the high aspect ratio injection cavity molds refers decreased voids, improved homogeneity of foam cell size distribution (i.e., more consistent foam structures), and a decrease in average foam cell size.

It has been found that the disclosed methods using higher aspect ratio injection cavity molds provide more consistent foam structures compared to low aspect ratio cavities. For 3D shapes, aspect ratio is defined herein as the ratio of the shape's maximum dimension to its minimum dimension. Thus, for regular shapes, (e.g., spheres, cubes, rectangles, cylinders, and the like), aspect ratio is defined herein as length/width. However, for irregular shapes, such as those frequently encountered in injection molding of commercially useful articles or components, such as, but not limited to, a midsole or a midsole component, no single dimension accurately represents the shape in a manner similar to a regular shape. Accordingly, for irregular shapes, aspect ratio is defined herein as the ratio of the maximum distance from the center of mass of the equivalent solid of the shape to the surface of the shape ($L_{max}$) relative to the minimum distance from the same point to the surface ($L_{min}$). It is understood that injection cavities with multiple gates, the volume allocated to each gate can be considered as having its own characteristic aspect ratio based on the fractional volume of the cavity it fills. Thus, the volume associated with each gate can be calculated using appropriate software and based on the calculated filled volume, an aspect ratio is readily calculated for each gate.

Figure 15B:
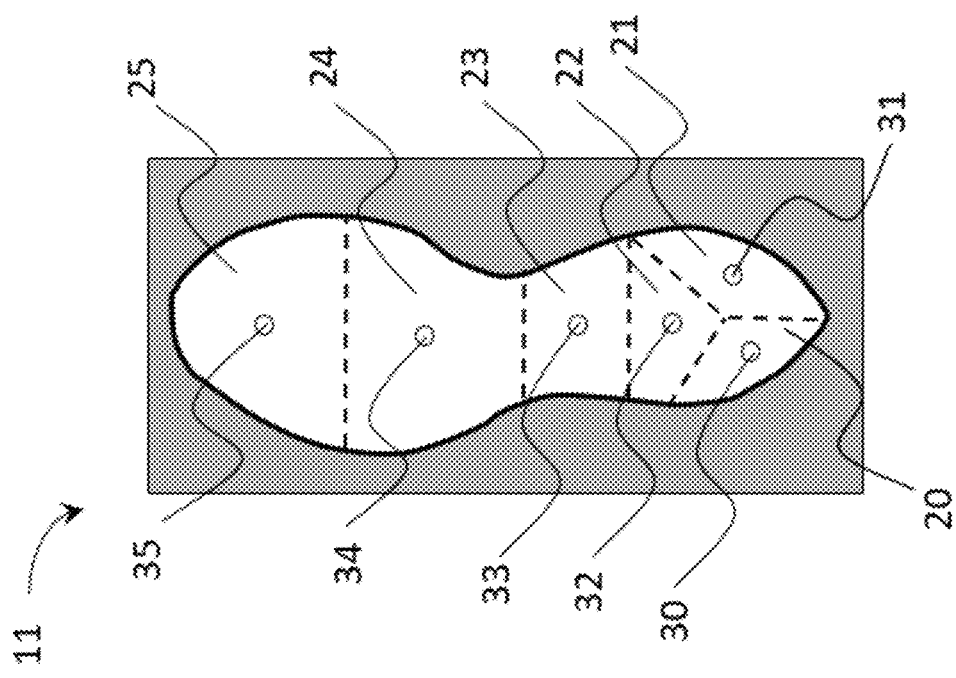
FIGS. 15A-15B show representative cross-sectional top plan views for a mold with an injection cavity have a four-gate configuration (FIG. 15A) or a six-gate configuration (FIG. 15B).
Figure 15A:
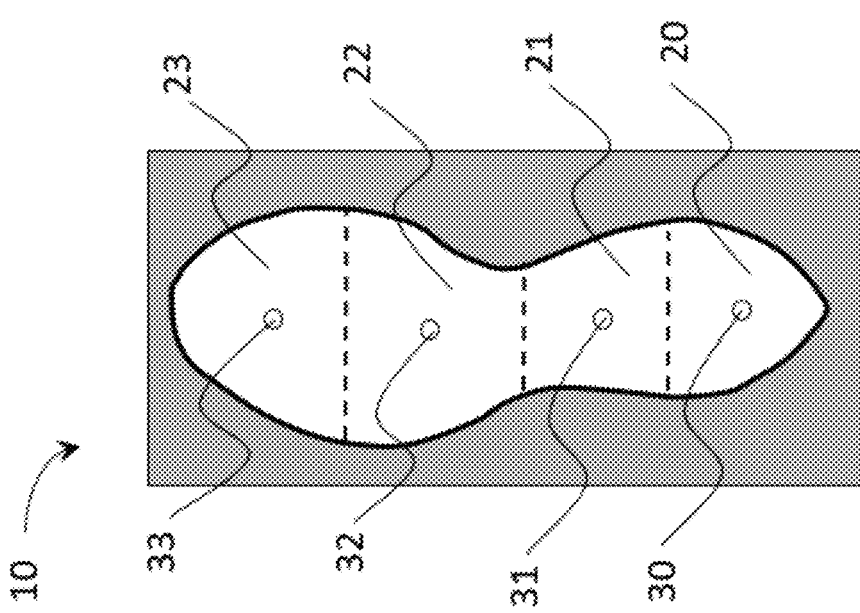

Referring now to FIGS. 15A and 15B, which show cross-sectional top plan views for two different schematic representations of injection molds, 10 and 11, respectively, showing a given cross-section through a mold and mold cavity therein. FIG. 15A shows a cross-sectional top plan view for an injection mold 10 having an injection cavity therein having a plurality of regions, i.e., a first region 20, a second region 21, a third region 22, and a fourth region 23, each of which is associated with one of a plurality of gates, i.e., a first gate 30, a second gate 31, a third gate 32, and a fourth gate 33. FIG. 15B shows a cross-sectional top plan view for an injection mold 11 having an injection cavity therein having a plurality of regions, i.e., a first region 20, a second region 21, a third region 22, a fourth region 23, a fifth region 24, and a sixth region 25, each of which is associated with one of a plurality of gates, i.e., a first gate 30, a second gate 31, a third gate 32, a fourth gate 33, a fifth gate 34, and a sixth region 35. That said, each region is associated with a volume that extends in the third dimension above and below the cross-sectional plan view shown. In comparing the injection cavity shown in each of FIGS. 15A and 15B, the mold cavity shown in FIG. 15B has a higher aspect ratio one or more of the regions compared to the regions given for the mold cavity shown in FIG. 15A. In particular, the aspect ratio is higher in a first region 20, a second region 21, a third region 22 of the mold cavity shown in FIG. 15B compared to an area roughly the same in size in FIG. 15A, i.e., the first region 20 and a portion of the second region 21.

In various aspects, the aspect ratio for a higher aspect ratio injection cavity mold is increased in at least one region by a factor of about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4.8, about 4.9, about 5.0, about 5.1, about 5.2, about 5.3, about 5.4, about 5.5, about 5.6, about 5.7, about 5.8, about 5.9, about 6.0, about 6.5, about 7.0, about 7.5, about 8.0, about 8.5, about 9.0, about 9.5, about 10; a range encompassed by any of the foregoing values; or any combination of the foregoing values.

Methods of Manufacturing Disclosed Articles.

Various examples include methods of manufacturing an article comprising a first component and a second component. As discussed herein above, the first component can be a foam component, e.g., a first foam component, and the second component can be a foam component, e.g., a second foam component. The first component can be, but is not limited to, a midsole or component of a midsole. The second component can be, but is not limited to, an outsole or an upper. It is understood that the second component can be foamed, partially foamed, or essentially non-foamed. In some instances, the second polymeric material comprises one or more disclosed thermoplastic copolyester compositions. For example, a second polymeric material includes at least 90 weight percent, or at least 95 weight percent, or at least 99 weight percent of the thermoplastic copolyester composition disclosed herein, based on the total weight of the second polymeric material. In some instances, the second polymeric material includes essentially only one or more disclosed thermoplastic copolyester compositions. The disclosed methods of manufacturing an article comprising a first component and a second component may further comprise steps or adjustments as known to the skilled artisan.

In some aspects, the methods of manufacturing an article of footwear include injection molding a composition to form a thermoplastic copolyester foam described herein to produce a foam article or component of an article, such as an article of footwear. The methods can further comprise manufacturing an article or component of an article comprising providing a midsole or a component of a midsole, then providing an upper and/or an outsole or outsole component for an article of footwear; and followed by combining the midsole or midsole component with the upper and/or the outsole or outsole component to make an article of footwear. In some instances, the method of manufacturing the article of footwear includes combining an article comprising a thermoplastic copolyester foam, an upper, and an outsole to make an article of footwear. In various aspects, the upper and/or outsole can comprise the same or a different thermoplastic copolyester material, a second polymeric material, or combinations thereof. In some instances, the outsole used in the method can be foamed, partially foamed, or essentially not foamed. It is understood that a midsole, midsole component, outsole, or outsole component can be foamed or partially foamed using the methods disclosed herein for the preparation of a foam article.

The various disclosed methods can include coupling a first component to a second component. In certain aspects, the disclosed methods comprise forming the first component and second component together. For example, the polymeric material for the first component, i.e., a disclosed thermoplastic copolyester, and the second polymeric material can be added to a mold sequentially during an injection molding process to provide a unitary component having a first component, i.e., a foam portion and a second component, i.e., a polymeric layer comprising the second polymeric material. In this aspect, a mold can be provided having a first mold portion having a mold surface. The second polymeric material can be added to the mold, so as to form a polymeric layer on at least a portion of the mold surface. The polymeric material for the first component, i.e., a disclosed thermoplastic copolyester, can be injected into the mold containing the second component, i.e., the polymeric layer comprising the second polymeric material, and foamed while in contact with the polymeric layer. The resultant injection-molded component is a unitary component, with the second component, i.e., the polymeric layer, bonded to the first component, i.e., the foam component.

Alternatively or additionally, the second component can be disposed onto the exterior surface of the first component during a compression molding step. For example, a first component can be made such as by injection molding, and the foam component can thereafter be compression molded in a mold which includes the second component, and the first component bonds to the surface of the second component during the compression molding process.

The second component can be provided as an already formed component, e.g., a second component, to the injection mold or compression mold. For example, the second component, e.g., a film, can be inserted into an injection mold and held in place against a target surface of the mold via vacuum ports, electrostatic charge or other method. The second component may be conformed to the target surface of the mold, for example, with the application of heat or vacuum before or after it is inserted into the mold. The polymeric material for the first component, i.e., a disclosed thermoplastic copolyester, can then be injected into the mold containing the film, and foamed as described herein. As a result the second component becomes an integral part of the molded component.

Alternatively or additionally, the second component can be disposed onto the foam component after the foam component has been formed. According to some of the disclosed methods, the second component that is provided separately from the first component, and are thereafter operably coupled so that the second component is in contact with a targeted portion of an exterior surface of the first component. The second component may be coupled with the exterior surface of a first component using any suitable method. In an aspect, the second component may be adhesively laminated to the first component. In another aspect, the second component may be coupled with the first component may be thermally laminated to an exterior surface of the first component. For example, heat may be applied to an exterior surface of the first component, to a surface of the second component, or both, to soften or melt the heated surface(s), and the two surfaces may be joined when one or both are in the softened or melted state. In an aspect, the second component may be coupled with the first component using a flame lamination process.

The second component can be provided as a polymeric coating. For example, a polymeric coating can be formed by applying a liquid polymeric material onto the foam component, such as by spraying, dip coating, tumble-coating, brushing, or a combination thereof. The liquid polymeric material can then be dried or cured while in contact with the first component.

The polymeric coating can be formed by applying a powered polymeric material onto the foam component, such as by spraying, powder-coating, electrostatically coating, tumble-coating, or a combination thereof. In some aspects, an adhesive could be used to affix the powder to the midsole, and/or a coating can be applied over the powder to hold it in place on the foam component. Once the powder is affixed to the midsole, it can be left in the form of a powder, or it can be treated so as to form a more uniform coating, such as by heating it to melt it, by applying a solvent to solubilize it, etc.

Alternatively, the polymeric layer can take the form of a separate element which is applied to all or a portion of an exterior surface of the foam component when incorporating the midsole into an article of footwear. For example, the foam component can be a midsole component of an article of footwear, and the polymeric layer can be a rand or foxing tape applied around a perimeter of the midsole. The polymeric layer can be an extension of an outsole covering all or a portion of the bottom surface of the midsole, and which wraps up and covers at least a portion of the sidewall of the midsole. The polymeric layer can be the "shell" portion of a core-shell sole structure, which covers both the bottom surface and the sidewalls of the midsole, and which is attached to the upper of the article of footwear.

The foam articles and components can be foamed using any one of the methods described above.

In various aspects, the disclosed methods of manufacturing articles comprising a first component and a second component, the second component comprising a second polymer material can produced separately via injection molding with or without the addition of compressed gas, supercritical fluids or other blowing agents upon which the foam article is produced.

In some instances, the disclosed methods of manufacturing articles comprising a first component and a second component comprise injection via overmolding. In some instances, overmolding can comprise sequential injection of a polymeric material for the first component, i.e., a disclosed thermoplastic copolyester, and a second polymeric material in the same process, or wherein the second material was produced in a separate process, and subsequently inserted into the mold after which foam article from the first material is overmolded. The second component can be produced separately via injection molding with only sufficient compressed gas, supercritical fluids or other blowing agents to achieve a density of 0.90 grams per cubic centimeter, 0.85 grams per cubic centimeter, or 0.80 grams per cubic centimeter.

In some instances, the disclosed methods of manufacturing articles comprising a first component and a second component comprise a step of corona treatment. That is, for example, the second component can be a film or an outsole or a rand that is pretreated with a plasma or corona treatment prior to receiving the overmolding assembly described herein.

In some instances, the disclosed methods of manufacturing articles comprising a first component and a second component comprise a step of pretreatment with a primer. That is, for example, the second component can be a film or an outsole or a rand that is pretreated with a primer alone, or a primer plus and an adhesive prior to receiving the overmolding assembly method described herein.

In some instances, the disclosed methods of manufacturing articles comprising a first component and a second component comprise a step of fused deposition 3D printing. That is, for example, the second component can be fused deposition 3D printed onto a first component. In such instances, a second polymeric material can be extruded into a fused deposition 3D printing filament of about 1.5 mm, about 1.75 mm, about 1.85 mm, about 2.85 mm, about 3.0 mm, or other relevant diameter for deposition and attachment to first component in such a way that it comprises the ground contact layer, print-on outsole, or other exterior features. Any grade commonly used in injection molding will typically suffice for 3D print filament for fused deposition applications.

The resulting article comprising the first and second components can be characterized by good bonding strength between the first and the second components. The ply adhesion strength between the polymeric layer and the foam component is greater than 2.5 kg force/centimeter or greater than 3.0 kg force/centimeter, when determined using the Ply Adhesion Test method described herein. Alternatively additionally, the bonding strength between the first and the second components can be determined according to the Hand Pull Test, described herein. The disclosed articles or components can have a bond between the first and the second components that has an average hand pull test result of greater than or equal to 2.0, or greater than or equal to 2.5, or greater than or equal to 3.0, or greater than or equal to 3.5, or greater than or equal to 4.0, or greater than or equal to 4.5, when determined according to the Hand Pull Test method described herein.

Each of the first and/or the second components can be characterized by one or more properties. For example, a first and/or a second component can have an Akron abrasion of less than 0.50 cubic centimeters lost, optionally less than 0.40 cubic centimeters lost, less than 0.30 cubic centimeters lost, less than 0.20 cubic centimeters lost, or less than 0.10 cubic centimeters lost as determined using the Akron Abrasion Test. The first and/or the second components can have an Akron abrasion of about 0.05 cubic centimeters lost, about 0.10 cubic centimeters lost, about 0.15 cubic centimeters lost, about 0.20 cubic centimeters lost, about 0.25 cubic centimeters lost, about 0.30 cubic centimeters lost, about 0.35 cubic centimeters lost, about 0.40 cubic centimeters lost, about 0.45 cubic centimeters lost, or about 0.50 cubic centimeters lost as determined using the Akron Abrasion Test, any range of abrasion values encompassed by any of the foregoing values, or any combination of the foregoing abrasion values.

The first and/or a second component can have an Akron abrasion of less than 500 milligrams lost, optionally less than 400 milligrams lost, less than 300 milligrams lost, less than 200 milligrams lost, or less than 100 milligrams lost as determined using the Akron Abrasion Test. The first and/or a second component can have an can have an Akron abrasion of about 50 milligrams lost, about 100 milligrams lost, about 150 milligrams lost, about 200 milligrams lost, about 250 milligrams lost, about 300 milligrams lost, about 350 milligrams lost, about 400 milligrams lost, about 450 milligrams lost, or about 500 milligrams lost as determined using the Akron Abrasion Test, any range of abrasion values encompassed by any of the foregoing values, or any combination of the foregoing abrasion values.

The first and/or a second component can have a DIN abrasion of less than 0.30 cubic centimeters lost, optionally less than 0.20 cubic centimeters lost, less than 0.10 cubic centimeters lost, less than 0.05 cubic centimeters lost, or less than 0.03 cubic centimeters lost as determined using the DIN Abrasion Test. The first and/or a second component can have a DIN abrasion of about 0.01 cubic centimeters lost, about 0.05 cubic centimeters lost, about 0.10 cubic centimeters lost, about 0.15 cubic centimeters lost, about 0.20 cubic centimeters lost, about 0.25 cubic centimeters lost, or about 0.30 cubic centimeters lost as determined using the DIN Abrasion Test, any range of abrasion values encompassed by any of the foregoing values, or any combination of the foregoing abrasion values.

The first and/or a second component can have a DIN abrasion of less than 300 milligrams lost, optionally less than 250 milligrams lost, optionally less than 200 milligrams lost, optionally less than 150 milligrams lost, optionally less than 100 milligrams lost, optionally less than 80 milligrams lost, optionally less than 50 milligrams lost, or optionally less than 30 milligrams as determined using the DIN Abrasion Test. The first and/or a second component can have a DIN abrasion of about 10 milligrams lost, about 50 milligrams lost, about 100 milligrams lost, about 150 milligrams lost, about 200 milligrams lost, about 250 milligrams lost, or about 300 milligrams lost as determined using the DIN Abrasion Test, any range of abrasion values encompassed by any of the foregoing values, or any combination of the foregoing abrasion values.

The first and/or a second component can described herein when incorporated into an article the product can have improved traction properties. In one aspect, the coefficient of friction of the polymer layer can be used to measure traction properties.

The first and/or a second component can have a dry dynamic coefficient of friction (COF) on a dry surface (e.g., a smooth, flat, or textured surface such as, for example, wooden parquet court, concrete, asphalt, laminate, brick, or ceramic tile) of greater than 0.5, optionally of greater than 0.7, greater than 0.8, greater than 0.9, greater than 1.0, as determined using the Dry Outsole Coefficient of Friction Test. The polymer layer can have a dry dynamic COF of greater than 0.15, optionally of greater than 0.2, greater than 0.25, or greater than 0.3, using the Dry Upper Coefficient of Friction Test.

The first and/or a second component can have a wet dynamic COF of greater than 0.25, optionally of greater than 0.30, greater than 0.35, greater than 0.40, or greater than 0.50, as determined using the Wet Outsole Coefficient of Friction Test. The polymer layer can have a wet dynamic COF of greater than 0.15, optionally of greater than 0.2, greater than 0.25, or greater than 0.3, using the Wet Upper Coefficient of Friction Test.

It may be desirable for the dynamic coefficient of friction for the same dry and wet surface (e.g., smooth concrete or court) to be as close as possible. In one aspect, the difference between the dynamic coefficient of friction of the dry surface and the wet surface is less than 15 percent. In another aspect, the difference between the dynamic coefficient of friction of the dry surface and the wet surface is about 0 percent, about 1 percent, about 2 percent, about 3 percent, about 4 percent, about 5 percent, about 6 percent, about 7 percent, about 8 percent, about 9 percent, about 10 percent, about 11 percent, about 12 percent, about 13 percent, about 14 percent, or about 15 percent, any range of percentage values encompassed by any of the foregoing values, or any combination of the foregoing percentage values.

The first and/or a second component can have a durometer Shore A hardness of less than 90 or less than 85 or less than 80. The polymer layer can have a durometer Shore A hardness of greater than 60 or greater than 65. The polymer layer can have a durometer Shore A hardness of about 50 to about 90 Shore A, optionally from about 55 to about 85 Shore A, from about 60 to about 80 Shore A, or from about 60 to about 70 Shore A. The polymer layer can have a durometer Shore A hardness of about 50 A, about 55 A, about 60 A, about 65 A, about 70 A, about 75 A, about 80 A, about 85 A, or about 90 A, any range of Shore A hardness values encompassed by any of the foregoing values, or any combination of the foregoing Shore A hardness values.

Thermoplastic Copolyester Composition

The polymeric materials disclosed herein (i.e., the polymeric material for the first component of the foam portion and/or the second polymeric material) can include or consist essentially of one or more thermoplastic copolyester compositions. In some aspects, a polymeric material for the first component includes at least 90 percent or at least 95 weight percent, or at least 99 weight percent of the thermoplastic copolyester composition disclosed herein, based on the total weight of the polymeric material for the first component.

The thermoplastic copolyester compositions include or consist essentially of one or more thermoplastic copolyesters. The disclosed thermoplastic copolyester composition can include at least about 90 weight percent or at least about 95 weight percent or at least about 99 weight percent of the one or more thermoplastic copolyesters, based on the total weight of the thermoplastic copolyester composition. In some aspects, the resin component of the thermoplastic copolyester composition, which is comprised of all the polymeric materials present in the thermoplastic copolyester composition, consists essentially of the one or more thermoplastic copolyesters. The thermoplastic copolyesters can include chain units derived from one or more olefins and chain units derived from one or more ethylenically-unsaturated acid groups.

The thermoplastic copolyester compositions can have a melt flow index of from about 5 to about 40, or about 10 to about 20, or about 20 to about 30 as determined at 210 degrees C. using a 2.16 kilogram weight. Alternatively or additionally, the thermoplastic copolyester compositions can have a melt flow index of from about 5 to about 40, or about 10 about 20, or about 20 to about 30 as determined at 220 degrees C. using a 2.16 kilogram weight. Alternatively or additionally, the thermoplastic copolyester compositions can have a melt flow index of from about 5 to about 40, or about 10 to about 20, or about 20 to about 30 as determined at 230 degrees C. using a 2.16 kilogram weight.

The thermoplastic copolyesters can be terpolymers of moieties derived from ethylene, acrylic acid, and methyl acrylate or butyl acrylate. In some aspects, a ratio of a total parts by weight of the acrylic acid in the thermoplastic copolyesters to a total weight of the thermoplastic copolyesters is about 0.05 to about 0.6, about 0.1 to about 0.6, about 0.1 to about 0.5, about 0.15 to about 0.5, or about 0.2 to about 0.5.

The compositions provided herein can include a thermoplastic copolyester comprising: (a) a plurality of first segments, each first segment derived from a dihydroxy-terminated polydiol; (b) a plurality of second segments, each second segment derived from a diol; and (c) a plurality of third segments, each third segment derived from an aromatic dicarboxylic acid. In various aspects, the thermoplastic copolyester is a block copolymer. In some aspects, the thermoplastic copolyester is a segmented copolymer. In further aspects, the thermoplastic copolyester is a random copolymer. In still further aspects, the thermoplastic copolyester is a condensation copolymer.

The thermoplastic copolyester can have a weight average molecular weight of about 50,000 Daltons to about 1,000,000 Daltons; about 50,000 Daltons to about 500,000 Daltons; about 75,000 Daltons to about 300,000 Daltons; about 100,000 Daltons to about 250,000 Daltons; about 100,000 Dalton to about 500,000 Dalton; or a value or values of weight average molecular weight within any of the foregoing ranges or a weight average molecular weight range encompassing any sub-range of the foregoing ranges.

The thermoplastic copolyester can have a ratio of first segments to third segments from about 1:1 to about 1:5 based on the weight of each of the first segments and the third segments; about 1:1 to about 1:3 based on the weight of each of the first segments and the third segments; about 1:1 to about 1:2 based on the weight of each of the first segments and the third segments; about 1:1 to about 1:3 based on the weight of each of the first segments and the third segments; or a value or values of have a ratio of first segments to third segments within any of the foregoing ranges or a have a range of ratio of first segments to third segments encompassing any sub-range of the foregoing ranges.

The thermoplastic copolyester can a ratio of second segments to third segments from about 1:1 to about 1:2 based on the weight of each of the first segments and the third segments; about 1:1 to about 1:1.52 based on the weight of each of the first segments and the third segment; or a value or values of have a ratio of second segments to third segments within any of the foregoing ranges or a have a range of ratio of second segments to third segments encompassing any sub-range of the foregoing ranges.

The thermoplastic copolyester can have first segments derived from a poly(alkylene oxide)diol having a number-average molecular weight of about 250 Daltons to about 6000 Daltons; about 400 Daltons to about 6,000 Daltons; about 350 Daltons to about 5,000 Daltons; about 500 Daltons to about 3,000 Daltons; about 2,000 Daltons to about 3,000 Daltons; or a value or values of weight average molecular weight within any of the foregoing ranges or a weight average molecular weight range encompassing any sub-range of the foregoing ranges.

The thermoplastic copolyester can have first segments derived from a poly(alkylene oxide)diol such as poly(ethylene ether)diol; poly(propylene ether)diol; poly(tetramethylene ether)diol; poly(pentamethylene ether)diol; poly(hexamethylene ether)diol; poly(heptamethylene ether)diol; poly(octamethylene ether)diol; poly(nonamethylene ether)diol; poly(decamethylene ether)diol; or mixtures thereof. In a still further aspect, the thermoplastic copolyester can have first segments derived from a poly(alkylene oxide)diol such as poly(ethylene ether)diol; poly(propylene ether)diol; poly(tetramethylene ether)diol; poly(pentamethylene ether)diol; poly(hexamethylene ether)diol. In a yet further aspect, the thermoplastic copolyester can have first segments derived from a poly(tetramethylene ether)diol.

The thermoplastic copolyester can have second segments derived from a diol having a molecular weight of less than about 250. The diol from which the second segments are derived can be a C2-C8 diol. In a still further aspect, the second segments can be derived from ethanediol; propanediol; butanediol; pentanediol; 2-methyl propanediol; 2,2- dimethyl propanediol; hexanediol; 1,2-dihydroxy cyclohexane; 1,3-dihydroxy cyclohexane; 1,4-dihydroxy cyclohexane; and mixtures thereof. In a yet further aspect, the second segments can be derived from 1,2-ethanediol, 1,3-propanediol, 1,4-butanediol, 1,6-hexanediol, and mixtures thereof. In an even further aspect, the second segments can be derived from 1,2-ethanediol. In a still further aspect, the second segments can be derived from 1,4-butanediol.

The thermoplastic copolyester can have third segments derived from an aromatic C5-C16 dicarboxylic acid. The aromatic C5-C16 dicarboxylic acid can have a molecular weight less than about 300 Daltons; about 120 Daltons to about 200 Daltons; or a value or values of molecular weight within any of the foregoing ranges or a molecular weight range encompassing any sub-range of the foregoing ranges. In some instances, the aromatic C5-C16 dicarboxylic acid is terephthalic acid, phthalic acid, isophthalic acid, or a derivative thereof. In a still further aspect, the aromatic C5-C16 dicarboxylic acid is a diester derivative of the terephthalic acid, phthalic acid, or isophthalic acid. In a yet further aspect, the aromatic C5-C16 dicarboxylic acid is terephthalic acid or the dimethyl ester derivative thereof.

The thermoplastic copolyester can comprise: (a) a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a Formula 1:

(Formula 1)

wherein $R_1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and (b) a plurality of second copolyester units, each second copolyester unit of the plurality comprising the second segment derived from a diol and the third segment derived from an aromatic dicarboxylic acid, wherein the second copolyester unit has a structure represented by a Formula 2:

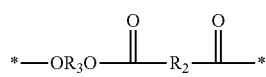

(Formula 2)

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment.

The thermoplastic copolyester can comprise a plurality of first copolyester units having a structure represented by a Formula 3:

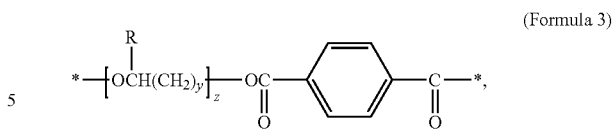

(Formula 3)

wherein R is H or methyl; wherein y is an integer having a value from 1 to 10; wherein z is an integer having a value from 2 to 60; and wherein a weight average molecular weight of each of the plurality of first copolyester units is from about 300 Daltons to about 7,000 Daltons. In some aspects, in the foregoing formula, y can be is an integer having a value of 1, 2, 3, 4, 5, 6, 7, 8, 9, 10; or y can be any set or range of the foregoing integer values. In some aspects, the foregoing formula, z is an integer having a value from 5 to 60; an integer having a value from 5 to 50; an integer having a value from 5 to 40; an integer having a value from 4 to 30; an integer having a value from 4 to 20; an integer having a value from 2 to 10; or z can be any set or range of the foregoing integer values. In some aspects, R is hydrogen. In a still further aspect, R is methyl. In some instances, R is hydrogen and y is an integer having a value of 1, 2, or 3. Alternatively, in other instances, R is methyl and y is an integer having a value of 1.

The thermoplastic copolyester can comprise a plurality of first copolyester units having a structure represented by a Formula 4:

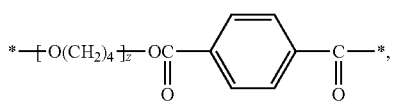

(Formula 4)

wherein z is an integer having a value from 2 to 60; and wherein a weight average molecular weight of each of the plurality of first copolyester units is from about 300 Daltons to about 7,000 Daltons. In some aspects, in the foregoing formula, y can be is an integer having a value of 1, 2, 3, 4, 5, 6, 7, 8, 9, 10; or y can be any set or range of the foregoing integer values. In some aspects, the foregoing formula, z is an integer having a value from 5 to 60; an integer having a value from 5 to 50; an integer having a value from 5 to 40; an integer having a value from 4 to 30; an integer having a value from 4 to 20; an integer having a value from 2 to 10; or z can be any integer value or set of integer values within the foregoing ranges or values, or any range of integer values encompassing a sub-range the foregoing integer value ranges.

The thermoplastic copolyester can comprise a plurality of first copolyester units having a weight average molecular weight from about 400 Daltons to about 6,000 Daltons; about 400 Daltons to about 5,000 Daltons; about 400 Daltons to about 4,000 Daltons; about 400 Daltons to about 3,000 Daltons; about 500 Daltons to about 6,000 Daltons; about 500 Daltons to about 5,000 Daltons; about 500 Daltons to about 4,000 Daltons; about 500 Daltons to about 3,000 Daltons; about 600 Daltons to about 6,000 Daltons; about 600 Daltons to about 5,000 Daltons; about 600 Daltons to about 4,000 Daltons; about 600 Daltons to about 3,000 Daltons; about 2,000 Daltons to about 3,000 Daltons; or a value or values of weight average molecular weight within any of the foregoing ranges or a weight average molecular weight range encompassing any sub-range of the foregoing ranges.

The thermoplastic copolyester can comprise a plurality of second copolyester units, each second copolyester unit of the plurality having represented by a Formula 5:

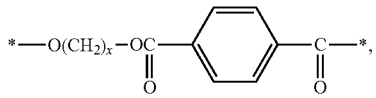
(Formula 5)

wherein x is an integer having a value from 1 to 20; wherein the foam article has a microcellular closed-cell or open-cell foam structure. In some aspects, in the foregoing formula, x is an integer having a value from 2 to 18; 2 to 17; 2 to 16; 2 to 15; 2 to 14; 2 to 13; 2 to 12; 2 to 11; 2 to 10; 2 to 9; 2 to 8; 2 to 7; 2 to 6; 2 to 5; 2 to 4; or x can be any integer value or set of integer values within the foregoing ranges or values, or any range of integer values encompassing a sub-range the foregoing integer value ranges. In a further aspect, x is an integer having a value of 2, 3, or 4.

The thermoplastic copolyester can comprise a plurality of second copolyester units, each second copolyester unit of the plurality having represented by a Formula 6:

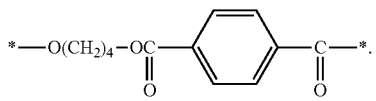
(Formula 6)

The thermoplastic copolyester can comprise a weight percent range of the plurality of first copolyester units based on total weight of the thermoplastic copolyester such that the weight percent range is about 30 weight percent to about 80 weight percent; about 40 weight percent to about 80 weight percent; about 50 weight percent to about 80 weight percent; about 30 weight percent to about 70 weight percent; about 40 weight percent to about 70 weight percent; about 50 weight percent to about 70 weight percent; about 40 weight percent to about 65 weight percent; about 45 weight percent to about 65 weight percent; about 50 weight percent to about 65 wt; about 55 weight percent to about 65 weight percent; about 40 weight percent to about 60 weight percent; about 45 weight percent to about 60 weight percent; about 50 weight percent to about 60 weight percent; about 55 weight percent to about 60 weight percent; or any weight percent value or set of weight percent values within any of the foregoing ranges of weight percent, or any range of weight percent values encompassing a sub-set of any of the foregoing ranges.

In some aspects, the thermoplastic copolyester can comprise phase separated domains. For example, a plurality of first segments derived from a dihydroxy-terminated polydiol can phase-separate into domains comprising primarily the first segments. Moreover, a plurality of second segments derived from a diol can phase-separate into domains comprising primarily the second segments. In other aspects, the thermoplastic copolyester can comprise phase-separated domains comprising primarily of a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a Formula 1:

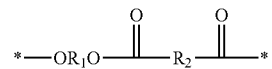
(Formula 1)

wherein $R_1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and other phase-separated domains comprising primarily of a plurality of second copolyester units, each second copolyester unit of the plurality comprising the second segment derived from a diol and the third segment derived from an aromatic dicarboxylic acid, wherein the second copolyester unit has a structure represented by a Formula 2:

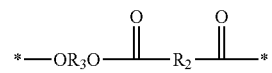
(Formula 2)

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment.

In other aspects, the thermoplastic copolyester can comprise phase-separated domains comprising primarily of a plurality of first copolyester units, each first copolyester unit of the plurality having a structure represented by a Formula 3:

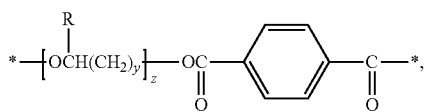
(Formula 3)

wherein R is H or methyl; wherein y is an integer having a value from 1 to 10; wherein z is an integer having a value from 2 to 60; and wherein a weight average molecular weight of each of the plurality of first copolyester units is from about 300 Daltons to about 7,000 Daltons. In some aspects, in the foregoing formula, y can be is an integer having a value of 1, 2, 3, 4, 5, 6, 7, 8, 9, 10; or y can be any set or range of the foregoing integer values. In some aspects, the foregoing formula, z is an integer having a value from 5 to 60; an integer having a value from 5 to 50; an integer having a value from 5 to 40; an integer having a value from 4 to 30; an integer having a value from 4 to 20; an integer having a value from 2 to 10; or z can be any set or range of the foregoing integer values. In some aspects, R is hydrogen. In a still further aspect, R is methyl. In some instances, R is hydrogen and y is an integer having a value of 1, 2, or 3. Alternatively, in other instances, R is methyl and y is an integer having a value of 1.

In other aspects, the thermoplastic copolyester can comprise phase-separated domains comprising primarily of a plurality of first copolyester units, each first copolyester unit of the plurality having a structure represented by a Formula 4:

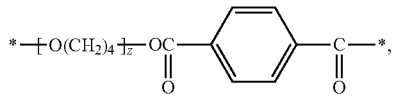

(Formula 4)

wherein z is an integer having a value from 2 to 60; and wherein a weight average molecular weight of each of the plurality of first copolyester units is from about 300 Daltons to about 7,000 Daltons. In some aspects, in the foregoing formula, y can be is an integer having a value of 1, 2, 3, 4, 5, 6, 7, 8, 9, 10; or y can be any set or range of the foregoing integer values. In some aspects, the foregoing formula, z is an integer having a value from 5 to 60; an integer having a value from 5 to 50; an integer having a value from 5 to 40; an integer having a value from 4 to 30; an integer having a value from 4 to 20; an integer having a value from 2 to 10; or z can be any integer value or set of integer values within the foregoing ranges or values, or any range of integer values encompassing a sub-range the foregoing integer value ranges.

The thermoplastic copolyester can comprise phase-separated domains comprising primarily of a plurality of first copolyester units having a weight average molecular weight from about 400 Daltons to about 6,000 Daltons; about 400 Daltons to about 5,000 Daltons; about 400 Daltons to about 4,000 Daltons; about 400 Daltons to about 3,000 Daltons; about 500 Daltons to about 6,000 Daltons; about 500 Daltons to about 5,000 Daltons; about 500 Daltons to about 4,000 Daltons; about 500 Daltons to about 3,000 Daltons; about 600 Daltons to about 6,000 Daltons; about 600 Daltons to about 5,000 Daltons; about 600 Daltons to about 4,000 Daltons; about 600 Daltons to about 3,000 Daltons; about 2,000 Daltons to about 3,000 Daltons; or a value or values of weight average molecular weight within any of the foregoing ranges or a weight average molecular weight range encompassing any sub-range of the foregoing ranges.

In other aspects, the thermoplastic copolyester can comprise phase-separated domains comprising a plurality of second copolyester units, each second copolyester unit of the plurality having represented by a Formula 5:

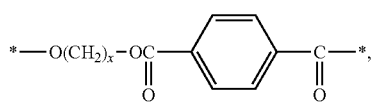

(Formula 5)

wherein x is an integer having a value from 1 to 20; wherein the foam article has a microcellular closed-cell or open-cell foam structure. In some aspects, in the foregoing formula, x is an integer having a value from 2 to 18; 2 to 17; 2 to 16; 2 to 15; 2 to 14; 2 to 13; 2 to 12; 2 to 11; 2 to 10; 2 to 9; 2 to 8; 2 to 7; 2 to 6; 2 to 5; 2 to 4; or x can be any integer value or set of integer values within the foregoing ranges or values, or any range of integer values encompassing a sub-range the foregoing integer value ranges. In a further aspect, x is an integer having a value of 2, 3, or 4.

In other aspects, the thermoplastic copolyester can comprise phase-separated domains comprising a plurality of second copolyester units, each second copolyester unit of the plurality having represented by a Formula 6:

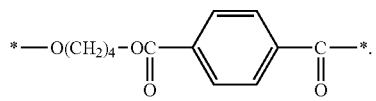

(Formula 6)

The thermoplastic copolyester can comprise phase-separated domains comprising a weight percent range of the plurality of first copolyester units based on total weight of the thermoplastic copolyester such that the weight percent range is about 30 weight percent to about 80 weight percent; about 40 weight percent to about 80 weight percent; about 50 weight percent to about 80 weight percent; about 30 weight percent to about 70 weight percent; about 40 weight percent to about 70 weight percent; about 50 weight percent to about 70 weight percent; about 40 weight percent to about 65 weight percent; about 45 weight percent to about 65 weight percent; about 50 weight percent to about 65 wt; about 55 weight percent to about 65 weight percent; about 40 weight percent to about 60 weight percent; about 45 weight percent to about 60 weight percent; about 50 weight percent to about 60 weight percent; about 55 weight percent to about 60 weight percent; or any weight percent value or set of weight percent values within any of the foregoing ranges of weight percent, or any range of weight percent values encompassing a sub-set of any of the foregoing ranges.

The disclosed thermoplastic copolyester composition, the polymeric component of the composition or an individual thermoplastic copolyester copolymer in neat form can be characterized by one or more properties. In some aspects, the thermoplastic copolyester composition or the polymeric component, or the polymer has a maximum load of about 10 newtons to about 100 newtons, or from about 15 newtons to about 50 newtons, or from about 20 newtons to about 40 newtons; or any load value or set of load values within any of the foregoing ranges of load value, or any range of load values encompassing a sub-set of any of the foregoing ranges, when determined using the Cyclic Tensile Test method described herein.

The tensile strength of the thermoplastic copolyester composition or of the component of the thermoplastic copolyester composition or of a thermoplastic copolyester copolymer in neat form is another important physical characteristic. The thermoplastic copolyester composition or component or copolymer can have a tensile strength of from 5 kilograms per square centimeter to 25 kilograms per square centimeter, or of from 10 kilograms per square centimeter to 23 kilograms per square centimeter, or of from 15 kilograms per square centimeter to 22 kilograms per square centimeter; or any load value or set of load values within any of the foregoing ranges of load value, or any range of load values encompassing a sub-set of any of the foregoing ranges, when determined using the Cyclic Tensile Test method described herein.

The thermoplastic copolyester composition or polymeric component of the thermoplastic copolyester composition or a thermoplastic copolyester copolymer in neat form can have a tensile modulus of about 2 megapascals to about 20 megapascals or from about 5 megapascals to about 15 megapascals when determined using the Cyclic Tensile Test method described herein; or any load value or set of load values within any of the foregoing ranges of load value, or any range of load values encompassing a sub-set of any of the foregoing ranges.

Exemplary, but non-limiting, thermoplastic polyester elastomers, including thermoplastic copolyesters, that can be used in the disclosed methods, foams, and articles include "HYTREL" 3078, "HYTREL" 4068, and "HYTREL" 4556 (DuPont, Wilmington, Delaware, USA); "PELPRENE" P30B, P40B, and P40H (Toyobo U.S.A. Inc., New York, New York, USA); "TRIEL" 5300, "TRIEL" 5400, and blends thereof (Samyang Corporation, Korea); "KEY-FLEX" BT1028D, BT1033D, BT1035D, BT1040D, BT1045D, and BT1047D (LG Chem, Korea); and "KOPEL" KP3340, KP3346, KP3347, KP3942 (Kolon Plastics, Inc., Korea).

The disclosed thermoplastic copolyester compositions can further include one or more ionomers, such as any of the "SURLYN" polymers (DuPont, Wilmington, Delaware, USA). Ionic foams described herein can be made by a process/method including receiving a composition described herein, and physically foaming the composition to form a thermoplastic copolyester foam having a density of about 0.7 gram per cubic centimeter or less, or 0.5 gram per cubic centimeter or less, or 0.4 gram per cubic centimeter or less, or 0.3 gram per cubic centimeter or less. The process can include blowing the composition to produce an article or component comprising the thermoplastic copolyester foam. In some examples, the process for forming the thermoplastic copolyester foam comprises injection molding a mixture including a composition as described herein and a supercritical fluid (e.g., supercritical carbon dioxide or supercritical nitrogen) in a mold, and removing the thermoplastic copolyester foam from the mold.

The disclosed thermoplastic copolyester compositions can further include one or more thermoplastic polyurethanes, such as "FORTIMO" (Mitsui Chemicals, Inc., Tokyo, Japan); "TEXIN" (Covestro LLC, Pittsburgh, Pennsylvania, USA); and "BOUNCELL-X" (Lubrizol Advanced Materials, Inc., Brecksville, Ohio, USA).

The disclosed thermoplastic copolyester compositions can further include one or more olefinic polymers. Olefinic polymers can include ethylene-based copolymers, propylene-based copolymers, and butene-based copolymers. In some aspects, the olefinic polymer is an ethylene-based copolymer such as a styrene-ethylene/butylene-styrene (SEBS) copolymer; an ethylene-propylene diene monomer (EPDM) copolymer; an ethylene-vinyl acetate (EVA) copolymer; an ethylene alkyl acrylate (EAA) copolymer; an ethylene alkyl methacrylate (EAMA) copolymer; any copolymer thereof, and any blend thereof. In some aspects, a ratio V of a total parts by weight of the olefinic polymers present in the composition to a total parts by weight of the thermoplastic copolyesters in the composition is about 0.0 to about 0.6, about 0.0 to about 0.4, about 0.01 to about 0.4, or about 0.01 to about 0.6, or about 0.1 to about 0.4.

The disclosed thermoplastic copolyester compositions can further include an ethylene-vinyl acetate (EVA) copolymer. The ethylene-vinyl acetate (EVA) copolymer can have a range of vinyl acetate contents, for example about 50 percent to about 90 percent, about 50 percent to about 80 percent, about 5 percent to about 50 percent, about 10 percent to about 45 percent, about 10 percent to about 30 percent, about 30 percent to about 45 percent, or about 20 percent to about 35 percent.

Second Polymeric Materials

Having described the foams and methods of forming them, we turn to the second polymeric material. According to the various aspects, the disclosed foam article has a second polymeric material disposed on at least one exterior surface of the foam. For example, the second polymeric material can be a polymeric layer or a polymeric coating or a polymeric film. In some aspects, the second polymeric material has a higher abrasion resistance than the foam component. The second polymeric material may be integral with the foam component, or may be a separate component that is operably coupled with the foam component, as described herein.

In some aspects, a second polymeric material includes at least 90 weight percent, or at least 95 weight percent, or at least 99 weight percent of the thermoplastic copolyester composition disclosed herein, based on the total weight of the second polymeric material. In some instances, the second polymeric material includes essentially only one or more disclosed thermoplastic copolyester compositions.

The second polymeric material can be disposed on at least one exterior surface of the foam. For example, where the foam article is a midsole, the second polymeric material can be on all or part of the ground-facing (bottom) surface of the midsole, or on all or part of a side surface of the midsole, or any combination thereof.

In certain aspects, the disclosed methods comprise forming the second polymeric material integrally with the first component. For example, the polymeric material for the first component, i.e., a disclosed thermoplastic copolyester, and the second polymeric material can be added to a mold sequentially during an injection molding process to provide a unitary component having a foam portion and a second polymeric material. In this aspect, a mold can be provided having a first mold portion having a mold surface. The second polymeric material can be added to the mold, so as to form a layer of second polymeric material on at least a portion of the mold surface. The polymeric material for the first component, i.e., a disclosed thermoplastic copolyester, can be injected into the mold containing the second polymeric material, and foamed while in contact with the second polymeric material. The resultant injection-molded component is a unitary component, with the second polymeric material bonded to the foam component. Alternatively or additionally, the second polymeric material can be disposed onto the exterior surface of the foam component during a compression molding step. For example, a foam component can be made such as by injection molding, and the foam component can thereafter be compression molded in a mold which includes the second polymeric material, and the second polymeric material bonds to the surface of the foam during the compression molding process.

The second polymeric material can be provided as a discrete layer or film to the injection mold or compression mold. For example, the layer or film forming the second polymeric material can be inserted into an injection mold and held in place against a target surface of the mold via vacuum ports, electrostatic charge or other method. The layer or film may be conformed to the target surface of the mold, for example, with the application of heat or vacuum before or after it is inserted into the mold. The thermoplastic polyester composition can then be injected into the mold containing the film, and foamed as described herein. As a result the second polymeric material of the layer or film becomes an integral part of the molded component.

Alternatively or additionally, the second polymeric material can be disposed onto the foam component after the foam component has been formed. According to some of the disclosed methods, the second polymeric material is provided as a layer or film that is provided separately from the foam component, and are thereafter operably coupled so that the second polymeric material forms a layer on the targeted portion of the exterior surface of the foam. The second polymeric material may be coupled with the exterior surface of a foam component or article using any suitable method. In an aspect, the second polymeric material may be adhesively laminated to the foam component. In another aspect, the second polymeric material may be coupled with the foam component such as by thermally laminating to an exterior surface of the foam. For example, heat may be applied to an exterior surface of the foam component, to a surface of the second polymeric material, or both, to soften or melt the respective heated surface(s), and the two surfaces may be joined when one or both are in the softened or melted state. In an aspect, the second polymeric material may be coupled with the foam component using a flame lamination process.

The second polymeric material can be provided as a polymeric coating. For example, a polymeric coating can be formed by applying a liquid polymeric material onto the foam component, such as by spraying, dip coating, tumble-coating, brushing, or a combination thereof. The liquid polymeric material can then be dried or cured while in contact with the midsole.

The polymeric coating can be formed by applying a powered polymeric material onto the foam component, such as by spraying, powder-coating, electrostatically coating, tumble-coating, or a combination thereof. In some aspects, an adhesive could be used to affix the powder to the midsole, and/or a coating can be applied over the powder to hold it in place on the foam component. Once the powder is affixed to the midsole, it can be left in the form of a powder, or it can be treated so as to form a more uniform coating, such as by heating it to melt it, by applying a solvent to solubilize it, etc.

Alternatively, the second polymeric material can take the form of a separate element which is applied to all or a portion of an exterior surface of the foam component when incorporating the midsole into an article of footwear. For example, the foam component can be a midsole component of an article of footwear, and the second polymeric material can be a rand or foxing tape applied around a perimeter of the midsole. The second polymeric material can be an extension of an outsole covering all or a portion of the bottom surface of the midsole, and which wraps up and covers at least a portion of the sidewall of the midsole. The second polymeric material can be the "shell" portion of a core-shell sole structure, which covers both the bottom surface and the sidewalls of the midsole, and which is attached to the upper of the article of footwear.

The resulting article comprising the first component with the second polymeric material can be characterized by good bonding strength between the second polymeric material and the foam component. The ply adhesion strength between the second polymeric material and the foam component is greater than 2.5 kg force/centimeter or greater than 3.0 kg force/centimeter, when determined using the Ply Adhesion Test method described herein.

Second Polymeric Material Properties

The disclosed second polymeric material can be characterized by one or more properties. In some aspects, the second polymeric material or resin has a maximum load of about 10 newtons to about 100 newtons, or from about 15 newtons to about 50 newtons, or from about 20 newtons to about 40 newtons; or any load value or set of load values within any of the foregoing ranges of load value, or any range of load values encompassing a sub-set of any of the foregoing ranges, when determined using the Cyclic Tensile Test method described herein.

The tensile strength of the second polymeric material or resin is another important physical characteristic. The second polymeric material or resin can have a tensile strength of from 5 kilograms per square centimeter to 25 kilograms per square centimeter, or of from 10 kilograms per square centimeter to 23 kilograms per square centimeter, or of from 15 kilograms per square centimeter to 22 kilograms per square centimeter; or any load value or set of load values within any of the foregoing ranges of load value, or any range of load values encompassing a sub-set of any of the foregoing ranges, when determined using the Cyclic Tensile Test method described herein.

The second polymeric material or resin can have a tensile modulus of about 2 megapascals to about 20 megapascals or from about 5 megapascals to about 15 megapascals when determined using the Cyclic Tensile Test method described herein; or any load value or set of load values within any of the foregoing ranges of load value, or any range of load values encompassing a sub-set of any of the foregoing ranges.

The second polymeric material can have an Akron abrasion of less than 0.50 cubic centimeters lost, optionally less than 0.40 cubic centimeters lost, less than 0.30 cubic centimeters lost, less than 0.20 cubic centimeters lost, or less than 0.10 cubic centimeters lost as determined using the Akron Abrasion Test. The second polymeric material can have an Akron abrasion of about 0.05 cubic centimeters lost, about 0.10 cubic centimeters lost, about 0.15 cubic centimeters lost, about 0.20 cubic centimeters lost, about 0.25 cubic centimeters lost, about 0.30 cubic centimeters lost, about 0.35 cubic centimeters lost, about 0.40 cubic centimeters lost, about 0.45 cubic centimeters lost, or about 0.50 cubic centimeters lost as determined using the Akron Abrasion Test, any range of abrasion values encompassed by any of the foregoing values, or any combination of the foregoing abrasion values.

The second polymeric material can have an Akron abrasion of less than 500 milligrams lost, optionally less than 400 milligrams lost, less than 300 milligrams lost, less than 200 milligrams lost, or less than 100 milligrams lost as determined using the Akron Abrasion Test. The second polymeric material can have an Akron abrasion of about 50 milligrams lost, about 100 milligrams lost, about 150 milligrams lost, about 200 milligrams lost, about 250 milligrams lost, about 300 milligrams lost, about 350 milligrams lost, about 400 milligrams lost, about 450 milligrams lost, or about 500 milligrams lost as determined using the Akron Abrasion Test, any range of abrasion values encompassed by any of the foregoing values, or any combination of the foregoing abrasion values.

The second polymeric material can have a DIN abrasion of less than 0.30 cubic centimeters lost, optionally less than 0.20 cubic centimeters lost, less than 0.10 cubic centimeters lost, less than 0.05 cubic centimeters lost, or less than 0.03 cubic centimeters lost as determined using the DIN Abrasion Test. The second polymeric material can have a DIN abrasion of about 0.01 cubic centimeters lost, about 0.05 cubic centimeters lost, about 0.10 cubic centimeters lost, about 0.15 cubic centimeters lost, about 0.20 cubic centimeters lost, about 0.25 cubic centimeters lost, or about 0.30 cubic centimeters lost as determined using the DIN Abrasion Test, any range of abrasion values encompassed by any of the foregoing values, or any combination of the foregoing abrasion values.

The second polymeric material can have a DIN abrasion of less than 300 milligrams lost, optionally less than 250 milligrams lost, optionally less than 200 milligrams lost, optionally less than 150 milligrams lost, optionally less than 100 milligrams lost, optionally less than 80 milligrams lost, optionally less than 50 milligrams lost, or optionally less than 30 milligrams as determined using the DIN Abrasion Test. The second polymeric material can have a DIN abrasion of about 10 milligrams lost, about 50 milligrams lost, about 100 milligrams lost, about 150 milligrams lost, about 200 milligrams lost, about 250 milligrams lost, or about 300 milligrams lost as determined using the DIN Abrasion Test, any range of abrasion values encompassed by any of the foregoing values, or any combination of the foregoing abrasion values.

The second polymeric material can have described herein when incorporated into an article the product has improved traction properties. In one aspect, the coefficient of friction of the second polymeric material can be used to measure traction properties.

The second polymeric material can have a dry dynamic coefficient of friction (COF) on a dry surface (e.g., a smooth, flat, or textured surface such as, for example, wooden parquet court, concrete, asphalt, laminate, brick, or ceramic tile) of greater than 0.5, optionally of greater than 0.7, greater than 0.8, greater than 0.9, greater than 1.0, as determined using the Dry Outsole Coefficient of Friction Test. The second polymeric material can have a dry dynamic COF of greater than 0.15, optionally of greater than 0.2, greater than 0.25, or greater than 0.3, using the Dry Upper Coefficient of Friction Test.

The second polymeric material can have a wet dynamic COF of greater than 0.25, optionally of greater than 0.30, greater than 0.35, greater than 0.40, or greater than 0.50, as determined using the Wet Outsole Coefficient of Friction Test. The second polymeric material can have a wet dynamic COF of greater than 0.15, optionally of greater than 0.2, greater than 0.25, or greater than 0.3, using the Wet Upper Coefficient of Friction Test.

It may be desirable for the dynamic coefficient of friction for the same dry and wet surface (e.g., smooth concrete or court) to be as close as possible. In one aspect, the difference between the dynamic coefficient of friction of the dry surface and the wet surface is less than 15 percent. In another aspect, the difference between the dynamic coefficient of friction of the dry surface and the wet surface is about 0 percent, about 1 percent, about 2 percent, about 3 percent, about 4 percent, about 5 percent, about 6 percent, about 7 percent, about 8 percent, about 9 percent, about 10 percent, about 11 percent, about 12 percent, about 13 percent, about 14 percent, or about 15 percent, any range of percentage values encompassed by any of the foregoing values, or any combination of the foregoing percentage values.

The second polymeric material can have a melting temperature from about 100 degrees C. to about 210 degrees C., optionally from about 110 degrees C. to about 195 degrees C., from about 120 degrees C. to about 180 degrees C., or from about 120 degrees C. to about 170 degrees C. The second polymeric material can have a melting temperature of about 100 degrees C., about 115 degrees C., about 120 degrees C., about 125 degrees C., about 130 degrees C., about 135 degrees C., about 140 degrees C., about 145 degrees C., about 150 degrees C., about 155 degrees C., about 160 degrees C., about 165 degrees C., about 170 degrees C., about 175 degrees C., about 180 degrees C., about 185 degrees C., about 190 degrees C., about 195 degrees C., about 200 degrees C., about 205 degrees C., or about 210 degrees C., any range of melting or deformation temperature values encompassed by any of the foregoing values, or any combination of the foregoing melting temperature values.

The second polymeric material can have a melt flow rate of at least 0.2 grams per 10 minutes, optionally at least 5, at least 10, at least 15, at least 20, at least 25, at least 30, at least 40, or at least 50 grams per 10 minutes, as determined using ASTM D1238-13 at 160 degrees C. using a weight of 2.16 kg. The second polymeric material can have a melt flow rate of at least 0.2 grams per 10 minutes, optionally at least 5, at least 10, at least 15, at least 20, at least 25, at least 30, at least 40, or at least 50 grams per 10 minutes, as determined using ASTM D1238-13 at 200 degrees C. using a weight of 10 kg.

The second polymeric material can have a melting temperature from about 100 degrees C. to about 210 degrees C., optionally from about 110 degrees C. to about 195 degrees C., from about 120 degrees C. to about 180 degrees C., or from about 120 degrees C. to about 170 degrees C. The second polymeric material can have a melting temperature of about 100 degrees C., about 115 degrees C., about 120 degrees C., about 125 degrees C., about 130 degrees C., about 135 degrees C., about 140 degrees C., about 145 degrees C., about 150 degrees C., about 155 degrees C., about 160 degrees C., about 165 degrees C., about 170 degrees C., about 175 degrees C., about 180 degrees C., about 185 degrees C., about 190 degrees C., about 195 degrees C., about 200 degrees C., about 205 degrees C., or about 210 degrees C., any range of melting or deformation temperature values encompassed by any of the foregoing values, or any combination of the foregoing melting temperature values.

The second polymeric material can have a melt flow index of from about 5 to about 40, or about 10 to about 20, or about 20 to about 30 as determined at 210 degrees C. using a 2.16 kilogram weight. Alternatively or additionally, the second polymeric material can have a melt flow index of from about 5 to about 40, or about 10 about 20, or about 20 to about 30 as determined at 220 degrees C. using a 2.16 kilogram weight. Alternatively or additionally, the second polymeric material can have a melt flow index of from about 5 to about 40, or about 10 to about 20, or about 20 to about 30 as determined at 230 degrees C. using a 2.16 kilogram weight.

The second polymeric material can have a durometer Shore A hardness of less than 90 or less than 85 or less than 80. The second polymeric material can have a durometer Shore A hardness of greater than 60 or greater than 65. The second polymeric material can have a durometer Shore A hardness of about 50 to about 90 Shore A, optionally from about 55 to about 85 Shore A, from about 60 to about 80 Shore A, or from about 60 to about 70 Shore A. The second polymeric material can have a durometer Shore A hardness of about 50 A, about 55 A, about 60 A, about 65 A, about 70 A, about 75 A, about 80 A, about 85 A, or about 90 A, any range of Shore A hardness values encompassed by any of the foregoing values, or any combination of the foregoing Shore A hardness values.

The second polymeric material can have a specific gravity from about 0.8 to about 1.5, optionally from about 0.85 to about 1.30, or from about 0.88 to about 1.20. In another aspect when thermoformed, the first thermoplastic composition of the film, fibers, filaments, and yarn has a specific gravity of about 0.8, about 0.85, about 0.9, about 0.95, about 1.1, about 1.15, about 1.2, about 1.25, about 1.3, about 1.35, about 1.40, about 1.45, or about 1.5, any range of specific gravity values encompassed by any of the foregoing values, or any combination of the foregoing specific gravity values.

The second polymeric material can have two or more of the first properties, or optionally three or more, four or more, five or more, six or more, seven or more, or all ten first properties provided above.

In addition to the first properties, the second polymeric material can have one or more second properties. The second polymeric material can have a glass transition temperature less than 50 degrees C., optionally less than 30 degrees C., less than 0 degrees C., less than −10 degrees C., or less than −20 degrees C. The second polymeric material can have a stress at break greater than 7 megapascals, optionally greater than 8 megapascals, or greater than 8 megapascals as determined using ASTM DE-412 at 25 degrees C. The second polymeric material can have a tensile stress at 300 percent modulus greater than 2 megapascals, optionally greater than 2.5 megapascals, or greater than 3 megapascals as determined using ASTM DE-412 at 25 degrees C. The second polymeric material can have an elongation at break greater than 450 percent, optionally greater than 500 percent, or greater than 550 percent as determined using ASTM DE-412 at 25 degrees C. The second polymeric material can have two or more of the second properties, or optionally three or more, or all four second properties.

The second polymeric material includes at least one polymer. The second polymeric material can be a thermoplastic material. Alternatively, the second polymeric material can be a thermoset material. The second polymeric material can comprise a thermoplastic elastomer or thermoplastic vulcanizate material for use a type of ground contact, reinforcing skin, containment layer, outsole, rand, or other application.

The second polymeric material can comprise at least one thermoplastic polyester, including at least one thermoplastic copolyester. The second polymeric material can include one or more thermoplastic copolyesters, or can be substantially free of thermoplastic copolyesters. The thermoplastic copolyester can be any of the thermoplastic copolyester compositions disclosed herein.

Thermoplastic Elastomers

The second polymeric materials described herein can comprise one or more thermoplastic elastomers. Exemplary thermoplastic elastomers include homo-polymers and co-polymers. The thermoplastic elastomer can be a random co-polymer. The thermoplastic elastomer can be a block co-polymer. The term "polymer" refers to a polymerized molecule having one or more monomer species, and includes homopolymers and copolymers. The term "copolymer" refers to a polymer having two or more monomer species, and includes terpolymers (i.e., copolymers having three monomer species). For example, the thermoplastic elastomer can be a block co-polymer having repeating blocks of polymeric units of the same chemical structure (segments) which are relatively harder (hard segments), and repeating blocks of polymeric segments which are relatively softer (soft segments). In various aspects, in block co-polymers, including block co-polymers having repeating hard segments and soft segments, physical crosslinks can be present within the blocks or between the blocks or both within and between the blocks. Particular examples of hard segments include isocyanate segments and polyamide segments. Particular examples of soft segments include polyether segments and polyester segments. As used herein, the polymeric segment can be referred to as being a particular type of polymeric segment such as, for example, an isocyanate segment, a polyamide segment, a polyether segment, a polyester segment, and the like. It is understood that the chemical structure of the segment is derived from the described chemical structure. For example, an isocyanate segment is a polymerized unit including an isocyanate functional group. When referring to a block of polymeric segments of a particular chemical structure, the block can contain up to 10 mol percent of segments of other chemical structures. For example, as used herein, a polyether segment is understood to include up to 10 mol percent of non-polyether segments.

The thermoplastic elastomer can include one or more of a thermoplastic copolyester elastomer, a thermoplastic polyether block amide elastomer, a thermoplastic polyurethane elastomer, a polyolefin based-copolymer elastomer, a thermoplastic styrenic copolymer elastomer, a thermoplastic ionomer elastomer, or any combination thereof. It should be understood that other thermoplastic polymeric materials not specifically described below are also contemplated for use in the coated fiber as described herein and/or the an uncoated fiber. The thermoplastic elastomer can have a melting temperature greater than about 110 degrees centigrade and less than about 170 degrees centigrade. The thermoplastic elastomer can have a melting temperature of about 110 degrees centigrade, about 115 degrees centigrade, about 120 degrees centigrade, about 125 degrees centigrade, about 125 degrees centigrade, about 130 degrees centigrade, about 135 degrees centigrade, about 140 degrees centigrade, about 145 degrees centigrade, about 150 degrees centigrade, about 155 degrees centigrade, about 160 degrees centigrade, about 165 degrees centigrade, or about 170 degrees centigrade, any range of melting temperature values encompassed by any of the foregoing values, or any combination of the foregoing melting temperature values.

The thermoplastic elastomer can have a glass transition temperature ($T_g$) less than 50 degrees C. when determined in accordance with ASTM D3418-97 as described herein below. The thermoplastic elastomer has a glass transition temperature ($T_g$) of about −20 degrees C., about −19 degrees C., about −18 degrees C., about −17 degrees C., about −16 degrees C., about −15 degrees C., about −14 degrees C., about −13 degrees C., about −12 degrees C., about −10 degrees C., about −9 degrees C., about −8 degrees C., about −7 degrees C., about −6 degrees C., about −5 degrees C., about −4 degrees C., about −3 degrees C., about −2 degrees C., about −1 degrees C., about 0 degrees C., about 1 degrees C., about 2 degrees C., about 3 degrees C., about 4 degrees C., about 5 degrees C., about 6 degrees C., about 7 degrees C., about 8 degrees C., about 9 degrees C., about 10 degrees C., about 11 degrees C., about 12 degrees C., about 13 degrees C., about 14 degrees C., about 15 degrees C., about 16 degrees C., about 17 degrees C., about 18 degrees C., about 19 degrees C., about 20 degrees C., about 21 degrees C., about 22 degrees C., about 23 degrees C., about 24 degrees C., about 25 degrees C., about 26 degrees C., about 27 degrees C., about 28 degrees C., about 29 degrees C., about 30 degrees C., about 31 degrees C., about 32 degrees C., about 33 degrees C., about 34 degrees C., about 35 degrees C., about 36 degrees C., about 37 degrees C., about 38 degrees C., about 39 degrees C., about 40 degrees C., about 41 degrees C., about 42 degrees C., about 43 degrees C., about 44 degrees C., about 45 degrees C., about 46 degrees C., about 47 degrees C., about 48 degrees C., about 49 degrees C., or about 50 degrees C., any range of glass transition temperature values encompassed by any of the foregoing values, or any combination of the foregoing glass transition temperature values, when determined in accordance with ASTM D3418-97 as described herein below.

Thermoplastic Polyurethane Elastomers

The thermoplastic elastomer can be a thermoplastic polyurethane elastomer. The thermoplastic polyurethane elastomer can be a thermoplastic block polyurethane co-polymer. The thermoplastic block polyurethane co-polymer can be a block copolymer having blocks of hard segments and blocks of soft segments. The hard segments can comprise or consist of isocyanate segments. The soft segments can comprise or consist of polyether segments, or polyester segments, or a combination of polyether segments and polyester segments. The thermoplastic material can comprise or consist essentially of an elastomeric thermoplastic polyurethane having repeating blocks of hard segments and repeating blocks of soft segments.

One or more of the thermoplastic polyurethane elastomer can be produced by polymerizing one or more isocyanates with one or more polyols to produce copolymer chains having carbamate linkages (—N(CO)O—) as illustrated below in Formula 7 below,

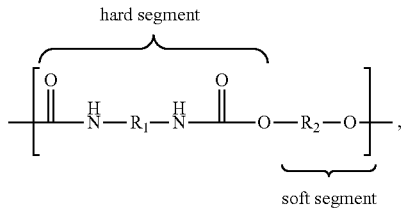

(Formula 7)

where the isocyanate(s) each preferably include two or more isocyanate (—NCO) groups per molecule, such as 2, 3, or 4 isocyanate groups per molecule (although, single-functional isocyanates can also be optionally included, e.g., as chain terminating units). In these aspects, each $R_1$ and $R_2$ independently is an aliphatic or aromatic segment. Optionally, each $R_2$ can be a hydrophilic segment.

Unless otherwise indicated, any of the functional groups or chemical compounds described herein can be substituted or unsubstituted. A "substituted" group or chemical compound, such as an alkyl, alkenyl, alkynyl, cycloalkyl, cycloalkenyl, aryl, heteroaryl, alkoxyl, ester, ether, or carboxylic ester refers to an alkyl, alkenyl, alkynyl, cycloalkyl, cycloalkenyl, aryl, heteroaryl, alkoxyl, ester, ether, or carboxylic ester group, has at least one hydrogen radical that is substituted with a non-hydrogen radical (i.e., a substituent). Examples of non-hydrogen radicals (or substituents) include, but are not limited to, alkyl, cycloalkyl, alkenyl, cycloalkenyl, alkynyl, ether, aryl, heteroaryl, heterocycloalkyl, hydroxyl, oxy (or oxo), alkoxyl, ester, thioester, acyl, carboxyl, cyano, nitro, amino, amido, sulfur, and halo. When a substituted alkyl group includes more than one non-hydrogen radical, the substituents can be bound to the same carbon or two or more different carbon atoms.

Additionally, the isocyanates can also be chain extended with one or more chain extenders to bridge two or more isocyanates. This can produce polyurethane copolymer chains as illustrated below in Formula 8,

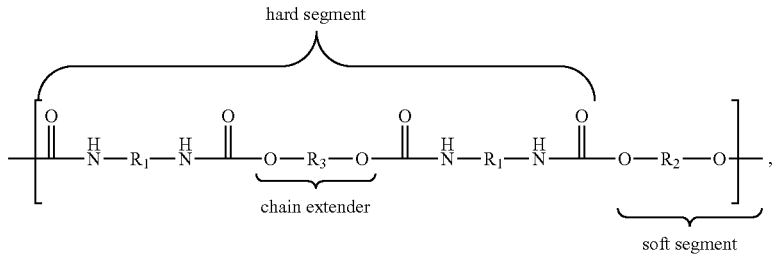

(Formula 8)

wherein $R_3$ includes the chain extender. As with each $R_1$ and $R_3$, each $R_3$ independently is an aliphatic or aromatic segment.

Each segment $R_1$, or the first segment, in Formulas 7 and 8 can independently include a linear or branched $C_{3-30}$ segment, based on the particular isocyanate(s) used, and can be aliphatic, aromatic, or include a combination of aliphatic portions(s) and aromatic portion(s). The term "aliphatic" refers to a saturated or unsaturated organic molecule that does not include a cyclically conjugated ring system having delocalized pi electrons. In comparison, the term "aromatic" refers to a cyclically conjugated ring system having delocalized pi electrons, which exhibits greater stability than a hypothetical ring system having localized pi electrons.

Each segment $R_1$ can be present in an amount of 5 percent to 85 percent by weight, from 5 percent to 70 percent by weight, or from 10 percent to 50 percent by weight, based on the total weight of the reactant monomers.

In aliphatic aspects (from aliphatic isocyanate(s)), each segment $R_1$ can include a linear aliphatic group, a branched aliphatic group, a cycloaliphatic group, or combinations thereof. For instance, each segment $R_1$ can include a linear or branched $C_{3-20}$ alkylene segment (e.g., $C_{4-15}$ alkylene or $C_{6-10}$ alkylene), one or more $C_{3-8}$ cycloalkylene segments (e.g., cyclopropyl, cyclobutyl, cyclopentyl, cyclohexyl, cycloheptyl, or cyclooctyl), and combinations thereof.

Examples of suitable aliphatic diisocyanates for producing the polyurethane copolymer chains include hexamethylene diisocyanate (HDI), isophorone diisocyanate (IPDI), butylenediisocyanate (BDI), bisisocyanatocyclohexylmethane (HMDI), 2,2,4-trimethylhexamethylene diisocyanate (TMDI), bisisocyanatomethylcyclohexane, bisisocyanatomethyltricyclodecane, norbornane diisocyanate (NDI), cyclohexane diisocyanate (CHDI), 4,4'-dicyclohexylmethane diisocyanate (H12MDI), diisocyanatododecane, lysine diisocyanate, and combinations thereof.

In aromatic aspects (from aromatic isocyanate(s)), each segment $R_1$ can include one or more aromatic groups, such as phenyl, naphthyl, tetrahydronaphthyl, phenanthrenyl, biphenylenyl, indanyl, indenyl, anthracenyl, and fluorenyl. Unless otherwise indicated, an aromatic group can be an unsubstituted aromatic group or a substituted aromatic group, and can also include heteroaromatic groups. "Heteroaromatic" refers to monocyclic or polycyclic (e.g., fused bicyclic and fused tricyclic) aromatic ring systems, where one to four ring atoms are selected from oxygen, nitrogen, or sulfur, and the remaining ring atoms are carbon, and where the ring system is joined to the remainder of the molecule by any of the ring atoms. Examples of suitable heteroaryl groups include pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl.

Examples of suitable aromatic diisocyanates for producing the polyurethane copolymer chains include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4,4'-diisocyanate (DDDI), 4,4'-dibenzyl diisocyanate (DBDI), 4-chloro-1,3-phenylene diisocyanate, and combinations thereof. In some aspects, the copolymer chains are substantially free of aromatic groups.

The polyurethane copolymer chains can be produced from diisocyanates including HMDI, TDI, MDI, $H_{12}$ aliphatics, and combinations thereof. For example, the coated fiber as described herein of the present disclosure can comprise one or more polyurethane copolymer chains are produced from diisocynates including HMDI, TDI, MDI, $H_{12}$ aliphatics, and combinations thereof.

In certain aspects, polyurethane chains which are crosslinked (e.g., partially crosslinked polyurethane copolymers which retain thermoplastic properties) or which can be crosslinked, can be used in accordance with the present disclosure. It is possible to produce crosslinked or crosslinkable polyurethane copolymer chains using multi-functional isocyanates. Examples of suitable triisocyanates for producing the polyurethane copolymer chains include TDI, HDI, and IPDI adducts with trimethyloylpropane (TMP), uretdiones (i.e., dimerized isocyanates), polymeric MDI, and combinations thereof.

Segment $R_3$ in Formula 8 can include a linear or branched $C_2$-$C_{10}$ segment, based on the particular chain extender polyol used, and can be, for example, aliphatic, aromatic, or polyether. Examples of suitable chain extender polyols for producing the polyurethane copolymer chains include ethylene glycol, lower oligomers of ethylene glycol (e.g., diethylene glycol, triethylene glycol, and tetraethylene glycol), 1,2-propylene glycol, 1,3-propylene glycol, lower oligomers of propylene glycol (e.g., dipropylene glycol, tripropylene glycol, and tetrapropylene glycol), 1,4-butylene glycol, 2,3-butylene glycol, 1,6-hexanediol, 1,8-octanediol, neopentyl glycol, 1,4-cyclohexanedimethanol, 2-ethyl-1,6-hexanediol, 1-methyl-1,3-propanediol, 2-methyl-1,3-propanediol, dihydroxyalkylated aromatic compounds (e.g., bis (2-hydroxyethyl) ethers of hydroquinone and resorcinol, xylene-α,α-diols, bis(2-hydroxyethyl) ethers of xylene-α,α-diols, and combinations thereof.

Segment $R_2$ in Formulas 7 and 8 can include a polyether group, a polyester group, a polycarbonate group, an aliphatic group, or an aromatic group. Each segment $R_2$ can be present in an amount of 5 percent to 85 percent by weight, from 5 percent to 70 percent by weight, or from 10 percent to 50 percent by weight, based on the total weight of the reactant monomers.

Optionally, in some examples, the thermoplastic polyurethane elastomer can be a thermoplastic polyurethane having relatively high degree of hydrophilicity. For example, the thermoplastic polyurethane can be a thermoplastic polyether polyurethane in which segment $R_2$ in Formulas 7 and 8 includes a polyether group, a polyester group, a polycarbonate group, an aliphatic group, or an aromatic group, wherein the aliphatic group or aromatic group is substituted with one or more pendant group having relatively greater degree of hydrophilicity (i.e., relatively "hydrophilic" groups). The relatively "hydrophilic" groups can be selected from the group consisting of hydroxyl, polyether, polyester, polylactone (e.g., polyvinylpyrrolidone (PVP)), amino, carboxylate, sulfonate, phosphate, ammonium (e.g., tertiary and quaternary ammonium), zwitterion (e.g., a betaine, such as poly(carboxybetaine (pCB) and ammonium phosphonates such as phosphatidylcholine), and combinations thereof. In such examples, this relatively hydrophilic group or segment of $R_2$ can form portions of the polyurethane backbone, or can be grafted to the polyurethane backbone as a pendant group. In some examples, the pendant hydrophilic group or segment can be bonded to the aliphatic group or aromatic group through a linker. Each segment $R_2$ can be present in an amount of 5 percent to 85 percent by weight, from 5 percent to 70 percent by weight, or from 10 percent to 50 percent by weight, based on the total weight of the reactant monomers.

In some examples, at least one $R_2$ segment of the thermoplastic polyurethane elastomer includes a polyether segment (i.e., a segment having one or more ether groups). Suitable polyethers include, but are not limited to polyethylene oxide (PEO), polypropylene oxide (PPO), polytetrahydrofuran (PTHF), polytetramethylene oxide (P$T_m$O), and combinations thereof. The term "alkyl" as used herein refers to straight chained and branched saturated hydrocarbon groups containing one to thirty carbon atoms, for example, one to twenty carbon atoms, or one to ten carbon atoms. The term $C_n$ means the alkyl group has "n" carbon atoms. For example, $C_4$ alkyl refers to an alkyl group that has 4 carbon atoms. $C_{1-7}$ alkyl refers to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Non-limiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group.

In some examples of the thermoplastic polyurethane elastomer, the at least one $R_2$ segment includes a polyester segment. The polyester segment can be derived from the polyesterification of one or more dihydric alcohols (e.g., ethylene glycol, 1,3-propylene glycol, 1,2-propylene glycol, 1,4-butanediol, 1,3-butanediol, 2-methylpentanediol-1,5,diethylene glycol, 1,5-pentanediol, 1,5-hexanediol, 1,2-dodecanediol, cyclohexanedimethanol, and combinations thereof) with one or more dicarboxylic acids (e.g., adipic acid, succinic acid, sebacic acid, suberic acid, methyladipic acid, glutaric acid, pimelic acid, azelaic acid, thiodipropionic acid and citraconic acid and combinations thereof). The polyester also can be derived from polycarbonate prepolymers, such as poly(hexamethylene carbonate) glycol, poly (propylene carbonate) glycol, poly(tetramethylene carbonate)glycol, and poly(nonanemethylene carbonate) glycol. Suitable polyesters can include, for example, polyethylene adipate (PEA), poly(1,4-butylene adipate), poly(tetramethylene adipate), poly(hexamethylene adipate), polycaprolactone, polyhexamethylene carbonate, poly(propylene carbonate), poly(tetramethylene carbonate), poly (nonanemethylene carbonate), and combinations thereof.

In various of the thermoplastic polyurethane elastomer, at least one $R_2$ segment includes a polycarbonate segment. The polycarbonate segment can be derived from the reaction of one or more dihydric alcohols (e.g., ethylene glycol, 1,3-propylene glycol, 1,2-propylene glycol, 1,4-butanediol, 1,3-butanediol, 2-methylpentanediol-1,5, diethylene glycol, 1,5-pentanediol, 1,5-hexanediol, 1,2-dodecanediol, cyclohexanedimethanol, and combinations thereof) with ethylene carbonate.

In various examples of the thermoplastic polyurethane elastomer, at least one $R_2$ segment can include an aliphatic group substituted with one or more groups having a relatively greater degree of hydrophilicity, i.e., a relatively "hydrophilic" group. The one or more relatively hydrophilic group can be selected from the group consisting of hydroxyl, polyether, polyester, polylactone (e.g., polyvinylpyrrolidone), amino, carboxylate, sulfonate, phosphate, ammonium (e.g., tertiary and quaternary ammonium), zwitterion (e.g., a betaine, such as poly(carboxybetaine (pCB) and ammonium phosphonates such as phosphatidylcholine), and combinations thereof. In some examples, the aliphatic group is linear and can include, for example, a $C_{1-20}$ alkylene chain or a $C_{1-20}$ alkenylene chain (e.g., methylene, ethylene, propylene, butylene, pentylene, hexylene, heptylene, octylene, nonylene, decylene, undecylene, dodecylene, tridecylene, ethenylene, propenylene, butenylene, pentenylene, hexenylene, heptenylene, octenylene, nonenylene, decenylene, undecenylene, dodecenylene, tridecenylene). The term "alkylene" refers to a bivalent hydrocarbon. The term $C_n$ means the alkylene group has "n" carbon atoms. For example, 01-6 alkylene refers to an alkylene group having, e.g., 1, 2, 3, 4, 5, or 6 carbon atoms. The term "alkenylene" refers to a bivalent hydrocarbon having at least one double bond.

In some cases, at least one $R_2$ segment includes an aromatic group substituted with one or more relatively hydrophilic group. The one or more hydrophilic group can be selected from the group consisting of hydroxyl, polyether, polyester, polylactone (e.g., polyvinylpyrrolidone), amino, carboxylate, sulfonate, phosphate, ammonium (e.g., tertiary and quaternary ammonium), zwitterionic (e.g., a betaine, such as poly(carboxybetaine (pCB) and ammonium phosphonate groups such as phosphatidylcholine), and combinations thereof. Suitable aromatic groups include, but are not limited to, phenyl, naphthyl, tetrahydronaphthyl, phenanthrenyl, biphenylenyl, indanyl, indenyl, anthracenyl, fluorenylpyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl groups, and combinations thereof.

The aliphatic and aromatic groups can be substituted with one or more pendant relatively hydrophilic and/or charged groups. The pendant hydrophilic group can include one or more (e.g., 2, 3, 4, 5, 6, 7, 8, 9, 10 or more) hydroxyl groups. The pendant hydrophilic group includes one or more (e.g., 2, 3, 4, 5, 6, 7, 8, 9, 10 or more) amino groups. In some cases, the pendant hydrophilic group includes one or more (e.g., 2, 3, 4, 5, 6, 7, 8, 9, 10 or more) carboxylate groups. For example, the aliphatic group can include one or more polyacrylic acid group. In some cases, the pendant hydrophilic group includes one or more (e.g., 2, 3, 4, 5, 6, 7, 8, 9, 10 or more) sulfonate groups. In some cases, the pendant hydrophilic group includes one or more (e.g., 2, 3, 4, 5, 6, 7, 8, 9, 10 or more) phosphate groups. In some examples, the pendant hydrophilic group includes one or more ammonium groups (e.g., tertiary and/or quaternary ammonium). In other examples, the pendant hydrophilic group includes one or more zwitterionic groups (e.g., a betaine, such as poly (carboxybetaine (pCB) and ammonium phosphonate groups such as a phosphatidylcholine group).

The $R_2$ segment can include charged groups that are capable of binding to a counterion to ionically crosslink the thermoplastic elastomer and form ionomers. In these aspects, for example, $R_2$ is an aliphatic or aromatic group having pendant amino, carboxylate, sulfonate, phosphate, ammonium, or zwitterionic groups, or combinations thereof.

In various cases when a pendant hydrophilic group is present, the pendant "hydrophilic" group is at least one polyether group, such as two polyether groups. In other cases, the pendant hydrophilic group is at least one polyester. In various cases, the pendant hydrophilic group is polylactone group (e.g., polyvinylpyrrolidone). Each carbon atom of the pendant hydrophilic group can optionally be substituted with, e.g., a $C_{1-6}$ alkyl group. In some of these aspects, the aliphatic and aromatic groups can be graft polymeric groups, wherein the pendant groups are homopolymeric groups (e.g., polyether groups, polyester groups, polyvinylpyrrolidone groups).

The pendant hydrophilic group can be a polyether group (e.g., a polyethylene oxide group, a polyethylene glycol group), a polyvinylpyrrolidone group, a polyacrylic acid group, or combinations thereof.

The pendant hydrophilic group can be bonded to the aliphatic group or aromatic group through a linker. The linker can be any bifunctional small molecule (e.g., $C_{1-20}$) capable of linking the pendant hydrophilic group to the aliphatic or aromatic group. For example, the linker can include a diisocyanate group, as previously described herein, which when linked to the pendant hydrophilic group and to the aliphatic or aromatic group forms a carbamate bond. The linker can be 4,4'-diphenylmethane diisocyanate (MDI), as shown below in Formula 9,

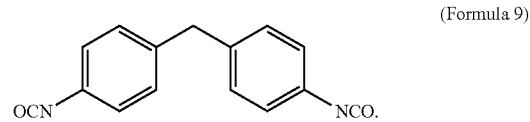

(Formula 9)

The pendant hydrophilic group can be a polyethylene oxide group and the linking group is MDI, as shown below in Formula 10,

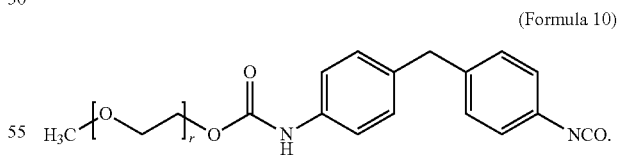

(Formula 10)

The pendant hydrophilic group can be functionalized to enable it to bond to the aliphatic or aromatic group, optionally through the linker. In various aspects, for example, when the pendant hydrophilic group includes an alkene group, which can undergo a Michael addition with a sulfhydryl-containing bifunctional molecule (i.e., a molecule having a second reactive group, such as a hydroxyl group or amino group), to result in a hydrophilic group that can react with the polymer backbone, optionally through the linker, using the second reactive group. For example, when the pendant hydrophilic group is a polyvinylpyrrolidone group, it can react with the sulfhydryl group on mercaptoethanol to result in hydroxyl-functionalized polyvinylpyrrolidone, as shown below in Formula 11,

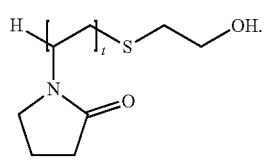
(Formula 11)

In some of the aspects disclosed herein, at least one $R_2$ segment includes a polytetramethylene oxide group. In other exemplary aspects, at least one $R_2$ segment can include an aliphatic polyol group functionalized with a polyethylene oxide group or polyvinylpyrrolidone group, such as the polyols described in E.P. Patent No. 2 462 908. For example, the $R_2$ segment can be derived from the reaction product of a polyol (e.g., pentaerythritol or 2,2,3-trihydroxypropanol) and either MDI-derivatized methoxypolyethylene glycol (to obtain compounds as shown in Formulas 12 or 13) or with MDI-derivatized polyvinylpyrrolidone (to obtain compounds as shown in Formulas 14 or 15) that had been previously been reacted with mercaptoethanol, as shown below.

In various cases, at least one $R_2$ is a polysiloxane, In these cases, $R_2$ can be derived from a silicone monomer of Formula 16, such as a silicone monomer disclosed in U.S. Pat. No. 5,969,076, which is hereby incorporated by reference:

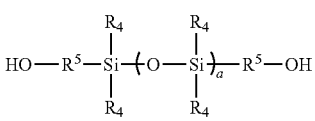
(Formula 16)

wherein: a is 1 to 10 or larger (e.g., 1, 2, 3, 4, 5, 6, 7, 8, 9, or 10); each $R_4$ independently is hydrogen, $C_{1-18}$ alkyl, $C_{2-18}$ alkenyl, aryl, or polyether; and each $R_5$ independently is $C_{1-10}$ alkylene, polyether, or polyurethane.

Each $R_4$ can independently be a H, $C_{1-10}$ alkyl, $C_{2-10}$ alkenyl, $C_{1-6}$ aryl, polyethylene, polypropylene, or polybutylene group. For example, each $R_4$ can independently be selected from the group consisting of methyl, ethyl, n-propyl, isopropyl, n-butyl, isobutyl, s-butyl, t-butyl, ethenyl, propenyl, phenyl, and polyethylene groups.

Each $R^5$ can independently include a $C_{1-10}$ alkylene group (e.g., a methylene, ethylene, propylene, butylene, pentylene, hexylene, heptylene, octylene, nonylene, or decylene group). In other cases, each $R^5$ is a polyether group (e.g., a

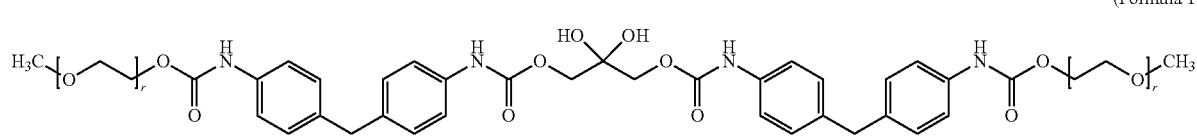
(Formula 12)

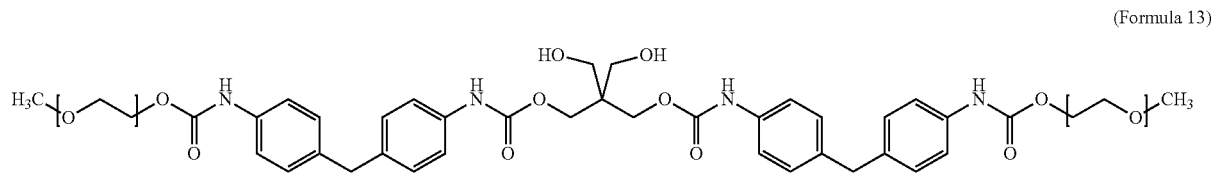
(Formula 13)

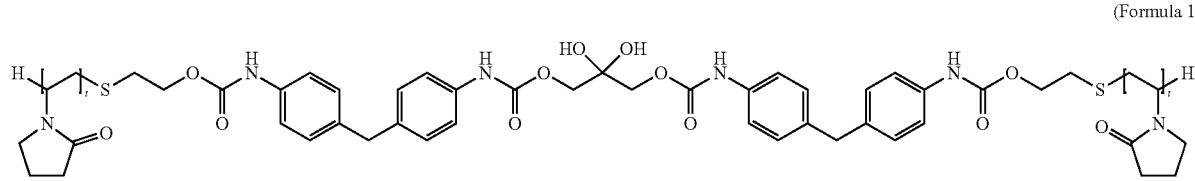
(Formula 14)

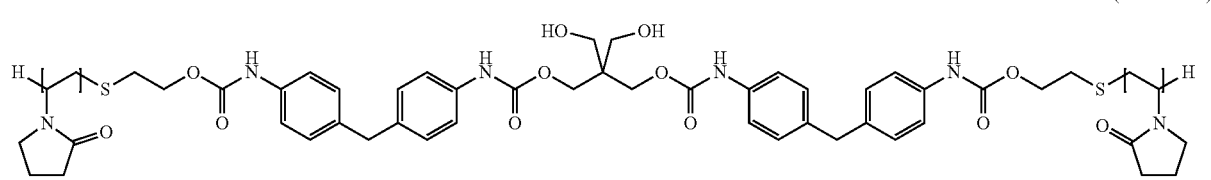
(Formula 15)

polyethylene, polypropylene, or polybutylene group). In various cases, each $R^5$ is a polyurethane group.

Optionally, the thermoplastic polyurethane elastomer can include an at least partially crosslinked polymeric network that includes copolymer chains that are derivatives of polyurethane. In such cases, it is understood that the level of crosslinking is such that the polyurethane retains thermoplastic properties (i.e., the crosslinked thermoplastic polyurethane can be softened or melted and re-solidified under the processing conditions described herein). This crosslinked polymeric network can be produced by polymerizing one or more isocyanates with one or more polyamino compounds, polysulfhydryl compounds, or combinations thereof, as shown in Formulas 17 and 18, below:

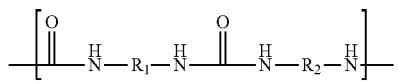
(Formula 17)

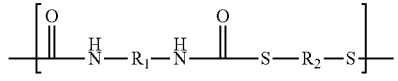
(Formula 18)

wherein the variables are as described above. Additionally, the isocyanates can also be chain extended with one or more polyamino or polythiol chain extenders to bridge two or more isocyanates, such as previously described for the polyurethanes of Formula 2.

The thermoplastic polyurethane elastomer can be composed of MDI, P $T_m$O, and 1,4-butylene glycol, as described in U.S. Pat. No. 4,523,005. For example, the second polymeric material as described herein can comprise a thermoplastic polyurethane elastomer composed of MDI, P $T_m$O, and 1,4-butylene glycol.

As described herein, the thermoplastic polyurethane elastomer can be physically crosslinked through e.g., nonpolar or polar interactions between the urethane or carbamate groups on the polymers (the hard segments. In these aspects, component $R_1$ in Formula 1, and components $R_1$ and $R_3$ in Formula 2, forms the portion of the polymer often referred to as the "hard segment", and component $R_2$ forms the portion of the polymer often referred to as the "soft segment". In these aspects, the soft segment can be covalently bonded to the hard segment. In some examples, the thermoplastic polyurethane elastomer having physically crosslinked hard and soft segments can be a hydrophilic thermoplastic polyurethane elastomer (i.e., a thermoplastic polyurethane elastomer including hydrophilic groups as disclosed herein).

Commercially available thermoplastic polyurethane elastomers having greater hydrophilicity suitable for the present use include, but are not limited to those under the tradename "TECOPHILIC", such as TG-500, TG-2000, SP-80A-150, SP-93A-100, SP-60D-60 (Lubrizol, Countryside, IL), "ESTANE" (e.g., 58238, T470A-, 2350-75A-030; Lubrizol, Countryside, IL), and "ELASTOLLAN" (e.g., 9500, B70A; BASF).

The thermoplastic polyurethane elastomer can be partially covalently crosslinked, as previously described herein.

The second polymeric material can include one or more thermoplastic polyurethanes (TPUs), such as "FORTIMO" (Mitsui Chemicals, Inc., Tokyo, Japan); "TEXIN" (Covestro LLC, Pittsburgh, Pennsylvania, USA); and "BOUNCELL-X" (Lubrizol Advanced Materials, Inc., Brecksville, Ohio, USA). The polymer component of second polymeric material (i.e., the component consisting of all the polymers present in the second polymeric material) can comprise at least 80 weight percent of TPUs, or at least 90 weight percent of TPUs, or at least 95 weight percent of TPUs, based on a total weight of the second polymeric material. The second polymeric materi can include one or more thermoplastic polyurethane hot-melt adhesives, such as, for example, "NASA-T" hot-melt film (Sambu Fine Chemicals, Gimhae-si, Gyeongsangdam-do, Korea).

Thermoplastic Block Co-Polyamide Elastomers

In various aspects, the second polymeric material as described herein can comprise one or more thermoplastic elastomers comprising a thermoplastic block co-polyamide elastomer. The thermoplastic block co-polyamide can comprise a number of polyamide segments having different polyamide chemical structures (e.g., polyamide 6 segments, polyamide 11 segments, polyamide 12 segments, polyamide 66 segments, etc.). The polyamide segments having different chemical structure can be arranged randomly, or can be arranged as repeating blocks.

The block co-polyamide can have repeating blocks of hard segments, and repeating blocks soft segments. The hard segments can comprise polyamide segments, and the soft segments can comprise non-polyamide segments. The thermoplastic elastomer can be an elastomeric thermoplastic co-polyamide comprising or consisting of block co-polyamides having repeating blocks of hard segments and repeating blocks of soft segments. In block co-polymers, including block co-polymers having repeating hard segments and soft segments, physical crosslinks can be present within the blocks or between the blocks or both within and between the blocks.

The polyamide segments of the block co-polyamide can comprise or consist of polyamide 6 segments, polyamide 11 segments, polyamide 12 segments, polyamide 66 segments, or any combination thereof. The polyamide segments of the co-polyamide can be arranged randomly, or can be arranged as repeating blocks. In a particular example, the polyamide segments can comprise or consist of polyamide 6 segments, or polyamide 12 segments, or both polyamide 6 segment and polyamide 12 segments. In the example where the polyamide segments of the co-polyamide include of polyamide 6 segments and polyamide 12 segments, the segments can be arranged randomly. The non-polyamide segments of the co-polyamide can comprise or consist of polyether segments, polyester segments, or both polyether segments and polyester segments. The co-polyamide can be a block co-polyamide, or can be a random co-polyamide. The thermoplastic copolyamide can be formed from the polycodensation of a polyamide oligomer or prepolymer with a second oligomer prepolymer to form a block copolyamide (i.e., a block co-polymer including polyamide segments. Optionally, the second prepolymer can be a hydrophilic prepolymer.

The thermoplastic polyamide itself, or the polyamide segment of the thermoplastic copolyamide can be derived from the condensation of polyamide prepolymers, such as lactams, amino acids, and/or diamino compounds with dicarboxylic acids, or activated forms thereof. The resulting polyamide segments include amide linkages (—(CO)NH—). The term "amino acid" refers to a molecule having at least one amino group and at least one carboxyl group. Each polyamide segment of the thermoplastic polyamide can be the same or different.

The thermoplastic polyamide or the polyamide segment of the thermoplastic copolyamide is derived from the polycondensation of lactams and/or amino acids, and includes an amide segment having a structure shown in Formula 19, below, wherein $R_6$ is the segment of the polyamide derived from the lactam or amino acid.

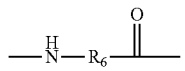

(Formula 19)

In some aspects, $R_6$ is derived from a lactam. In some cases, $R_6$ is derived from a $C_{3-20}$ lactam, or a $C_{4-15}$ lactam, or a $C_{6-12}$ lactam. For example, $R_6$ can be derived from caprolactam or laurolactam. In some cases, $R_6$ is derived from one or more amino acids. In various cases, $R_6$ is derived from a $C_{4-25}$ amino acid, or a $C_{8-20}$ amino acid, or a $C_{8-15}$ amino acid. For example, $R_6$ can be derived from 12-aminolauric acid or 11-aminoundecanoic acid.

Optionally, in order to increase the relative degree of hydrophilicity of the thermoplastic copolyamide, Formula 20 can include a polyamide-polyether block copolymer segment, as shown below:

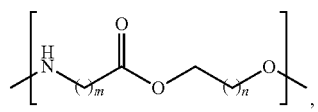

(Formula 20)

wherein m is 3-20, and n is 1-8. In some exemplary aspects, m is 4-15, or 6-12 (e.g., 6, 7, 8, 9, 10, 11, or 12), and n is 1, 2, or 3. For example, m can be 11 or 12, and n can be 1 or 3. The thermoplastic polyamide or the polyamide segment of the thermoplastic co-polyamide can be derived from the condensation of diamino compounds with dicarboxylic acids, or activated forms thereof, and includes an amide segment having a structure shown in Formula 21, below, wherein $R_7$ is the segment of the polyamide derived from the diamino compound, $R_8$ is the segment derived from the dicarboxylic acid compound:

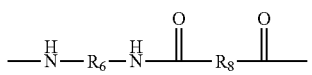

(Formula 21)

In some aspects, $R_7$ is derived from a diamino compound that includes an aliphatic group having $C_{4-15}$ carbon atoms, or $C_{5-10}$ carbon atoms, or $C_{6-9}$ carbon atoms. The diamino compound can include an aromatic group, such as phenyl, naphthyl, xylyl, and tolyl. Suitable diamino compounds from which $R_7$ can be derived include, but are not limited to, hexamethylene diamine (HMD), tetramethylene diamine, trimethyl hexamethylene diamine (THMD), m-xylylene diamine (MXD), and 1,5-pentamine diamine. $R_8$ can be derived from a dicarboxylic acid or activated form thereof, includes an aliphatic group having $C_{4-15}$ carbon atoms, or $C_{5-12}$ carbon atoms, or $C_{6-10}$ carbon atoms. The dicarboxylic acid or activated form thereof from which $R_8$ can be derived can include an aromatic group, such as phenyl, naphthyl, xylyl, and tolyl groups. Suitable carboxylic acids or activated forms thereof from which $R_8$ can be derived include, but are not limited to adipic acid, sebacic acid, terephthalic acid, and isophthalic acid. The copolymer chains can be substantially free of aromatic groups.

Each polyamide segment of the thermoplastic polyamide (including the thermoplastic copolyamide) can independently be derived from a polyamide prepolymer selected from the group consisting of 12-aminolauric acid, caprolactam, hexamethylene diamine and adipic acid.

The thermoplastic polyamide can comprise or consist of a thermoplastic poly(ether-block-amide). The thermoplastic poly(ether-block-amide) can be formed from the polycondensation of a carboxylic acid terminated polyamide prepolymer and a hydroxyl terminated polyether prepolymer to form a thermoplastic poly(ether-block-amide), as shown in Formula 22:

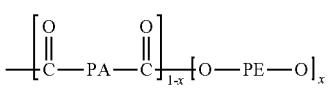

(Formula 22)

A disclosed poly(ether block amide) polymer can be prepared by polycondensation of polyamide blocks containing reactive ends with polyether blocks containing reactive ends. Examples include, but are not limited to: 1) polyamide blocks containing diamine chain ends with polyoxyalkylene blocks containing carboxylic chain ends; 2) polyamide blocks containing dicarboxylic chain ends with polyoxyalkylene blocks containing diamine chain ends obtained by cyanoethylation and hydrogenation of aliphatic dihydroxylated alpha-omega polyoxyalkylenes known as polyether diols; 3) polyamide blocks containing dicarboxylic chain ends with polyether diols, the products obtained in this particular case being polyetheresteramides. The polyamide block of the thermoplastic poly(ether-block-amide) can be derived from lactams, amino acids, and/or diamino compounds with dicarboxylic acids as previously described. The polyether block can be derived from one or more polyethers selected from the group consisting of polyethylene oxide (PEO), polypropylene oxide (PPO), polytetrahydrofuran (PTHF), polytetramethylene oxide (PTMO), and combinations thereof.

Poly(ether block amide) polymers include those comprising polyamide blocks comprising dicarboxylic chain ends derived from the condensation of a, w-aminocarboxylic acids, of lactams or of dicarboxylic acids and diamines in the presence of a chain-limiting dicarboxylic acid. In poly(ether block amide) polymers of this type, a α, ω-aminocarboxylic acid such as aminoundecanoic acid can be used; a lactam such as caprolactam or lauryllactam can be used; a dicarboxylic acid such as adipic acid, decanedioic acid or dodecanedioic acid can be used; and a diamine such as hexamethylenediamine can be used; or various combinations of any of the foregoing. The copolymer can comprise polyamide blocks comprising polyamide 12 or of polyamide 6.

Poly(ether block amide) polymers include those comprising polyamide blocks derived from the condensation of one or more a, w-aminocarboxylic acids and/or of one or more lactams containing from 6 to 12 carbon atoms in the presence of a dicarboxylic acid containing from 4 to 12 carbon atoms, and are of low mass, i.e., they have an $M_n$ of from 400 to 1000. In poly(ether block amide) polymers of this type, a α, ω-aminocarboxylic acid such as aminoundecanoic acid or aminododecanoic acid can be used; a dicarboxylic acids such as adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98% percent and are preferably hydrogenated) and dodecanedioic acid HOOC—$(CH_2)_{10}$—COOH can be used; and a lactam such as caprolactam and lauryllactam can be used; or various combinations of any of the foregoing. The copolymer can comprise polyamide blocks obtained by condensation of lauryllactam in the presence of adipic acid or dodecanedioic acid and with a $M_n$ of 750 have a melting point of 127-130 degrees centigrade. The various constituents of the polyamide block and their proportion can be chosen in order to obtain a melting point of less than 150 degrees centigrade. and advantageously between 90 degrees centigrade and 135 degrees centigrade.

Poly(ether block amide) polymers include those comprising polyamide blocks derived from the condensation of at least one α, ω-aminocarboxylic acid (or a lactam), at least one diamine and at least one dicarboxylic acid. In copolymers of this type, a α,ω-aminocarboxylic acid, the lactam and the dicarboxylic acid can be chosen from those described herein above and the diamine such as an aliphatic diamine containing from 6 to 12 atoms and can be arylic and/or saturated cyclic such as, but not limited to, hexamethylenediamine, piperazine, 1-aminoethylpiperazine, bisaminopropylpiperazine, tetramethylenediamine, octamethylene-diamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM) and bis(3-methyl-4-aminocyclohexyl)methane (BMACM) can be used.

The constituents of the polyamide block and their proportion can be chosen in order to obtain a melting point of less than 150 degrees centigrade and advantageously between 90 degrees centigrade and 135 degrees centigrade. The various constituents of the polyamide block and their proportion can be chosen in order to obtain a melting point of less than 150 degrees centigrade and advantageously between 90 degrees centigrade and 135 degrees centigrade.

The number average molar mass of the polyamide blocks can be from about 300 g/mol and about 15,000 g/mol, from about 500 g/mol and about 10,000 g/mol, from about 500 g/mol and about 6,000 g/mol, from about 500 g/mol to 5,000 g/mol, and from about 600 g/mol and about 5,000 g/mol. The number average molecular weight of the polyether block can range from about 100 g/mol to about 6,000 g/mol, from about 400 g/mol to 3000 g/mol and from about 200 g/mol to about 3,000 g/mol. The polyether (PE) content (x) of the poly(ether block amide) polymer can be from about 0.05 to about 0.8 (i.e., from about 5 mol percent to about 80 mol percent). The polyether blocks can be present from about 10 wt percent to about 50 wt percent, from about 20 wt percent to about 40 wt percent, and from about 30 wt percent to about 40 wt percent. The polyamide blocks can be present from about 50 wt percent to about 90 wt percent, from about 60 wt percent to about 80 wt percent, and from about 70 wt percent to about 90 wt percent.

The polyether blocks can contain units other than ethylene oxide units, such as, for example, propylene oxide or polytetrahydrofuran (which leads to polytetramethylene glycol sequences). It is also possible to use simultaneously PEG blocks, i.e. those consisting of ethylene oxide units, PPG blocks, i.e. those consisting of propylene oxide units, and PTMG blocks, i.e. those consisting of tetramethylene glycol units, also known as polytetrahydrofuran. PPG or PTMG blocks are advantageously used. The amount of polyether blocks in these copolymers containing polyamide and polyether blocks can be from about 10 wt percent to about 50 wt percent of the copolymer and from about 35 wt percent to about 50 wt percent.

The copolymers containing polyamide blocks and polyether blocks can be prepared by any means for attaching the polyamide blocks and the polyether blocks. In practice, two processes are essentially used, one being a 2-step process and the other a one-step process.

In the two-step process, the polyamide blocks having dicarboxylic chain ends are prepared first, and then, in a second step, these polyamide blocks are linked to the polyether blocks. The polyamide blocks having dicarboxylic chain ends are derived from the condensation of polyamide precursors in the presence of a chain-stopper dicarboxylic acid. If the polyamide precursors are only lactams or α,ω-aminocarboxylic acids, a dicarboxylic acid is added. If the precursors already comprise a dicarboxylic acid, this is used in excess with respect to the stoichiometry of the diamines. The reaction usually takes place between 180 and 300 degrees centigrade, preferably 200 to 290 degrees centigrade, and the pressure in the reactor is set between 5 and 30 bar and maintained for approximately 2 to 3 hours. The pressure in the reactor is slowly reduced to a $T_m$ospheric pressure and then the excess water is distilled off, for example for one or two hours.

Once the polyamide having carboxylic acid end groups has been prepared, the polyether, the polyol and a catalyst are then added. The total amount of polyether can be divided and added in one or more portions, as can the catalyst. The polyether can be added first and the reaction of the OH end groups of the polyether and of the polyol with the COOH end groups of the polyamide starts, with the formation of ester linkages and the elimination of water. Water is removed as much as possible from the reaction mixture by distillation and then the catalyst is introduced in order to complete the linking of the polyamide blocks to the polyether blocks. This second step takes place with stirring, preferably under a vacuum of at least 50 mbar (5000 Pa) at a temperature such that the reactants and the copolymers obtained are in the molten state. By way of example, this temperature can be between 100 and 400 degrees centigrade and usually between 200 and 250 degrees centigrade. The reaction is monitored by measuring the torque exerted by the polymer melt on the stirrer or by measuring the electric power consumed by the stirrer. The end of the reaction is determined by the value of the torque or of the target power. The catalyst is defined as being any product which promotes the linking of the polyamide blocks to the polyether blocks by esterification. Advantageously, the catalyst is a derivative of a metal (M) chosen from the group formed by titanium, zirconium and hafnium.

The derivative can be prepared from a tetraalkoxides consistent with the general formula $M(OR)_4$, in which M represents titanium, zirconium or hafnium and R, which can be identical or different, represents linear or branched alkyl radicals having from 1 to 24 carbon atoms.

The catalyst can comprise a salt of the metal (M), particularly the salt of (M) and of an organic acid and the complex salts of the oxide of (M) and/or the hydroxide of (M) and an organic acid. The organic acid can be formic acid, acetic acid, propionic acid, butyric acid, valeric acid, caproic acid, caprylic acid, lauric acid, myristic acid, palmitic acid, stearic acid, oleic acid, linoleic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid and crotonic acid. Acetic and propionic acids are particularly preferred. M can be zirconium and such salts are called zirconyl salts, e.g., the commercially available product sold under the name zirconyl acetate.

The weight proportion of catalyst can vary from about 0.01 to about 5 percent of the weight of the mixture of the dicarboxylic polyamide with the polyetherdiol and the polyol. The weight proportion of catalyst can vary from about 0.05 to about 2 percent of the weight of the mixture of the dicarboxylic polyamide with the polyetherdiol and the polyol.

In the one-step process, the polyamide precursors, the chain stopper and the polyether are blended together; what is then obtained is a polymer having essentially polyether blocks and polyamide blocks of very variable length, but also the various reactants that have reacted randomly, which are distributed randomly along the polymer chain. They are the same reactants and the same catalyst as in the two-step process described above. If the polyamide precursors are only lactams, it is advantageous to add a little water. The copolymer has essentially the same polyether blocks and the same polyamide blocks, but also a small portion of the various reactants that have reacted randomly, which are distributed randomly along the polymer chain. As in the first step of the two-step process described above, the reactor is closed and heated, with stirring. The pressure established is between 5 and 30 bar. When the pressure no longer changes, the reactor is put under reduced pressure while still maintaining vigorous stirring of the molten reactants. The reaction is monitored as previously in the case of the two-step process.

The proper ratio of polyamide to polyether blocks can be found in a single poly(ether block amide), or a blend of two or more different composition poly(ether block amide)s can be used with the proper average composition. It can be useful to blend a block copolymer having a high level of polyamide groups with a block copolymer having a higher level of polyether blocks, to produce a blend having an average level of polyether blocks of about 20 to 40 wt percent of the total blend of poly(amid-block-ether) copolymers, and preferably about 30 to 35 wt percent. The copolymer can comprise a blend of two different poly(ether-block-amide)s comprising at least one block copolymer having a level of polyether blocks below about 35 wt percent, and a second poly(ether-block-amide) having at least about 45 wt percent of polyether blocks.

The thermoplastic elastomer can be a polyamide or a poly(ether-block-amide) with a melting temperature ($T_m$) from about 90 degrees centigrade to about 120 degrees centigrade when determined in accordance with ASTM D3418-97 as described herein below. The thermoplastic elastomer can be a polyamide or a poly(ether-block-amide) with a melting temperature ($T_m$) from about 93 degrees C. to about 99 degrees C. when determined in accordance with ASTM D3418-97 as described herein below. The thermoplastic elastomer can be a polyamide or a poly(ether-block-amide) with a melting temperature ($T_m$) from about 112 degrees C. to about 118 degrees C. when determined in accordance with ASTM D3418-97 as described herein below. The thermoplastic elastomer can be a polyamide or a poly(ether-block-amide) with a melting temperature of about 90 degrees C., about 91 degrees C., about 92 degrees C., about 93 degrees C., about 94 degrees C., about 95 degrees C., about 96 degrees C., about 97 degrees C., about 98 degrees C., about 99 degrees C., about 100 degrees C., about 101 degrees C., about 102 degrees C., about 103 degrees C., about 104 degrees C., about 105 degrees C., about 106 degrees C., about 107 degrees C., about 108 degrees C., about 109 degrees C., about 110 degrees C., about 111 degrees C., about 112 degrees C., about 113 degrees C., about 114 degrees C., about 115 degrees C., about 116 degrees C., about 117 degrees C., about 118 degrees C., about 119 degrees C., about 120 degrees C., any range of melting temperature ($T_m$) values encompassed by any of the foregoing values, or any combination of the foregoing melting temperature ($T_m$) values, when determined in accordance with ASTM D3418-97 as described herein below.

The thermoplastic elastomer can be a polyamide or a poly(ether-block-amide) with a glass transition temperature ($T_g$) from about –20 degrees C. to about 30 degrees C. when determined in accordance with ASTM D3418-97 as described herein below. The thermoplastic elastomer can be a polyamide or a poly(ether-block-amide) with a glass transition temperature ($T_g$) from about –13 degrees C. to about –7 degrees C. when determined in accordance with ASTM D3418-97 as described herein below. The thermoplastic elastomer can be a polyamide or a poly(ether-block-amide) with a glass transition temperature ($T_g$) from about 17 degrees C. to about 23 degrees C. when determined in accordance with ASTM D3418-97 as described herein below. The thermoplastic elastomer can be a polyamide or a poly(ether-block-amide) with a glass transition temperature ($T_g$) of about –20 degrees C., about –19 degrees C., about –18 degrees C., about –17 degrees C., about –16 degrees C., about –15 degrees C., about –14 degrees C., about –13 degrees C., about –12 degrees C., about –10 degrees C., about –9 degrees C., about –8 degrees C., about –7 degrees C., about –6 degrees C., about –5 degrees C., about –4 degrees C., about –3 degrees C., about –2 degrees C., about –1 degrees C., about 0 degrees C., about 1 degrees C., about 2 degrees C., about 3 degrees C., about 4 degrees C., about 5 degrees C., about 6 degrees C., about 7 degrees C., about 8 degrees C., about 9 degrees C., about 10 degrees C., about 11 degrees C., about 12 degrees C., about 13 degrees C., about 14 degrees C., about 15 degrees C., about 16 degrees C., about 17 degrees C., about 18 degrees C., about 19 degrees C., about 20 degrees C., any range of glass transition temperature values encompassed by any of the foregoing values, or any combination of the foregoing glass transition temperature values, when determined in accordance with ASTM D3418-97 as described herein below.

The thermoplastic elastomer can be a polyamide or a poly(ether-block-amide) that can be spun into a yarn when tested in a melt extruder.

The thermoplastic elastomer can be a polyamide or a poly(ether-block-amide) with a melt flow index from about 10 cm$^3$/10 min to about 30 cm$^3$/10 min when tested in accordance with ASTM D1238-13 as described herein below at 160 degrees C. using a weight of 2.16 kg. The thermoplastic elastomer can be a polyamide or a poly(ether-block-amide) with a melt flow index from about 22 cm$^3$/10 min to about 28 cm$^3$/10 min when tested in accordance with ASTM D1238-13 as described herein below at 160 degrees C. using a weight of 2.16 kg. The thermoplastic elastomer can be a polyamide or a poly(ether-block-amide) with a melt flow index of about 10 cm$^3$/10 min, about 11 cm$^3$/10 min, about 12 cm$^3$/10 min, about 13 cm$^3$/10 min, about 14 cm$^3$/10 min, about 15 cm$^3$/10 min, about 16 cm$^3$/10 min, about 17 cm$^3$/10 min, of about 18 cm$^3$/10 min, about 19 cm$^3$/10 min, of about 20 cm$^3$/10 min, about 21 cm$^3$/10 min, about 22 cm$^3$/10 min, about 23 cm$^3$/10 min, about 24 cm$^3$/10 min, about 25 cm$^3$/10 min, about 26 cm$^3$/10 min, about 27 cm$^3$/10 min, of about 28 cm$^3$/10 min, about 29 cm$^3$/10 min, of about 30 cm$^3$/10 min, any range of melt flow index values encompassed by any of the foregoing values, or any combination of the foregoing melt flow index values, when determined in accordance with ASTM D1238-13 as described herein below at 160 degrees C. using a weight of 2.16 kg.

The thermoplastic elastomer can be a polyamide or a poly(ether-block-amide) with a cold Ross flex test result of about 120,000 to about 180,000 when tested on a thermoformed plaque of the polyamide or the poly(ether-block-amide) in accordance with the cold Ross flex test as described herein below. The thermoplastic elastomer can be a polyamide or a poly(ether-block-amide) with a cold Ross flex test result of about 140,000 to about 160,000 when tested on a thermoformed plaque of the polyamide or the poly(ether-block-amide) in accordance with the cold Ross flex test as described herein below. The thermoplastic elastomer can be a polyamide or a poly(ether-block-amide) with a cold Ross flex test result of about 130,000 to about 170,000 when tested on a thermoformed plaque of the polyamide or the poly(ether-block-amide) in accordance with the cold Ross flex test as described herein below. The thermoplastic elastomer can be a polyamide or a poly(ether-block-amide) with a cold Ross flex test result of about 120,000, about 125,000, about 130,000, about 135,000, about 140,000, about 145,000, about 150,000, about 155,000, about 160,000, about 165,000, about 170,000, about 175,000, about 180,000, any range of cold Ross flex test values encompassed by any of the foregoing values, or any combination of the foregoing cold Ross flex test values, when tested on a thermoformed plaque of the polyamide or the poly(ether-block-amide) in accordance with the cold Ross flex test as described herein below.

The thermoplastic elastomer can be a polyamide or a poly(ether-block-amide) with a modulus from about 5 MPa to about 100 MPa when determined on a thermoformed plaque in accordance with ASTM D412-98 Standard Test Methods for Vulcanized Rubber and Thermoplastic Rubbers and Thermoplastic Elastomers-Tension with modifications described herein below. The thermoplastic elastomer can be a polyamide or a poly(ether-block-amide) with a modulus from about 20 MPa to about 80 MPa when determined on a thermoformed plaque in accordance with ASTM D412-98 Standard Test Methods for Vulcanized Rubber and Thermoplastic Rubbers and Thermoplastic Elastomers-Tension with modifications described herein below. The thermoplastic elastomer can be a polyamide or a poly(ether-block-amide) with a modulus of about 5 MPa, about 10 MPa, about 15 MPa, about 20 MPa, about 25 MPa, about 30 MPa, about 35 MPa, about 40 MPa, about 45 MPa, about 50 MPa, about 55 MPa, about 60 MPa, about 65 MPa, about 70 MPa, about 75 MPa, about 80 MPa, about 85 MPa, about 90 MPa, about 95 MPa, about 100 MPa, any range of modulus values encompassed by any of the foregoing values, or any combination of the foregoing modulus values, when tested on a thermoformed plaque of the polyamide or the poly(ether-block-amide) in accordance with ASTM D412-98 Standard Test Methods for Vulcanized Rubber and Thermoplastic Rubbers and Thermoplastic Elastomers-Tension with modifications described herein below.

The thermoplastic elastomer can be a polyamide or a poly(ether-block-amide) with a melting temperature ($T_m$) of about 115 degrees C. when determined in accordance with ASTM D3418-97 as described herein below; a glass transition temperature ($T_g$) of about −10 degrees C. when determined in accordance with ASTM D3418-97 as described herein below; a melt flow index of about 25 cm$^3$/10 min when tested in accordance with ASTM D1238-13 as described herein below at 160 degrees C. using a weight of 2.16 kg; a cold Ross flex test result of about 150,000 when tested on a thermoformed plaque in accordance with the cold Ross flex test as described herein below; and a modulus from about 25 MPa to about 70 MPa when determined on a thermoformed plaque in accordance with ASTM D412-98 Standard Test Methods for Vulcanized Rubber and Thermoplastic Rubbers and Thermoplastic Elastomers-Tension with modifications described herein below.

The thermoplastic elastomer can be a polyamide or a poly(ether-block-amide) with a melting temperature ($T_m$) of about 96 degrees C. when determined in accordance with ASTM D3418-97 as described herein below; a glass transition temperature ($T_g$) of about 20 degrees C. when determined in accordance with ASTM D3418-97 as described herein below; a cold Ross flex test result of about 150,000 when tested on a thermoformed plaque in accordance with the cold Ross flex test as described herein below; and a modulus of less than or equal to about 10 MPa a when determined on a thermoformed plaque in accordance with ASTM D412-98 Standard Test Methods for Vulcanized Rubber and Thermoplastic Rubbers and Thermoplastic Elastomers-Tension with modifications described herein below.

Exemplary commercially available copolymers include, but are not limited to, those available under the tradenames of VESTAMID® (Evonik Industries); PELATAMID® (Arkema), e.g., product code H2694; PEBAX® (Arkema), e.g., product code "PEBAX MH1657" and "PEBAX MV1074"; PEBAX® RNEW (Arkema); GRILAMID® (EMS-Chemie AG), or also to other similar materials produced by various other suppliers.

Thermoplastic Polyolefin Elastomers

In some aspects, the thermoplastic elastomers can comprise or consist essentially of a thermoplastic polyolefin. Exemplary of thermoplastic polyolefins useful in the disclosed second polymeric materials can include, but are not limited to, thermoplastic olefin elastomers (e.g., metallocene-catalyzed block copolymers of ethylene and α-olefins having 4 to about 8 carbon atoms). The thermoplastic polyolefin can be a polymer comprising an ethylene-α-olefin copolymer, an ethylene-propylene rubber (EPDM), a polybutene, a polyisobutylene, a poly-4-methylpent-1-ene, a polyisoprene, a polybutadiene, a ethylene-methacrylic acid copolymer, and an olefin elastomer such as a dynamically cross-linked polymer obtained from polypropylene (PP) and an ethylene-propylene rubber (EPDM), and blends or mixtures of the foregoing. Further exemplary thermoplastic polyolefins useful in the disclosed second polymeric materials are polymers of cycloolefins such as cyclopentene or norbornene.

The polyolefin can be a polyethylene copolymer derived from monomers of monolefins and diolefins copolymerized with a vinyl, acrylic acid, methacrylic acid, ethyl acrylate, vinyl alcohol, and/or vinyl acetate. Polyolefin copolymers comprising vinyl acetate-derived units can be a high vinyl acetate content copolymer, e.g., greater than about 50 wt percent vinyl acetate-derived composition.

The thermoplastic polyolefin, as disclosed herein, can be formed through free radical, cationic, and/or anionic polymerization by methods well known to those skilled in the art (e.g., using a peroxide initiator, heat, and/or light). The disclosed thermoplastic polyolefin can be prepared by radical polymerization under high pressure and at elevated temperature. Alternatively, the thermoplastic polyolefin can be prepared by catalytic polymerization using a catalyst that normally contains one or more metals from group IVb, Vb, VIb or VIII metals. The catalyst usually has one or more than one ligand, typically oxides, halides, alcoholates, esters, ethers, amines, alkyls, alkenyls and/or aryls that can be either p- or s-coordinated complexed with the group IVb, Vb, VIb or VIII metal. The metal complexes can be in the free form or fixed on substrates, typically on activated magnesium chloride, titanium(III) chloride, alumina or silicon oxide. It is understood that the metal catalysts can be soluble or insoluble in the polymerization medium. The catalysts can be used by themselves in the polymerization or further activators can be used, typically a group Ia, IIa and/or IIIa metal alkyls, metal hydrides, metal alkyl halides, metal alkyl oxides or metal alkyloxanes. The activators can be modified conveniently with further ester, ether, amine or silyl ether groups.

Suitable thermoplastic polyolefins can be prepared by polymerization of monomers of monolefins and diolefins as described herein. Exemplary monomers that can be used to prepare disclosed thermoplastic polyolefin include, but are not limited to, ethylene, propylene, 1-butene, 1-pentene, 1-hexene, 2-methyl-1-propene, 3-methyl-1-pentene, 4-methyl-1-pentene, 5-methyl-1-hexene and mixtures thereof.

Suitable ethylene-α-olefin copolymers can be obtained by copolymerization of ethylene with an α-olefin such as propylene, butene-1, hexene-1, octene-1,4-methyl-1-pentene or the like having carbon numbers of 3 to 12.

The thermoplastic polyolefin can be a mixture of thermoplastic polyolefins, such as a mixture of two or more polyolefins disclosed herein above. For example, a suitable mixture of thermoplastic polyolefins can be a mixture of polypropylene with polyisobutylene, polypropylene with polyethylene (for example PP/HDPE, PP/LDPE) or mixtures of different types of polyethylene (for example LDPE/HDPE).

The thermoplastic polyolefin can be a copolymer of suitable monolefin monomers or a copolymer of a suitable monolefin monomer and a vinyl monomer. Exemplary thermoplastic polyolefin copolymers include, but are not limited to, ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

The second polymeric material can include one or more olefinic polymers. Olefinic polymers can include ethylene-based copolymers, propylene-based copolymers, and butene-based copolymers. The olefinic polymer can be an ethylene-based copolymer such as a styrene-ethylene/butylene-styrene (SEBS) copolymer; an ethylene-propylene diene monomer (EPDM) copolymer; an ethylene-vinyl acetate (EVA) copolymer; an ethylene alkyl acrylate (EAA) copolymer; an ethylene alkyl methacrylate (EAMA) copolymer; any copolymer thereof, and any blend thereof.

The second polymeric material can include an ethylene-vinyl acetate (EVA) copolymer. The ethylene-vinyl acetate (EVA) copolymer can have a range of vinyl acetate contents, for example about 50 percent to about 90 percent, about 50 percent to about 80 percent, about 5 percent to about 50 percent, about 10 percent to about 45 percent, about 10 percent to about 30 percent, about 30 percent to about 45 percent, or about 20 percent to about 35 percent.

The polyolefin can be a polypropylene. The term "polypropylene," as used herein, is intended to encompass any polymeric composition comprising propylene monomers, either alone or in mixture or copolymer with other randomly selected and oriented polyolefins, dienes, or other monomers (such as ethylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polypropylene can be of any standard melt flow (by testing); however, standard fiber grade polypropylene resins possess ranges of Melt Flow Indices between about 1 and 1000.

The polyolefin can be a polyethylene. The term "polyethylene," as used herein, is intended to encompass any polymeric composition comprising ethylene monomers, either alone or in mixture or copolymer with other randomly selected and oriented polyolefins, dienes, or other monomers (such as propylene, butylene, and the like). Such a term also encompasses any different configuration and arrangement of the constituent monomers (such as atactic, syndiotactic, isotactic, and the like). Thus, the term as applied to fibers is intended to encompass actual long strands, tapes, threads, and the like, of drawn polymer. The polyethylene can be of any standard melt flow (by testing); however, standard fiber grade polyethylene resins possess ranges of Melt Flow Indices between about 1 and 1000.

Thermoplastic Ionomer Elastomers

In certain aspects, the thermoplastic elastomer can be one or more ionomeric polymers. The ionomeric polymers can include chain units derived from one or more olefins and chain units derived from one or more ethylenically-unsaturated acid groups. The compositions can also include a plurality of cations ionically crosslink anionic form of the acid groups in the ionomeric copolymers. The compositions can be essentially just the ionomeric copolymers and metal cations. The ionomeric copolymers can have a melt flow index of about 30 or less, about 20 or less, about 15 or less, about 10 or less, or about 5 or less.

The ionomeric copolymers can be terpolymers of ethylene, acrylic acid, and methyl acrylate or butyl acrylate. In some aspects, a ratio III of a total parts by weight of the acrylic acid in the ionomeric copolymers to a total weight of the ionomeric copolymers is about 0.05 to about 0.6, about 0.1 to about 0.6, about 0.1 to about 0.5, about 0.15 to about 0.5, or about 0.2 to about 0.5.

The ionomeric copolymers can have a plurality of a first repeat unit having a formula according to Formula 23 and a plurality of a second repeat unit having a formula according to Formula 24, and a plurality of cations, wherein each of the cations is crosslinking two or more of the second repeat units.

Formula 23

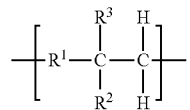

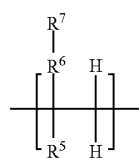

Formula 24

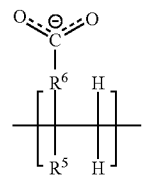

Formula 25

Each occurrence of $R^1$ can be independently none, a substituted or unsubstituted $C_1$, $C_2$, $C_3$, $C_4$, $C_5$, $C_6$, $C_7$, or $C_8$ alkyl, or a substituted or unsubstituted $C_2$, $C_3$, $C_4$, $C_5$, $C_6$, $C_7$, or $C_8$ alkenyl.

In some aspects, each occurrence of $R^1$ is none.

Each occurrence of $R^2$ can be independently hydrogen, a halogen, a substituted or unsubstituted $C_1$, $C_2$, $C_3$, $C_4$, $C_5$, $C_6$, $C_7$, or $C_8$ alkyl, a substituted or unsubstituted $C_2$, $C_3$, $C_4$, $C_5$, $C_6$, $C_7$, or $C_8$ alkenyl, a substituted or unsubstituted phenyl, a substituted or unsubstituted alkyl-phenyl, a substituted or unsubstituted $C_1$, $C_2$, $C_3$, $C_4$, $C_5$, $C_6$, $C_7$, or $C_8$ alkoxy, or a substituted or unsubstituted $C_3$, $C_4$, $C_5$, $C_6$, $C_7$, or $C_8$, $C_9$, $C_{10}$, $C_{11}$, or $C_{12}$ alkyl ester. In some aspects, each occurrence of $R^2$ is independently a hydrogen, methyl, phenyl, or halogen. In some aspects, each occurrence of $R^2$ has a structure given by the formula:

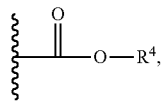

where each occurrence of $R^4$ is independently a hydrogen, a substituted or unsubstituted $C_1$, $C_2$, $C_3$, $C_4$, $C_5$, $C_6$, $C_7$, or $C_8$ alkyl.

Each occurrence of $R^3$ can be independently hydrogen, a substituted or unsubstituted $C_1$, $C_2$, $C_3$, $C_4$, $C_5$, $C_6$, $C_7$, or $C_8$ alkyl, or a substituted or unsubstituted $C_2$, $C_3$, $C_4$, $C_5$, $C_6$, $C_7$, or $C_8$ alkenyl. In some aspects, each occurrence of $R^3$ is independently a hydrogen or methyl.

Each occurrence of $R^5$ can be independently a hydrogen, a halogen, a substituted or unsubstituted $C_1$, $C_2$, $C_3$, $C_4$, $C_5$, $C_6$, $C_7$, or $C_8$ alkyl, a substituted or unsubstituted $C_2$, $C_3$, $C_4$, $C_5$, $C_6$, $C_7$, or $C_8$ alkenyl, a substituted or unsubstituted phenyl, a substituted or unsubstituted alkyl-phenyl, a substituted or unsubstituted $C_1$, $C_2$, $C_3$, $C_4$, $C_5$, $C_6$, $C_7$, or $C_8$ alkoxy, or a substituted or unsubstituted $C_3$, $C_4$, $C_5$, $C_6$, $C_7$, or $C_8$, $C_9$, $C_{10}$, $C_{11}$, or $C_{12}$ alkyl ester. In some aspects, each occurrence of $R^5$ is independently a hydrogen or a methyl.

Each occurrence of $R^6$ can be independently none, a substituted or unsubstituted $C_1$, $C_2$, $C_3$, $C_4$, $C_5$, $C_6$, $C_7$, or $C_8$ alkyl, a substituted or unsubstituted $C_2$, $C_3$, $C_4$, $C_5$, $C_6$, $C_7$, or $C_8$ alkenyl, a substituted or unsubstituted phenyl, a substituted or unsubstituted alkyl-phenyl, or a substituted or unsubstituted $C_1$-$C_8$ alkoxy. In some aspects, each occurrence of $R^6$ is none.

Each occurrence of $R^7$ can be independently a carboxylate, a sulfate, a sulfonate, a nitrate, a phosphate, a phosphonate, or another negatively charged functional group. In some aspects, each occurrence of $R^7$ is a carboxylate. For example, the second repeat unit can have a formula according to Formula 25, where $R^5$ and $R^6$ are descried above.

The compositions can include a plurality of cations ionically crosslinking the ionomeric copolymers. For example, the cations can ionically crosslink anionic groups from acid groups. The cations ionically crosslink units having a structure according to Formula II.

In the compositions described herein, a plurality of cations are present to crosslink negatively charged groups in the ionomeric copolymer. For example, an ionomer having free carboxylate groups can be crosslinked by a plurality of cations. Because the compositions are crosslinked via ionic crosslinking, the compositions are in some aspects free or substantially free of any covalent and irreversible chemical crosslinks, for example the compositions can be free of covalent crosslinking between the ionomeric copolymers. The cations can include cations of alkali metals or alkali earth metals such as a magnesium ion, a sodium ion, a potassium ion, a cesium ion, a calcium ion, a barium ion, a manganese ion, a copper ion, a zinc ion, a tin ion, a lithium ion, and a positively charged compound thereof. The cation can be a sodium cation, a lithium cation, a zinc cation, a magnesium cation, or any combination thereof. The cations can include organic cations such as an ammonium ion, a pyridinium ion, a guanidinium ion, an imidazolium ion, a phosphonium ion, or a sulfonium ion.

In some aspects, a ratio II of a total parts by weight of the carboxylic acid groups in the ionomeric copolymers to a total weight of the ionomeric copolymers is about 0.05 to about 0.7, about 0.1 to about 0.6, about 0.2 to about 0.6, or about 0.2 to about 0.5. In some aspects, a ratio II of a total parts by weight of the second repeat units in the ionomeric copolymers to a total weight of the ionomeric copolymers is about 0.1 to about 0.7, about 0.1 to about 0.6, about 0.2 to about 0.6, or about 0.2 to about 0.5.

The second polymeric material can include one or more ionomers, such as any of the "SURLYN" polymers (DuPont, Wilmington, Delaware, USA).

The second polymeric material can include acrylic block copolymer elastomers, such as block copolymers comprising a first PMMA block, an acrylate block, and a second PMMA block.

Thermoplastic Styrenic Copolymer Elastomers

In certain aspects, the thermoplastic elastomer is a thermoplastic elastomeric styrenic copolymer. Examples of these copolymers include, but are not limited to, styrene butadiene styrene (SBS) block copolymer, a styrene ethylene/butylene styrene (SEBS) resin, a polyacetal resin (POM) or a styrene acrylonitrile resin (SAN). Exemplary commercially available thermoplastic elastomeric styrenic copolymers include MONOPRENE IN5074, SP066070, and SP16975 (Teknor Apex), which are styrene ethylene/butylene styrene (SEBS) resins.

Thermoplastic Vulcanizate Materials

The second polymeric material can include an injection processible thermoplastic vulcanizate (TPV) material. Injection-processible TPV materials are typically cross-linked or partially cross-linked rubbers dispersed into thermoplastic host phases. Exemplary TPV materials include ethylene propylene diene rubber in polypropylene hosts (EPDM/PP), such as "SARLINK" or "SANTOPRENE" TPV materials. Other exemplary TPV materials include alkyl acrylic copolymer rubbers in polyamide hosts (ACM/PA), such as "ZEOTHERM" TPVs. Yet other exemplary TPV materials include silicone rubbers dispersed in "HYTREL" based copolyesters (e.g., so-called TSiPVs).

Additives.

In various aspects, the disclosed thermoplastic copolyester compositions and second polymeric material can independently further comprise an additive. The additive can be incorporated directly into the disclosed thermoplastic copolyester composition or polymeric layer, or alternatively, applied thereto, prior to foaming the thermoplastic copolyester composition or second polymeric material. Additives that can be used in the disclosed compositions and materials include, but are not limited to, dyes, pigments, colorants, ultraviolet light absorbers, hindered amine light stabilizers, antioxidants, processing aids or agents, plasticizers, lubricants, emulsifiers, pigments, dyes, optical brighteners, rheology additives, catalysts, flow-control agents, slip agents, crosslinking agents, crosslinking boosters, halogen scavengers, smoke inhibitors, flameproofing agents, antistatic agents, fillers, or mixtures of two or more of the foregoing. In some aspects, the additive can be a wax, an anti-oxidant, a UV-absorbing agent, a coloring agent, or combinations thereof.

The additive can be present in an amount from about 0.1 weight percent to about 10 weight percent, or from 0.1 to 6 weight percent, based on the total weight of the composition or material; or any weight percent value or set of weight percent values within any of the foregoing ranges of weight percent, or any range of weight percent values encompassing a sub-set of any of the foregoing ranges. In a particular aspect, the additive can be present in the composition or material in an amount from about 0.1 weight percent to about 4 weight percent, based on a total weight of the composition or material. The composition or material can comprise less than 4 weight percent, or less than 3 weight percent, or less than 2 weight percent of additives, based on a total weight of the composition or material. The composition or material can be essentially free of additives.

In some instances, an additive can be present in an amount of from about 0.01 weight percent to about 10 weight percent, about 0.025 weight percent to about 5 weight percent, or about 0.1 weight percent to 3 weight percent, where the weight percent is based upon the sum of the material components in the thermoplastic copolyester composition, or second polymeric material.

Individual components can be mixed together with the other components of the thermoplastic copolyester composition or second polymeric material in a continuous mixer or a batch mixer, e.g., in an intermeshing rotor mixer, such as an Intermix mixer, a twin screw extruder, in a tangential rotor mixer such as a Banbury mixer, using a two-roll mill, or some combinations of these to make a composition comprising a thermoplastic polymer and an additive. The mixer can blend the components together via a single step or multiple steps, and can mix the components via dispersive mixing or distributive mixing to form the resulting thermoplastic composition. This step is often referred to as "compounding."

The thermoplastic copolyester composition and second polymeric material can independently further comprise a solid non-polymeric material such as a chemical blowing agent, nucleating agent, filler, or a combination thereof. The solid non-polymeric material can be present in an amount from about 0.05 weight percent to about 20 weight percent based on the total weight of the composition or material; about 0.1 weight percent to about 10 weight percent based on the total weight of the composition or material. The foamed polymeric material can comprise less than about 5 weight percent, or less than 4 weight percent, or less than 3 weight percent, or less than 2 weight percent, or less than 1 weight percent of solid non-polymeric material, based on the total weight of the thermoplastic copolyester composition or second polymeric material; or any weight percent value or set of weight percent values within any of the foregoing ranges of weight percent, or any range of weight percent values encompassing a sub-set of any of the foregoing ranges.

The thermoplastic copolyester composition or second polymeric material can comprise essentially no non-polymeric material such as a chemical blowing agent, nucleating agent, filler, or a combination thereof. In other words, the composition or material can be essentially free of non-polymeric materials. In other instances, the composition or material can comprise less than about 10 weight percent of a non-polymeric material such as a chemical blowing agent, nucleating agent, filler, or a combination thereof. The composition or material can comprise less than 4 weight percent, or less than 3 weight percent, or less than 2 weight percent of non-polymeric material, based on a total weight of the composition or material.

In some instances, the solid non-polymeric material is a filler. The filler can be a particulate filler. In further aspects, the filler is a carbonaceous filler. The carbonaceous filler can be carbon black, activated carbon, graphite, carbon fibers, carbon fibrils, carbon nanoparticles, or combinations thereof. In various aspects, the carbonaceous filler can be chemically-modified. Alternatively, the filler can be an inorganic filler. The inorganic filler can be an oxide, a hydroxide, a salt, a silicate, a metal, or combinations thereof. Examples of an inorganic filler include, but are not limited to, glass spheres, glass fibers, glass hollow spheres, glass flakes, MgO, $SiO_2$, $Sb_2O_3$, $Al_2O_3$, ZnO, talc, mica, kaolin, wollastonite, or combinations thereof.

Nucleating agents are widely used to modify the properties of various polymers. Nucleating agents can aid in decreasing foam specific gravity, increasing the number of cells present in the foam, and decreasing cell size in the foam by providing a surface for heterogeneous nucleation of gas bubbles from the supercritical fluid state. For the thermoplastic copolyester compositions and second polymeric materials of the present disclosure, nucleating agents can influence the properties of the final foam article by modifying the quantity, distribution and rate of supercritical fluid conversion from a liquid to a gas during the foaming process as lower pressures. The addition of nucleating agents provides a surface on which the supercritical fluid can be transformed from a liquid to a gas. As a consequence, many nucleation sites will result in many gas cell domains. In a particular example, the nucleating agent can include a metal salt of a fatty acid. In some aspects, the nucleating agent is zinc stearate. In some aspects, the composition or material contains about 0.1 weight percent to about 10 weight percent, about 0.1 weight percent to about 5 weight percent, about 0.1 weight percent to about 2 weight percent, or about 0.5 weight percent to about 2 weight percent of the nucleating agent based upon a total weight of the composition or material.

In some aspects, the additive is a nucleating agent such as talcum, metal oxides such as titanium dioxide or magnesium oxide, phosphates, carbonates or sulfates of, preferably, alkaline earth metals, or mixtures thereof. Alternatively, the nucleating agent can be a mono- or polycarboxylic acids, and the salts thereof, e.g., 4-tert-butylbenzoic acid, adipic acid, diphenylacetic acid, sodium succinate, sodium benzoate, or mixtures thereof. In a further aspect, the additive can be a nucleating agent comprising both an inorganic and an organic material as disclosed herein above.

In some aspects, the rheology modifier can be a nanoparticles having comparatively high aspect ratios, nanoclays, nano-carbon, graphite, nano-silica, and the like.

In some aspects, the additive is a filler or reinforcing agent such as clay, kaolin, talc, asbestos, graphite, glass (such as glass fibers, glass particulates, and glass bulbs, spheres, or spheroids), mica, calcium metasilicate, barium sulfate, zinc sulfide, aluminum hydroxide, silicates, diatomaceous earth, carbonates (such as calcium carbonate, magnesium carbonate and the like), metals (such as titanium, tungsten, zinc, aluminum, bismuth, nickel, molybdenum, iron, copper, brass, boron, bronze, cobalt, beryllium, and alloys of these), metal oxides (such as zinc oxide, iron oxide, aluminum oxide, titanium oxide, magnesium oxide, zirconium oxide and the like), metal hydroxides, particulate synthetic plastics (such as polyethylene, polypropylene, polystyrene, polyamide, polyester, polyurethane, polyimide, and the like), synthetic fibers (such as fibers comprising high molecular weight polyethylene, polypropylene, polystyrene, polyamide, polyester, polyurethane, polyimide, and the like), particulate carbonaceous materials (such as carbon black and the like), wood flour and flours or fibers of other natural products, as well as cotton flock, non-cotton cellulose flock, cellulose pulp, leather fiber, and combinations of any of the above. Non-limiting examples of heavy density filler components that can be used to increase the specific gravity of the cured elastomer composition can include titanium, tungsten, aluminum, bismuth, nickel, molybdenum, iron, steel, lead, copper, brass, boron, boron carbide whiskers, bronze, cobalt, beryllium, zinc, tin, metal oxides (such as zinc oxide, iron oxide, aluminum oxide, titanium oxide, magnesium oxide, and zirconium oxide), metal sulfates (such as barium sulfate), metal carbonates (such as calcium carbonate), and combinations of these. Non-limiting examples of light density filler components that can be used to decrease the specific gravity of the elastomer compound can include particulate plastics, hollow glass spheres, ceramics, and hollow spheres, regrinds, and foams, which can be used in combinations.

In some examples, the disclosed foamed polymeric materials can also include a nanofiller. Nanofillers can not only serve as mechanical reinforcement but also nucleating agents. A variety of nanofillers can be used in lieu of or in addition to the zinc stearate. Nanofillers can include nanomaterials having one-dimensional structures such as of plates, laminas and/or shells; two-dimensional structures such as nanotubes and nanofibres having a diameter lower than 0.1 micrometer; or three-dimensional nanostructures such as nanoparticles or beads. Nanoplate fillers can be natural or synthetic clays, as well as phosphates of transition metals. Clay-based nanocomposites generate an overall improvement in physical performances. The most widely used ones are the phyllosilicates. Nanofillers can include nano-oxides such as nanoparticles of Titanium dioxide or Rutile. Other nanofillers can include nanoparticles of alumina or aluminum oxide, diatomite, and nanoscale carbon materials such as single-wall carbon nanotubes (SWCNT) or double-wall carbon nanotubes (DWCNT).

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The terms "comprises," "comprising," "including," and "having," are inclusive and therefore specify the presence of features, steps, operations, elements, and/or components, but do not preclude the presence or addition of one or more other features, steps, operations, elements, components, and/or groups thereof.

As used in the specification and the appended claims, the singular forms "a," "an" and "the" include plural referents unless the context clearly dictates otherwise. Thus, for example, reference to "a foam particle," "a midsole," or "an adhesive," including, but not limited to, two or more such foam particles, midsoles, or adhesives, and the like.

As used herein, the term "and/or" includes any and all combinations of one or more of the associated listed items.

As used herein, in substance or substantially means at least 50 percent, 60 percent, 75 percent, 90 percent, 95 percent, or more, as determined based on weight or volume.

The terms first, second, third, etc. can be used herein to describe various elements, components, regions, layers and/or sections. These elements, components, regions, layers and/or sections should not be limited by these terms. These terms can be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

As used herein, the modifiers "upper," "lower," "top," "bottom," "upward," "downward," "vertical," "horizontal," "longitudinal," "transverse," "front," "back" etc., unless otherwise defined or made clear from the disclosure, are relative terms meant to place the various structures or orientations of the structures of the article of footwear in the context of an article of footwear worn by a user standing on a flat, horizontal surface.

The term "receiving", such as for "receiving an upper for an article of footwear", when recited in the claims, is not intended to require any particular delivery or receipt of the received item. Rather, the term "receiving" is merely used to recite items that will be referred to in subsequent elements of the claim(s), for purposes of clarity and ease of readability.

The terms "at least one" and "one or more of" an element are used interchangeably, and have the same meaning that includes a single element and a plurality of the elements, and can also be represented by the suffix "(s)" at the end of the element. For example, "at least one polyamide", "one or more polyamides", and "polyamide(s)" can be used interchangeably and have the same meaning.

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1 percent to about 5 percent, but also include individual values (e.g., 1 percent, 2 percent, 3 percent, and 4 percent) and the sub-ranges (e.g., 0.5 percent, 1.1 percent, 2.4 percent, 3.2 percent, and 4.4 percent) within the indicated range.

The terms "about" and "substantially" are used herein with respect to measurable values and ranges due to expected variations known to those skilled in the art (e.g., limitations and variabilities in measurements).

As used herein, the terms "optional" or "optionally" means that the subsequently described component, event or circumstance can or cannot occur, and that the description includes instances where said component, event or circumstance occurs and instances where it does not.

As used herein, the term "units" can be used to refer to individual (co)monomer units such that, for example, styrenic repeat units refers to individual styrene (co)monomer units in the polymer. In addition, the term "units" can be used to refer to polymeric block units such that, for example, "styrene repeating units" can also refer to polystyrene blocks; "units of polyethylene" refers to block units of polyethylene; "units of polypropylene" refers to block units of polypropylene; "units of polybutylene" refers to block units of polybutylene, and so on. Such use will be clear from the context.

The term "copolymer" refers to a polymer having two or more monomer species, and includes terpolymers (i.e., copolymers having three monomer species).

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyamide is interpreted to include one or more polymer molecules of the polyamide, where the polymer molecules may or may not be identical (e.g., different molecular weights and/or isomers).

As used herein the terms "percent by weight" or "weight percent," which can be used interchangeably, indicate the weight percent of a given component based on the total weight of the composition or article, unless otherwise specified. That is, unless otherwise specified, all weight percent values are based on the total weight of the composition. It should be understood that the sum of weight percent values for all components in a disclosed composition or formulation or article are equal to 100.

Similarly, the terms "percent by volume" or "volume percent," which can be used interchangeably, indicate the percent by volume of a given component based on the total volume of the composition or article, unless otherwise specified. That is, unless otherwise specified, all volume percent values are based on the total volume of the composition or article. It should be understood that the sum of volume percent values for all components in a disclosed composition or formulation or article are equal to 100.

Compounds are described using standard nomenclature. For example, any position not substituted by any indicated group is understood to have its valence filled by a bond as indicated, or a hydrogen atom. A dash ("—") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

Unless otherwise specified, temperatures referred to herein are based on atmospheric pressure (i.e. one atmosphere).

Before proceeding to the Examples, it is to be understood that this disclosure is not limited to particular aspects described, and as such may, of course, vary. Other systems, methods, features, and advantages of foam compositions and components thereof will be or become apparent to one with skill in the art upon examination of the following drawings and detailed description. It is intended that all such additional systems, methods, features, and advantages be included within this description, be within the scope of the present disclosure, and be protected by the accompanying claims. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Test Methods

Below are certain sampling procedures and testing methods referenced in the Description and in the Examples.

Sampling Procedures

Various properties of the compositions and foams and other articles formed therefrom can be characterized using samples prepared with the following sampling procedures:

a. Neat Sampling Procedure

The neat sampling procedure can be used to obtain a neat sample of a foamed or unfoamed thermoplastic copolyester composition, an unfoamed or foamed second polymeric material, or, in some instances, a sample of a material (e.g., polymer) used to form a thermoplastic copolyester composition or second polymeric material. The material can be provided in media form, such as flakes, granules, powders, pellets, and the like. If a source of the thermoplastic copolyester composition or second polymeric material is not available in a neat form, the sample can be cut from another component containing the composition or material, thereby isolating a sample of the composition or material.

b. Plaque Sampling Procedure—Solid Composition or Material

The thermoplastic copolyester composition or second polymeric material is molded into a plaque having dimensions of about six inches by about 4 inches and a thickness of about 20 millimeters (or as otherwise specified by the test method). The sample is prepared by mixing together the components of the composition or material, melting the composition or material, pouring, extruding, or injecting the melted composition into a mold cavity, cooling the melted composition or material to solidify it in the mold cavity to form the plaque, and then removing the plaque from the mold cavity.

c. Plaque Sampling Procedure—Foam Composition or Material

The foamed thermoplastic copolyester composition or second polymeric material is foamed into a sheet. The skin is removed from a portion of the sheet, and the skinned portion of the sheet is cut into a plaque having dimensions of about six inches by about four inches and a thickness of about 20 millimeter (mm) (or as otherwise specified by the test method).

d. Component Sampling Procedure

This procedure can be used to obtain a sample of a foamed or unfoamed composition or material when the composition or material is incorporated into a component such as a sole structure or midsole or outsole of an article of footwear. A sample of the component which includes the composition or material is obtained as formed into the component, or cut from the article of footwear using a blade. This process is performed by separating the component from an associated footwear upper, if present, and removing any materials from the article's top surface (e.g., corresponding to the top surface). For example, the article's top surface can be skinned, abraded, scraped, or otherwise cleaned to remove any upper adhesives, yarns, fibers, foams, and the like that could potentially interfere with the test results.

The resulting component sample includes the composition or material. As such, any test using a Component Sampling Procedure can simulate how the composition or material will perform as part of an article of footwear. As specified by the test method, the component may be tested as a full component (e.g., full midsole component), or it can be extracted as a sample having a certain geometry. A sample of a component is taken at a location along the component that provides a substantially constant thickness for the component (within plus or minus 10 percent of the average thickness), such as in a forefoot region, mid-foot region, or a heel region of the article. Unless otherwise specified, the desired harvested geometry is a cylindrical puck with a 45-millimeter diameter and a cylinder height of at least about 10 millimeters, preferably from about 20 to 25 millimeters. Compression testing of the harvested component samples should be tested along the length of the cylinder using compression platens that are at least twice the diameter of the cylindrical puck sample.

Solid Polymer, Thermoplastic Copolyester Composition, and Second Polymeric Material Characterization.

Glass Transition Temperature, Melting Temperature Test

Dynamic scanning calorimetry (DSC) is performed on samples prepared using the Neat Sampling Procedure, or on a portion of a sample prepared using the Plaque Sampling Procedure or the Component Sampling Procedure. The test is conducted using a DSC system such as a TA instruments Q2000. 10-30 mg samples are cycled from negative 90 degrees C. to 225 degrees C. at a rate of 20 degrees C./min and cooled to negative 90 degrees C. at a rate of 10 degrees C./min. Each sample is run in duplicate. The melting temperature and glass transition temperature values are recorded from the second cycle. The melt "peak" was identified as the local maximum of the second heating cycle. If there was more than one peak in the DSC curve, the peak occurring at hotter temperatures was chosen as the molding temperature reference. The tail was identified as the intersection of the tangent of the line of the higher temperature side of the melt peak with the extrapolated baseline. A schematic illustrating the method for determining peak and tail temperatures is shown in FIG. 8.

Cyclic Tensile Test

The cyclic tensile testing is carried out on solid samples prepared using the Plaque Sampling Procedure or the Component Sampling Procedure, having a dog-bone shape as described in ASTM D638 with a 2 mm thickness. In the test, the specimen is placed under a pre-load of 5 N. Strain is controlled to extend the sample to an extension 6 percent at a strain rate of 5 Hz. The stiffness is the load at 6 percent strain divided by the extension at 6 percent strain, giving a value in N/mm. The maximum load (N) observed over the test cycle of 500 cycles is also recorded.

Melt Flow Index Test

The melt flow index is determined using a sample prepared using the Neat Sampling Procedure, or on a portion of a sample prepared using the Plaque Sampling Procedure or the Component Sampling Procedure, according to the test method detailed in ASTM D1238-13 Standard Test Method for Melt Flow Rates of Thermoplastics by Extrusion Plastometer, using Procedure A described therein. Briefly, the melt flow index measures the rate of extrusion of thermoplastics through an orifice at a prescribed temperature and load. In the test method, approximately 7 grams of the sample is loaded into the barrel of the melt flow apparatus, which has been heated to a specified temperature of 210 degrees C., 220 degrees C., or 230 degrees C. A weight of 2.16 kilograms is applied to a plunger and the molten sample is forced through the die. A timed extrudate is collected and weighed. Melt flow rate values are calculated in g/10 min, and are reported with the specified temperature (i.e., 210, 220 or 230 degrees C.) and the weight applied to the plunger (i.e., 2.15 kilograms).

Solid Polymer Abrasion Test (Akron)

Abrasion loss is tested on a sample sheet having a thickness of 3 millimeters, prepared using the Plaque Sampling procedure or the Component Sampling Procedure. The sample sheet is adhered onto an Akron abrasion test specimen with JIS-A hardness of 70 by using an adhesive to prepare a test specimen. Abrasion loss in volume is measured by using an Akron abrasion test machine at a load of 27N, an inclination angle of 15 degree, a preliminary abrasion of 500 times and a test abrasion of 1,000 times according to JIS K6254. The mass and/or volume of the sample is measured before and after the test, with the difference being the abrasion loss. The smaller the abrasion loss volume or mass, the better the abrasion resistance.

Solid Polymer Abrasion Test (DIN)

Abrasion loss is tested on cylindrical test pieces with a diameter of 16 millimeters plus or minus 0.2 millimeters and a minimum thickness of 6 mm cut from sheets using a ASTM standard hole drill. The abrasion loss is measured using Method B of ASTM D 5963-97a on a Gotech GT-7012-D abrasion test machine. The tests are performed at 22 degrees C. with an abrasion path of 40 meters. The Standard Rubber #1 used in the tests has a density of 1.336 grams per cubic centimeter (g/cm$^3$). The smaller the abrasion loss volume, the better the abrasion resistance.

Solid Polymer Abrasion Test (DIN)

Abrasion loss is tested on samples cut from sheets having a minimum thickness of 6 millimeters to 12 millimeters, prepared using the Plaque Sampling Procedure or the Component Sampling Procedure. The cut samples have a cylindrical shape with a diameter of 16 millimeters plus or minus 0.2 millimeters and a minimum thickness of 6 mm to 12 mm cut from sheets using a ASTM standard hole drill. The abrasion loss is measured using Method B of ASTM D 5963-97a on a Gotech GT-7012-D abrasion test machine. The tests are performed at 22 degrees C. with an abrasion path of 40 meters. The sample is abraded with VSM-VITEX-KK511X-60P sandpaper (commercially available from VSM Abrasives Corp.), using an abrasion load of 10 Newton. The mass and/or volume of the sample is measured before and after the test, with the difference being the abrasion loss. The smaller the abrasion loss, the better the abrasion resistance of the material.

Solid Polymer Coefficient of Friction Test (Wet & Dry)

This test measures the coefficient of friction of the Coefficient of Friction Test for a sample (e.g., taken with the above-discussed Component Sampling Procedure, Plaque Sampling Procedure, or the Neat Sampling Procedure). The sample is cut into a rectangular shape measuring approximately 3.0 inches by 3.3 inches, and having a thickness of about 2 millimeters. The sample is permanently adhered to a 1 centimeter thick piece of EVA foam having a density of approximately 0.25 grams/cubic centimeters and having a Durometer hardness of 50 C.

For a dry test (i.e., to determine a dry-state coefficient of friction), the sample is initially equilibrated at 25 degree C. and 20 percent humidity for 24 hours. For a wet test (i.e., to determine a wet-state coefficient of friction), the sample is fully immersed in a deionized water bath maintained at 25 degree C. for 24 hours. After that, the sample is removed from the bath and blotted with a cloth to remove surface water.

The measurement is performed with an aluminum sled mounted on a test track, which is used to perform a sliding friction test for test sample on the surface of the test track. The surface of the test track may include a specified test track material, such as aluminum, wood court surface (wet or dry), smooth concrete surface (wet or dry). The test track measures 127 millimeters wide by 610 millimeters long. The aluminum sled measures 76.2 millimeters by 76.2 millimeters, with a 9.5 millimeter radius cut into the leading edge. The contact area of the aluminum sled with the track is 76.2 millimeters by 66.6 millimeters, or 5,100 square millimeters).

The dry or wet sample is attached to the bottom of the sled using a room temperature-curing two-part epoxy adhesive commercially available under the tradename "LOCTITE 608" from Henkel, Dusseldorf, Germany. The adhesive is used to maintain the planarity of the wet sample, which can curl when saturated. A polystyrene foam having a thickness of about 25.4 millimeters is attached to the top surface of the sled (opposite of the test sample) for structural support.

The sliding friction test is conducted using a screw-driven load frame. A tow cable is attached to the sled with a mount supported in the polystyrene foam structural support, and is wrapped around a pulley to drag the sled across the aluminum test track. The sliding or frictional force is measured using a load transducer with a capacity of 2,000 Newtons. The normal force is controlled by placing weights on top of the aluminum sled, supported by the foam structural support, for a total sled weight of 1000 Newtons). The crosshead of the test frame has a speed of 0.4 meters/second, and the total test displacement is 250 millimeters. The coefficient of friction is calculated based on the steady-state force parallel to the direction of movement required to pull the sled at constant velocity. The coefficient of friction itself is found by dividing the steady-state pull force by the applied normal force. Any transient value relating static coefficient of friction at the start of the test is ignored.

Ply Adhesion Testing

Ply adhesion testing determines the adhesion between two bonded plies of material (e.g., a thermoplastic copolyester composition and a second polymeric material) using a tensile testing device such as an Instron Electropuls E10000 (Instron, Norwood, Massachusetts, USA). Sample plies of each material may be provided using the Neat Sampling Procedure or the Plaque Sampling Procedure or Component Sampling Procedure, and the plies are thereafter bonded using a specified method. Alternatively, a sample of bonded plies may be provided by using the Component Sampling Procedure. On one end of the sample, the bond between the plies is carefully separated to provide approximately 0.5 centimeter unbonded length that may be inserted into the crossheads of the tensile testing device. A first ply is inserted into a first grip of the tensile tester, and a second ply is inserted into a second grip of the tensile tester so that the sample between the grips is substantially straight. The crosshead speed is set to 50 millimeters per minute. The peel strength is measured throughout the separation of the bonded sample until the bond fully separates or the sample fails. The force per peel distance is reported (kilograms force/centimeter), and the mode of failure (either adhesive or cohesive) is recorded for each sample.

Foam Characterization.

Density Test

The density is measured for samples taken using the Plaque Sampling Procedure, or the Component Sampling Procedure, using a digital balance or a Densicom Tester (Qualitest, Plantation, Florida, USA). For each sample a sample volume is determined in cubic centimeters, and then each sample is weighed (g). The density of the sample is the mass divided by the sample volume, given in grams/cubic centimeters.

Specific Gravity Test

The specific gravity (SG) is measured for samples taken using the Plaque Sampling Procedure, or the Component Sampling Procedure, using a digital balance or a Densicom Tester (Qualitest, Plantation, Florida, USA). Each sample is weighed (g) and then is submerged in a distilled water bath (at 22 degrees C. plus or minus 2 degrees C.). To avoid errors, air bubbles on the surface of the samples are removed, e.g., by wiping isopropyl alcohol on the sample before immersing the sample in water, or using a brush after the sample is immersed. The weight of the sample in the distilled water is recorded. The specific gravity is calculated with the following formula:

$$S.G. = \frac{\text{Weight of the sample in air}(g)}{\text{Weight of sample in air}(g) - \text{Weight of sample in water}(g)}$$

Water Uptake Test

This test measures the water uptake capacity of a foam sample after a soaking duration of 5 minutes. A 1-centimeter core sample is removed from a foam sample prepared using the Plaque Sampling Procedure or Component Sampling Procedure, starting from the side wall of the foamed article, e.g., the midsole of an article of footwear. The core is then cut to provide a cylindrical sample having a 1-centimeter cylinder height, ensuring that the side wall remains as part of the core sample. The sample is conditioned in an oven for 24 hours at 50 degrees C. plus or minus 3 degrees C. After conditioning, the sample is cooled for 30 minutes in a lab environment at a temperature of 22 degrees C. plus or minus 2 degrees C., and then is immediately weighed, and the weight recorded in grams (W_0). The surface of the side wall is masked with masking tape, while all other surfaces are sealed with a nonpermeable coating. When the surfaces are fully coated, the sidewall surface is unmasked. The coated sample is then conditioned in an oven for 24 hours at 50 degrees C. plus or minus 3 degrees C., cooled for 30 minutes in a lab environment at a temperature of 22 degrees C. plus or minus 2 degrees C., and then is immediately weighed and the weight recorded in grams (W_i). The dried sample is fully immersed in a deionized water bath maintained at 22 degrees C. plus or minus 2 degrees C., for a duration of 5 minutes. After the soaking duration, the sample is removed from the deionized water bath, blotted with a cloth to remove surface water, and the total weight of the soaked sample (W_f) is measured in grams (W_f). The water uptake for the time period is calculated as follows:

$$\text{Water Uptake Capacity} = \frac{W\_f - W\_i}{W\_i} \times 100\%$$

Force/Displacement Test (Cyclic Compression Test)

Force/displacement behavior for the foams and the foamed articles is measured using samples having a diameter of 45 millimeters and a thickness of at least 10 millimeters (preferably 20 to 25 millimeters) prepared using the Plaque Sampling Procedure or the Component Sampling Procedure with a cyclic compression testing device such an Instron Electropuls E10000 (Instron, Norwood, Massachusetts, USA) with a stainless steel circular cross section impact geometry having a diameter at least twice the diameter of the foam sample (e.g., for a 45-millimeter diameter sample, a 90-millimeter diameter platen). Each sample is compressed to 50% strain at 5 Hz for 500 cycles. Stiffness, efficiency, and energy return are measured from the force vs. displacement curves for cycles 200, 300, 400, and 500. Stiffness of a particular foam sample is the stress at the maximum strain divided by the maximum strain, giving a value in kPa or N/mm. Efficiency of a foam sample is the integral of the unloading force-displacement curve divided by the integral of the loading force-displacement curve. Energy return of a foam sample is the integral of the unloading force-displacement curve, giving a value in mJ. The reported value for each metric is the average of each metric between cycles 200, 300, 400, and 500. All fatigue metrics are defined as relative differences in properties at the end of the test compared to the same properties at the beginning of the test (i.e., cycle 1).

In some cases, a full midsole is tested using a footform for impact instead of a cylindrical tupp to more accurately simulate full gate loading. For these tests, a US mens size 10 midsole is tested, and a mens size 9 footform used for impact, with a load of 2000N being applied to the midsole with the footform at a loading rate of 5 Hz. All of the metrics from the footform test are collected and analyzed as described above.

As with when a cylindrical tupp is used, when a footform is used, energy input is taken as the integral of the force-displacement curve during compression force loading. Energy return is taken as the integral of the force displacement curve during unloading. Hysteresis is taken as the ratio: (energy return)/(energy input), which can also be viewed as the energy efficiency of the foam. Fatigue behavior is judged by changes in the foam displacement at the max load of a cycle. All measured properties: stiffness, hysteresis, and fatigue are measured for thousands of cycles for both running and walking compression cycles.

Durometer Hardness Test—Shore A

The test used to obtain the hardness values for the foam articles is as follows. A flat foam sample is prepared using the Plaque Sampling Procedure or the Component Sampling Procedure, where the sample has a minimum of 6 mm thick for Shore A durometer testing. If necessary, samples are stacked to make up the minimum thickness. Samples are large enough to allow all measurements to be performed at a minimum of 12 mm from the edge of the sample and at least 12 mm from any other measurement. Regions tested are flat and parallel with an area at least 6 mm in diameter. A minimum of five hardness measurements are taken and tested using a 1 kilogram head weight.

Split Tear Test

The split tear test can determine the internal tear strength for a foam material. A sample may be provided either using the Plaque Sampling Procedure or the Component Sampling Procedure. The sample is die cut into a rectangular shape having a width of 1.54 centimeters and a length of 15.24 centimeters (1 inch by 6 inches), and having a thickness of 10 millimeters, plus or minus 1 millimeter. On one end, a cut is made into the sample that bisects the thickness, the cut extending the full width of the sample, and 3 centimeters from the end of the sample. Starting from the end of the cut, 5 marks are placed along the length of the sample spaced 2 centimeters apart. The cut ends of the sample are placed in the clamps of a tensile tester. Each section of the sample is held in a clamp in such a manner that the original adjacent cut edges form a straight line joining the centers of the clamps. The crosshead speed is set to 50 millimeters per minute. The tear strength is measured throughout the separation of the crossheads. If necessary, a sharp knife may be used to keep separating the foam in the center of the sample, discarding the readings caused by cutting of the knife. The lowest split tear strength values are recorded for each of the five marked segments of the sample (between each of the 2-centimeter markings). An average split tear strength value is recorded for each sample. If a segment of a sample has an air bubble measuring more than 2 millimeters, the tear strength for the segment is discarded, and the air bubble recorded as a test defect. If more than one segment of a sample has an air bubble measuring more than 2 millimeters, the entire sample is discarded.

Hand Pull Test

The hand pull test can evaluate the bond strength between two foams, compositions or materials, such as between a solid and a foam or between two different foams. Depending upon the bonding method used, a sample of two pre-bonded foams, compositions or materials may be provided either using the Plaque Sampling Procedure or the Component Sampling Procedure. Alternatively, separate samples of a foam, a composition or a material can be prepared using the Plaque Sampling Procedure or the Component Sampling Procedure, and then can be bonded together using the bonding method to be evaluated. The sample is die cut into a rectangular shape having a width of 1.54 centimeters and a length of 15.24 centimeters (1 inch by 6 inches), and having a thickness of 10 millimeters, plus or minus 1 millimeter. On one end, a cut is made into the sample that bisects the thickness, the cut extending the full width of the sample, and 3 centimeters from the end of the sample. Starting from the end of the cut, 5 marks are placed along the length of the sample spaced 2 centimeters apart. The cut ends of the sample are held in the tester's hand and pulled at a rate of approximately 50 millimeters per minute. If necessary, a sharp knife may be used to keep separating the material in the center of the sample, discarding the readings caused by cutting of the knife. Tear strength values are recorded for each of the five marked segments of the sample (between each of the 2-centimeter markings), using the following scoring rubric: easy to peel or adhesive failure is given a score of 1; an adhesive failure but some resistance is given a score of 2; cohesive foam failure is given a score of 3 to 4.5 based on the accompanying level of foam skin failure, where 3 is the highest level of foam skin failure and 4.5 is the lowest level of foam skin failure; and unable to separate is given a score of 5. The scores for each segment are averaged to give value recorded for each sample. If a segment of a sample has an air bubble measuring more than 2 millimeters, the tear strength for the segment is discarded, and the air bubble recorded as a test defect. If more than one segment of a sample has an air bubble measuring more than 2 millimeters, the entire sample is discarded.

Aspects

The following listing of exemplary aspects supports and is supported by the disclosure provided herein.

Aspect 1. A thermoplastic copolyester composition comprising:
a thermoplastic copolyester comprising,
(a) a plurality of first segments, each first segment derived from a dihydroxy-terminated polydiol;
(b) a plurality of second segments, each second segment derived from a diol; and
(c) a plurality of third segments, each third segment derived from an aromatic dicarboxylic acid.

Aspect 2. The thermoplastic copolyester composition of Aspect 1, wherein the thermoplastic copolyester is a block copolymer; a segmented copolymer; a random copolymer; or a condensation copolymer.

Aspect 3. The thermoplastic copolyester composition of Aspects 1 or 2, wherein the thermoplastic copolyester has a weight average molecular weight of about 50,000 Daltons to about 1,000,000 Daltons.

Aspect 4. The thermoplastic copolyester composition of Aspect 3, wherein the thermoplastic copolyester has a weight average molecular weight of about 50,000 Daltons to about 500,000 Daltons; about 75,000 Daltons to about 300,000 Daltons; or about 100,000 Daltons to about 200,000 Daltons.

Aspect 5. The thermoplastic copolyester composition of any one of Aspects 1-4, wherein the thermoplastic copolyester has a ratio of first segments to third segments from about 1:1 to about 1:5 based on the weight of each of the first segments and the third segments.

Aspect 6. The thermoplastic copolyester composition of Aspect 5, wherein the thermoplastic copolyester has a ratio of first segments to third segments from about 1:1 to about 1:3 or about 1:1 to about 1:2 based on the weight of each of the first segments and the third segments.

Aspect 7. The thermoplastic copolyester composition of any one of Aspects 1-6, wherein the thermoplastic copolyester has a ratio of second segments to third segments from about 1:1 to about 1:3 based on the weight of each of the first segments and the third segments.

Aspect 8. The thermoplastic copolyester composition Aspect 7, wherein the thermoplastic copolyester has a ratio of second segments to third segments from about 1:1 to about 1:2 or about 1:1 to about 1:1.52 based on the weight of each of the first segments and the third segments.

Aspect 9. The thermoplastic copolyester composition of any one of Aspects 1-8, wherein the first segments derived from a dihydroxy-terminated polydiol comprise segments derived from a poly(alkylene oxide)diol having a number-average molecular weight of about 250 Daltons to about 6000 Daltons.

Aspect 10. The thermoplastic copolyester composition of Aspect 9, wherein the number-average molecular weight is about 400 Daltons to about 6,000 Daltons; about 350 Daltons to about 5,000 Daltons; or about 500 Daltons to about 3,000 Daltons.

Aspect 11. The thermoplastic copolyester composition of any one of Aspects 9-10, wherein the poly(alkylene oxide)diol is poly(ethylene ether)diol; poly(propylene ether)diol; poly(tetramethylene ether)diol; poly(pentamethylene ether)diol; poly(hexamethylene ether)diol; poly(heptamethylene ether)diol; poly(octamethylene ether)diol; poly(nonamethylene ether)diol; poly(decamethylene ether)diol; or mixtures thereof.

Aspect 12. The thermoplastic copolyester composition of Aspect 11, wherein the poly(alkylene oxide)diol is poly(ethylene ether)diol; poly(propylene ether)diol; poly(tetramethylene ether)diol; poly(pentamethylene ether)diol; or poly(hexamethylene ether)diol.

Aspect 13. The thermoplastic copolyester composition of Aspect 11, wherein the poly(alkylene oxide)diol is poly(tetramethylene ether)diol.

Aspect 14. The thermoplastic copolyester composition of any one of Aspects 1-13, wherein the second segments derived from a diol comprise a diol having a molecular weight of less than about 250.

Aspect 15. The thermoplastic copolyester composition of Aspect 14, wherein the diol is a C2-C8 diol.

Aspect 16. The thermoplastic copolyester composition of Aspect 15, wherein the second segments derived from a diol comprise a diol selected from ethanediol; propanediol; butanediol; pentanediol; 2-methyl propanediol; 2,2-dimethyl propanediol; hexanediol; 1,2-dihydroxy cyclohexane; 1,3-dihydroxy cyclohexane; 1,4-dihydroxy cyclohexane; and mixtures thereof.

Aspect 17. The thermoplastic copolyester composition of Aspect 16, wherein the diol is selected from 1,2-ethanediol, 1,3-propanediol, 1,4-butanediol, 1,6-hexanediol, and mixtures thereof.

Aspect 18. The thermoplastic copolyester composition of any one of Aspects 1-17, wherein the third segments derived from an aromatic dicarboxylic acid comprise an aromatic C5-C16 dicarboxylic acid.

Aspect 19. The thermoplastic copolyester composition of Aspect 18, wherein the aromatic C5-C16 dicarboxylic acid has a molecular weight less than about 300 Daltons or about 120 Daltons to about 200 Daltons.

Aspect 20. The thermoplastic copolyester composition of Aspect 18, wherein the aromatic C5-C16 dicarboxylic acid is terephthalic acid, phthalic acid, isophthalic acid, or a derivative thereof.

Aspect 21. The thermoplastic copolyester composition of Aspect 20, wherein the aromatic C5-C16 dicarboxylic acid is terephthalic acid or the dimethyl ester derivative thereof.

Aspect 22. The thermoplastic copolyester composition of any one of Aspects 1-21, wherein the thermoplastic copolyester comprises,
(a) a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a formula 1:

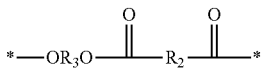
(2)

wherein $R_1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and (b) a plurality of second copolyester units, each second copolyester unit of the plurality comprising the second segment derived from a diol and the third segment derived from an aromatic dicarboxylic acid, wherein the second copolyester unit has a structure represented by a formula 2:

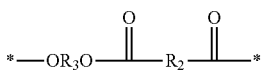
(2)

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment.

Aspect 23. The thermoplastic copolyester composition of Aspect 22, wherein the first copolyester unit has a structure represented by a formula 3:

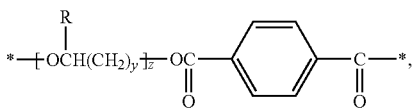
(3)

wherein R is H or methyl; wherein y is an integer having a value from 1 to 10; wherein z is an integer having a value from 2 to 60; and wherein a weight average molecular weight of each of the plurality of first copolyester units is from about 300 Daltons to about 7,000 Daltons.

Aspect 24. The thermoplastic copolyester composition of Aspect 23, wherein y is an integer having a value of 1, 2, 3, 4, or 5.

Aspect 25. The thermoplastic copolyester composition of Aspect 23 or 24, wherein R is hydrogen; wherein R is methyl; wherein R is hydrogen and y is an integer having a value of 1, 2, or 3; or wherein R is methyl and y is an integer having a value of 1.

Aspect 26. The thermoplastic copolyester composition of Aspect 22, wherein the first copolyester unit has a structure represented by a formula 4:

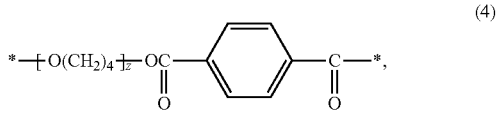
(4)

wherein z is an integer having a value from 2 to 60; and wherein a weight average molecular weight of each of the plurality of first copolyester units is from about 300 Daltons to about 7,000 Daltons.

Aspect 27. The thermoplastic copolyester composition of any one of Aspects 23-26, wherein z is an integer having a value from 5 to 60; from 5 to 50; from 5 to 40; from 4 to 30; from 4 to 20; or from 2 to 10.

Aspect 28. The thermoplastic copolyester composition of any one of Aspects 23-27, wherein the weight average molecular weight of each of the plurality of first copolyester units is from about 400 Daltons to about 6,000 Daltons; from about 400 Daltons to about 5,000 Daltons; from about 400 Daltons to about 4,000 Daltons; from about 400 Daltons to about 3,000 Daltons; from about 500 Daltons to about 6,000 Daltons; from about 500 Daltons to about 5,000 Daltons; from about 500 Daltons to about 4,000 Daltons; from about 500 Daltons to about 3,000 Daltons; from about 600 Daltons to about 6,000 Daltons; from about 600 Daltons to about 5,000 Daltons; from about 600 Daltons to about 4,000 Daltons; from about 600 Daltons to about 3,000 Daltons.

Aspect 29. The thermoplastic copolyester composition of any one of Aspects 22-28, wherein the second copolyester unit has a structure represented by a formula 5:

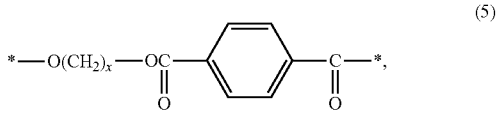
(5)

wherein x is an integer having a value from 1 to 20.

Aspect 30. The thermoplastic copolyester composition of Aspect 29, wherein x is an integer having a value from 2 to 18; a value from 2 to 17; a value from 2 to 16; a value from 2 to 15; a value from 2 to 14; a value from 2 to 13; a value from 2 to 12; a value from 2 to 11; a value from 2 to 10; a value from 2 to 9; a value from 2 to 8; a value from 2 to 7; a value from 2 to 6; or a value of 2, 3, or 4.

Aspect 31. The thermoplastic copolyester composition of Aspect 29, wherein the second copolyester unit has a structure represented by a formula 6:

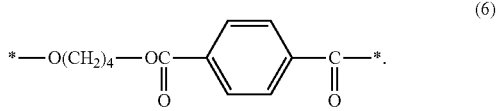
(6)

Aspect 32. The thermoplastic copolyester composition of any one of Aspects 22-31, wherein the thermoplastic copolyester comprises a weight percent of the plurality of first copolyester units based on total weight of the thermoplastic copolyester of about 30 weight percent to about 80 weight; about 40 weight percent to about 80 weight percent; about 50 weight percent to about 80 weight percent; about 30 weight percent to about 70 weight percent; about 40 weight percent to about 70 weight percent; or about 50 weight percent to about 70 weight percent.

Aspect 33. The thermoplastic copolyester composition of any one of Aspects 22-32, wherein the thermoplastic copolyester comprises a weight percent of the plurality of second copolyester units based on total weight of the thermoplastic copolyester of about 40 weight percent to about 65 weight percent; about 45 weight percent to about 65 weight percent; about 50 weight percent to about 65 weight percent; about 55 weight percent to about 65 weight percent; about 40 weight percent to about 60 weight percent; about 45 weight percent to about 60 weight percent; about 50 weight percent to about 60 weight percent; or about 55 weight percent to about 60 weight percent.

Aspect 34. The thermoplastic copolyester composition of any one of Aspects 1-33, wherein the thermoplastic copolyester composition further comprises an additive.

Aspect 35. The thermoplastic copolyester composition of Aspect 34, wherein the additive is present in an amount from about 0.1 weight percent to about 10 weight percent based on the total weight of the foamed polymeric material.

Aspect 36. The thermoplastic copolyester composition of Aspects 34 or 35, wherein the additive is a wax, an antioxidant, a UV-absorbing agent, a coloring agent, or combinations thereof.

Aspect 37. The thermoplastic copolyester composition of any one of Aspects 1-36, wherein the thermoplastic copolyester composition further comprises a filler.

Aspect 38. The thermoplastic copolyester composition e of Aspect 37, wherein the filler is present in an amount from about 0.05 weight percent to about 20 weight percent or from about 0.1 weight percent to about 10 weight percent based on the total weight of the foamed polymeric material.

Aspect 39. The thermoplastic copolyester composition of any one of Aspect 37 or 38, wherein the filler is a particulate filler; or wherein the filler is a carbonaceous filler.

Aspect 40. The thermoplastic copolyester composition of Aspect 39, wherein the carbonaceous filler is carbon black, activated carbon, graphite, carbon fibers, carbon fibrils, carbon nanoparticles, or combinations thereof; and wherein the carbonaceous filler is optionally chemically-modified.

Aspect 41. The thermoplastic copolyester composition of Aspect 37, wherein the filler is an inorganic filler.

Aspect 42. The thermoplastic copolyester composition of Aspect 41, wherein the inorganic filler is an oxide, a hydroxide, a salt, a silicate, a metal, or combinations thereof; or wherein the inorganic filler comprises glass spheres, glass fibers, glass hollow spheres, glass flakes, MgO, $SiO_2$, $Sb_2O_3$, $Al_2O_3$, ZnO, talc, mica, kaolin, wollastonite, or combinations thereof.

Aspect 43. The thermoplastic copolyester composition of any one of Aspects 37-41, wherein the filler is present in an amount for from about 0.1 weight percent to less than about 15 weight percent.

Aspect 44. The thermoplastic copolyester composition of Aspect 43, wherein the filler is present in an amount for from about 0.1 weight percent to about 10 weight percent.

Aspect 45. The thermoplastic copolyester composition of Aspect 43, wherein the filler is present in an amount for from about 0.1 weight percent to about 7.5 weight percent.

Aspect 46. The thermoplastic copolyester composition of Aspect 43, wherein the filler is present in an amount for from about 0.1 weight percent to about 5 weight percent.

Aspect 47. The thermoplastic copolyester composition of Aspect 43, wherein the filler is present in an amount for from about 0.1 weight percent to about 4 weight percent.

Aspect 48. The thermoplastic copolyester composition of any one of Aspects 1-48, wherein the thermoplastic copolyester composition consists essentially of one or more thermoplastic copolyester.

Aspect 49. The thermoplastic copolyester composition of any one of Aspects 1-48, further comprising at least one ionomer.

Aspect 50. The thermoplastic copolyester composition of any one of Aspects 1-48, further comprising at least one thermoplastic polyurethane.

Aspect 51. The thermoplastic copolyester composition of any one of Aspects 1-50, wherein the thermoplastic copolyester composition is substantially free of a thermoplastic polyamide polymer, include polyamide copolymers such as polyether block amide copolymers.

Aspect 52. The thermoplastic copolyester composition of any one of Aspects 1-50, wherein the thermoplastic copolyester composition is substantially free of a thermoplastic polyolefin polymers, including polyethylene and polypropylene and/or polyolefin copolymers such as ethylene-vinyl acetate copolymers.

Aspect 53. The thermoplastic copolyester composition of any one of Aspects 1-52, wherein the thermoplastic copolyester has a zero shear viscosity when determined using a cyclic tensile test as described herein of about 10 to about 10,000 pascal-second; about 100 to about 7,000 pascal-second; or about 1,000 to about 5,000 pascal-second.

Aspect 54. A method for making a foam article, the method comprising:
  forming a mixture of molten polymeric material comprising a thermoplastic elastomer and a blowing agent;
  injecting the mixture into a mold cavity;
  foaming the molten polymeric material, thereby forming a foamed molten polymeric material;
  solidifying the foamed molten polymeric material, thereby forming a foam article having a multicellular foam structure; and
  removing the foam article from the mold cavity.

Aspect 55. The method of Aspect 54, wherein the thermoplastic elastomer is a thermoplastic copolyester of any one of Aspects 1-53.

Aspect 56. The method of Aspect 54 or 55, wherein the blowing agent is a physical blowing agent.

Aspect 57. The method of Aspect 56, wherein the physical blowing agent is a supercritical fluid.

Aspect 58. The method of Aspect 57, wherein the supercritical fluid comprises nitrogen, or a supercritical fluid thereof.

Aspect 59. The method of Aspect 58, wherein the supercritical fluid comprises or consists essentially of nitrogen, or a supercritical fluid thereof.

Aspect 60. The method of Aspect 58, wherein the supercritical fluid further comprises carbon dioxide, or a supercritical fluid thereof.

Aspect 61. The method of Aspect 60, wherein the carbon dioxide is present in an amount of about 1% to about 3% or about 1% to about 5% by weight based on upon a total weight of the mixture.

Aspect 62. The method of any one of Aspects 58-61, wherein the nitrogen is present in an amount of about 1% to about 3% or about 1% to about 5% by weight based on upon a total weight of the mixture.

Aspect 63. The method of any one of Aspects 55-61, wherein the forming the mixture of the molten polymeric material and the physical blowing agent comprises adding the physical blowing agent to the molten polymer material and forming a single phase solution of the physical blowing agent dissolved in the molten polymer material.

Aspect 64. The method of any one of Aspects 55-61, wherein the forming the mixture of the molten polymer material and the physical blowing agent comprises infusing a solid resin comprising the polymeric material with the physical blowing agent to form infused resin, and melting the infused resin to form a single phase solution of the physical blowing agent dissolved in the molten polymeric mixture.

Aspect 65. The method of any one of Aspects 55-64, wherein the injecting the mixture into the mold cavity comprises injecting the mixture into a pressurized mold cavity, the pressurized mold cavity having a first pressure greater than atmospheric pressure; and the foaming the molten polymeric material comprises decreasing the first pressure to a second pressure and initiating formation of gas bubbles by the physical blowing agent, thereby foaming the molten polymeric material.

Aspect 66. The method of any one of Aspects 63-65, wherein the injecting the mixture into the mold cavity comprises injecting the mixture into a pressurized mold cavity having a first pressure greater than atmospheric pressure.

Aspect 67. The method of Aspect 66, wherein the method comprises applying a gas counter pressure to the mold cavity of from about 100 psi to about 3,000 psi, or from about 550 psi to about 1500 psi, or from about 650 psi to about 1000 psi, and wherein the gas counter pressure is applied to the mold cavity before the foaming.

Aspect 68. The method of Aspect 65, wherein the second pressure is atmospheric pressure; and wherein decreasing the first pressure to the second pressure comprises venting the pressurized mold cavity to atmospheric pressure.

Aspect 69. The method of Aspect 65, wherein the second pressure is atmospheric pressure; and wherein decreasing the first pressure to the second pressure comprises using a controlled rate of pressure decrease until the mold cavity has a pressure essentially equal to atmospheric pressure.

Aspect 70. The method of Aspect 65, wherein the controlled rate of pressure decrease is from about 10 psi per sec to about 600 psi per sec, or from about 15 psi per sec to about 300 psi per sec, or from about 20 psi per sec to about 150 psi per sec.

Aspect 71. The method of Aspect 65, wherein the second pressure is atmospheric pressure; and wherein decreasing the first pressure to a second pressure comprises decreasing the pressure in a plurality of step decreases in pressure until the mold cavity has a pressure essentially equal to atmospheric pressure.

Aspect 72. The method of Aspect 54, wherein the blowing agent is a chemical blowing agent.

Aspect 73. The method of Aspect 72, wherein the chemical blowing agent is present in an amount from about 0.05 weight percent to about 25 weight percent or about 0.1 weight percent to about 10 weight percent based on the total weight of the polymeric mixture.

Aspect 74. The method of Aspect 72 or 73, wherein the chemical blowing is an azo compound.

Aspect 75. The method of any one of Aspects 54-74, wherein the foam article is substantially free of a chemical blowing agent or a decomposition product thereof.

Aspect 76. The method of any one of Aspects 54-74, wherein the foam article is substantially free of a physical blowing agent.

Aspect 77. The method of Aspect 54, wherein the blowing agent comprises a combination of a physical blowing agent and a chemical blowing agent.

Aspect 78. The method of any one of Aspects 54-77, wherein the mixture has an injection temperature; and wherein the injection temperature is from about the melting temperature of the thermoplastic elastomer to about 50 degrees C. above the tail temperature of the thermoplastic elastomer.

Aspect 79. The method of Aspect 78, wherein the injection temperature is from about the melting temperature of the thermoplastic elastomer to a temperature that is above the tail temperature of the thermoplastic elastomer by about 0 degrees C., 5 degrees C., 10 degrees C., 15 degrees C., 20 degrees C., 25 degrees C., 30 degrees C., 35 degrees C., 40 degrees C., 45 degrees C., or 50 degrees C.

Aspect 80. The method of any one of Aspects 54-79, wherein the foaming occurs at a foaming temperature; and wherein the foaming temperature is from about the melting temperature of the thermoplastic elastomer to about 50 degrees C. above the tail temperature of the thermoplastic elastomer.

Aspect 81. The method of Aspect 80, wherein the foaming temperature is from about the melting temperature of the thermoplastic elastomer to a temperature that is above the tail temperature of the thermoplastic copolyester by about 0 degrees C., 5 degrees C., 10 degrees C., 15 degrees C., 20 degrees C., 25 degrees C., 30 degrees C., 35 degrees C., 40 degrees C., 45 degrees C., or 50 degrees C.

Aspect 82. The method of any one of Aspects 54-81, wherein the foam article is a thermoplastic foam article.

Aspect 83. The method of any one of Aspects 54-82, wherein the multicellular foam structure is a closed cell foam structure.

Aspect 84. The method of any one of Aspects 54-82, wherein the multicellular foam structure is an open cell foam structure.

Aspect 85. The method of any one of Aspects 54-84, wherein the multicellular foam has an average cell size of from about 50 micron to about 5 millimeters; from about 100 micron to about 1 millimeters; or from about 50 micron to about 1 millimeters.

Aspect 86. The method of any one of Aspects 54-84, wherein the thermoplastic elastomer does not form crosslinks during foaming; or wherein the thermoplastic elastomer does not form crosslinks during solidifying.

Aspect 87. The method of any one of Aspects 54-86, wherein the solidifying comprises cooling the mold cavity; or wherein the solidifying comprises cooling the foamed molten polymeric material.

Aspect 88. The method of any one of Aspects 54-87, wherein the foaming comprises releasing pressure from the mold cavity at a mold cavity pressure release rate.

Aspect 89. The method of Aspect 88, wherein the mold cavity pressure release rate is about 10 psi per sec to about 600 psi per sec, or about 15 psi per sec to about 300 psi per sec, or about 20 psi per sec to about 150 psi per sec.

Aspect 90. The method of any one of Aspects 54-87, wherein the foaming comprises providing a gas counter pressure to the mold cavity.

Aspect 91. The method of Aspect 90, wherein the gas counter pressure is at least about 550 psi, about 550 psi to about 1500 psi, or about 650 psi to about 1000 psi.

Aspect 92. The method of Aspect 91, wherein the blowing agent is a physical blowing agent; or wherein the blowing agent is supercritical nitrogen.

Aspect 93. The method of any one of Aspects 54-92, the method further comprising placing a textile element in the mold cavity prior to injecting the mixture, and foaming the molten polymeric material in contact with the textile element.

Aspect 94. The method of Aspect 93, wherein the textile element comprises thermoplastic polyester fibers, thermoplastic polyester yarns, thermoplastic polyurethane fibers, thermoplastic polyurethane yarns, thermoplastic polyamide fibers, thermoplastic polyamide yarns, or combinations thereof.

Aspect 95. The method of Aspects 93 or 94, wherein the textile element is a component for an upper for an article of footwear.

Aspect 96. The method of any one of Aspects 54-95, wherein the foam article is a component of an article of footwear.

Aspect 97. The method of Aspect 96, wherein the foam article is a midsole.

Aspect 98. The method of any one of Aspects 54-95, wherein the foam article is a component of an article of apparel.

Aspect 99. The method of any one of Aspects 54-95, wherein the foam article is a component of an article of sporting equipment.

Aspect 100. The method of any one of Aspects 54-99, wherein the injecting comprises monitoring an injection pressure of the mixture prior or during the injecting, and controlling the injecting based on the injection pressure of the mixture.

Aspect 101. The method of any one of Aspects 54-100, wherein the injecting comprises controlling the injection temperature of the mixture prior to the mixture entering the mold cavity.

Aspect 102. The method of any one of Aspects 54-101, wherein the injecting comprises controlling a mold cavity temperature prior to the mixture entering the mold cavity.

Aspect 103. The method of any one of Aspects 54-102, wherein the mixture has an expansion ratio of 1 as compared to a volume of the mold cavity.

Aspect 104. The method of any one of Aspects 54-103, wherein, following removing the foam article from the mold cavity, cooling the foam article to about 25 degrees C., and equilibrating the foam article at about 25 degrees C. and about 1 atm of pressure, a volume of the equilibrated foam article is within plus or minus 5 percent of a volume of the mold cavity.

Aspect 105. The method of any one of Aspects 54-104, wherein the multicellular foam structure has a closed cell foam microstructure.

Aspect 106. The method of any one of Aspects 54-105, wherein the multicellular foam structure has an open cell foam microstructure.

Aspect 107. The method of Aspect 106, wherein the multicellular foam structure comprises less than 10 percent of cells having a closed cell microstructure.

Aspect 108. The method of Aspect 106, wherein the multicellular foam structure comprises less than 5 percent of cells having a closed cell microstructure.

Aspect 109. The method of Aspect 106, wherein the multicellular foam structure comprises less than 1 percent of cells having a closed cell microstructure.

Aspect 110. The method of any one of Aspects 54-109, wherein the multicellular foam structure has an average cell size of from about 50 micron to about 5 millimeters; from about 100 micron to about 1 millimeters; or from about 50 micron to about 1 millimeters.

Aspect 111. The method of any one of Aspects 54-110, wherein the foam article has a maximum load of about 100 N to about 4000 N when determined using the Cyclic Tensile test as described herein.

Aspect 112. The method of Aspect 111, wherein the foam article has a maximum load of about 100 N to about 4000 N when determined using the Cyclic Tensile test as described herein.

Aspect 113. The method of any one of Aspects 54-112, wherein the foam article has an energy efficiency of greater than or equal to about 50 percent when determined using the Cyclic Compression test as described herein.

Aspect 114. The foam article of Aspect 113, wherein the foam article has an energy efficiency of greater than or equal to about 60 percent when determined using the Cyclic Compression test as described herein.

Aspect 115. The method of Aspect 113, wherein the foam article has an energy efficiency of greater than or equal to about 70 percent when determined using the Cyclic Compression test as described herein.

Aspect 116. The method of Aspect 113, wherein the foam article has an energy efficiency of about 50 percent to about 97 percent when determined using the Cyclic Compression test as described herein.

Aspect 117. The method of any one of Aspects 54-116, wherein the foam article has an energy return of about 200 millijoules (mJ) to 1200 mJ when determined using the Cyclic Compression test as described herein.

Aspect 118. The method of Aspect 117, wherein the foam article has an energy return of about 400 mJ to 1000 mJ when determined using the Cyclic Compression test as described herein.

Aspect 119. The method of Aspect 117, wherein the foam article has an energy return of about 600 mJ to 800 mJ when determined using the Cyclic Compression test as described herein.

Aspect 120. The method of any one of Aspects 54-119, wherein the foam article has a split tear value of about 1.0 kilogram per centimeter to 4.5 kilogram per centimeter, about 1.6 kilogram per centimeter to 4.0 kilogram per centimeter, about 2.0 kilogram per centimeter to 4.0 kilogram per centimeter, about 2.0 kilogram per centimeter to 3.5 kilogram per centimeter, about 2.5 kilogram per centimeter to 3.5 kilogram per centimeter, about 0.07 kilogram per centimeter to 2.0 kilogram per centimeter, or about 0.8 kilogram per centimeter to 1.5 kilogram per centimeter, or about 0.9 to 1.2 kilogram per centimeter, about 1.5 kilogram per centimeter to 2.2 kilogram per centimeter; about 0.08 kilogram per centimeter to 4.0 kilogram per centimeter, about 0.9 kilogram per centimeter to 3.0 kilogram per centimeter, about 1.0 to 2.0 kilogram per centimeter, about 1.0 kilogram per centimeter to 1.5 kilogram per centimeter, or about 2 kilogram per centimeter using a split tear test as described herein.

Aspect 121. The method of any one of Aspects 54-120, wherein the foam article has a split tear value of greater than or equal to about 1.5 kg/cm, greater than or equal to about 2.0 kg/cm, or greater than or equal to about 2.5 kg/cm, when determined using a split tear test as described herein.

Aspect 122. The method of any one of Aspects 54-121, wherein the foam article has a specific gravity of less than or equal to 0.9.

Aspect 123. The foam article of Aspect 122, wherein the foam article has a specific gravity of from about 0.02 to about 0.22; of from about 0.03 to about 0.12; from about 0.04 to about 0.10; from about 0.11 to about 0.12; from about 0.10 to about 0.12; from about 0.15 to about 0.2; 0.15 to about 0.30; 0.01 to about 0.10; from about 0.02 to about 0.08; from about 0.03 to about 0.06; 0.08 to about 0.15; from about 0.10 to about 0.12; from about 0.15 to about 0.2; from about 0.10 to about 0.12; from about 0.1 to about 0.35; from about 0.12 to about 0.20; from 0.02 to about 0.22; from about 0.02 to about 0.20; from about 0.02 to about 0.18; or from of about 0.02 to about 0.16.

Aspect 124. The method of any one of Aspects 54-123, wherein the foam article has a stiffness of about 200 kilopascals to about 1000 kilopascals, for a cylindrical sample having a diameter of about 45 millimeters as determined using the Cyclic Compression Test.

Aspect 125. The method of Aspect 124, wherein the foam article has a stiffness of about 400 kilopascals to about 900 kilopascals, for a cylindrical sample having a diameter of about 45 millimeters as determined using the Cyclic Compression Test.

Aspect 126. The method of any one of Aspects 54-125, wherein the foam article has a change in displacement at max loading of about 1 millimeters to about 5 millimeters when measured on foam slabs having a thickness of about 1 centimeter, wherein the foam slabs are compressed for about 5000 cycles of compression from 0 newtons to 300 newtons and back to 0 N per cycle, using a 45 mm diameter cylindrical tupp as the compression head.

Aspect 127. The method of any one of Aspects 54-126, wherein the foam article has a change in displacement at max loading of about 2 millimeters to about 4 millimeters when measured on foam slabs having a thickness of about 1 centimeters, wherein the foam slabs are compressed for about 5000 cycles of compression from 0 newtons to 300 newtons and back to 0 newtons per cycle, using a 45 mm diameter cylindrical tupp as the compression head.

Aspect 128. The method of any one of Aspects 54-127, further comprising disposing a layer comprising a second polymeric material on an exterior surface of the foam article.

Aspect 129. The method of Aspect 128, further comprising a step of removing the foam article from the mold cavity following the disposing step.

Aspect 130. The method of Aspect 128, further comprising a step of removing the foam article from the mold cavity before the disposing step.

Aspect 131. The method of any one of Aspects 128-130, wherein the second polymeric material comprises a thermoplastic elastomer or thermoplastic vulcanizate material for use a type of ground contact, reinforcing skin, containment layer, outsole, rand, or other application.

Aspect 132. The method of any one of Aspects 128-131, wherein the second polymer material comprises a thermoplastic elastomer (TPE) from polymer chemical families such as copolyesters, thermoplastic polyurethanes (TPU), styrenic copolymers like styrene butadiene rubbers (SBRs), styrene ethylene butadiene styrene (SEBSs), styrene ethylene propylene styrene (SEPS), ethylenic copolymers such as ethylene-propylene copolymers, olefinic block copolymers, Surlyns and other ionomers, and/or acrylic copolymer elastomers wherein they are block copolymers comprised of PMMA blocks-acrylate blocks-PMMA blocks, etc.

Aspect 133. The method of any one of Aspects 128-132, wherein the second polymer material is comprised of an injection processible thermoplastic vulcanizate (TPV) material, which are typically cross-linked or partially cross-linked rubbers dispered into thermoplastic host phases, such as an ethylene propylene diene rubber in polypropylene (EPDM/PP) where examples include Sarlink or Santoprene TPV tradenames, or alkyl acrylic copolymer rubbers in polyamide hosts (ACM/PA) where examples include Zeotherm TPVs, or silicone rubbers dispersed in Hytrel based copolyesters (e.g. so called TSiPVs)

Aspect 134. The method of any one of Aspects 128-133, wherein the second material if used as a solid polymer material without the addition of compressed gas, supercritical fluid or other blowing agent has a durometer less than Shore A 90, optionally less than Shore A 85, and preferably less than Shore A 80, but greater than Shore A 60, and optionally greater than Shore A 65.

Aspect 135. The method of any one of Aspects 128-134, wherein the second material if used as a solid polymer is comprised of TPEs or TPVs with densities less than 1.25 g/cc, optionally less than 1.1 g/cc, or less than 0.95 g/cc and preferably less than 0.9 g/cc.

Aspect 136. The method of any one of Aspects 128-135, wherein the second polymer material is produced separately via injection molding with or without the addition of compressed gas, supercritical fluids or other blowing agents upon which the foam article is produced or injected via overmolding.

Aspect 137. The method of any one of Aspects 128-136, wherein the second material (TPE or TPV) is extruded into a fused deposition 3D printing filament of 1.5 mm, 1.75 mm, 1.85 mm, 2.85 mm 3.0 mm, or other relevant diameter for deposition and attachment to foamed article comprised of the first material in such a way that it comprises the ground contact layer, print-on outsole, or other exterior features. Any grade commonly used in injection molding will typically suffice for 3D print filament for fused deposition applications.

Aspect 138. The method of Aspect 137, wherein the second material was produce via sequential injection in the same process, or wherein the second material was produced in a separate process, and subsequently inserted into the mold after which foam article from the first material is overmolded.

Aspect 139. The method of any one of Aspects 128-138, wherein the second polymer material is produced separately via injection molding with only sufficient compressed gas, supercritical fluids or other blowing agents to achieve a density of 0.9 g/cc or less, 0.85 g/cc or less, or 0.8 g/cc or less.

Aspect 140. The method of any one of Aspects 128-139, wherein the second polymer materials is a film or an outsole or a rand that is pretreated with a plasma or corona treatment prior to receiving an overmolding assembly method.

Aspect 141. The method of any one of Aspects 128-140, wherein the second polymer material is a film or an outsole or a rand that is pretreated with a primer alone, or a primer plus and an adhesive prior to receiving the overmolding assembly method described in Aspects above.

Aspect 142. The method of any one of Aspects 128-141, wherein the ply adhesion strength between the second polymer material and the first polymer material comprising overmolded foam article exceeds 2.5 kilogram force per centimeter.

Aspect 143. The method of Aspect 142, wherein the ply adhesion strength between the second polymer material and the first polymer material comprising the foam article exceeds 3.0 kilogram force per centimeter.

Aspect 144. The method of any one of Aspects 54-143, wherein the foam article comprises greater than about 90 weight percent of the thermoplastic copolyester based on the total weight of the thermoplastic elastomer composition.

Aspect 145. The method of Aspect 144, wherein the foam article comprises greater than about 95 weight percent of the thermoplastic copolyester based on the total weight of the thermoplastic elastomer composition.

Aspect 146. The method of Aspect 144, wherein the foam article comprises greater than about 97 weight percent of the thermoplastic copolyester based on the total weight of the thermoplastic elastomer composition.

Aspect 147. The method of Aspect 144, wherein the foam article comprises greater than about 98 weight percent of the thermoplastic copolyester based on the total weight of the thermoplastic elastomer composition.

Aspect 148. The method of Aspect 144, wherein the foam article comprises greater than about 99 weight percent of the thermoplastic copolyester based on the total weight of the thermoplastic elastomer composition.

Aspect 149. A foam article comprising a foamed polymeric material comprising the thermoplastic copolyester composition of any one of Aspects 1-53; wherein the foam article has a multicellular foam structure.

Aspect 150. The foam article of Aspect 149, wherein the foam article is an extruded foam article.

Aspect 151. The foam article of Aspect 149, wherein the foam article is an injection molded foam article.

Aspect 152. The foam article of Aspect 149, wherein the foam article is a compression molded foam article.

Aspect 153. The foam article of any one of Aspects 149-152, wherein the multicellular foam structure has a closed cell foam microstructure.

Aspect 154. The foam article of any one of Aspects 149-152, wherein the multicellular foam structure has an open cell foam microstructure.

Aspect 155. The foam article of Aspect 154, wherein the multicellular foam structure comprises less than 10 percent of cells having a closed cell microstructure.

Aspect 156. The foam article of Aspect 154, wherein the multicellular foam structure comprises less than 5 percent of cells having a closed cell microstructure.

Aspect 157. The foam article of Aspect 154, wherein the multicellular foam structure comprises less than 1 percent of cells having a closed cell microstructure.

Aspect 158. The foam article of any one of Aspects 149-157, wherein the multicellular foam has an average cell size of from about 50 micron to about 5 millimeters; from about 100 micron to about 1 millimeters; or from about 50 micron to about 1 millimeters.

Aspect 159. The foam article of any one of Aspects 149-158, wherein the foam article has a ply adhesion strength between the polymeric layer and the foam component that is greater than 2.5 kg force/centimeter or greater than 3.0 kg force/centimeter, when determined using the Ply Adhesion Test method described herein.

Aspect 160. The foam article of any one of Aspects 149-159, wherein the foam article has an average hand pull test result between the polymeric layer and the foam component that is greater than or equal to 2.0, or greater than or equal to 2.5, or greater than or equal to 3.0, or greater than or equal to 3.5, or greater than or equal to 4.0, or greater than or equal to 4.5, when determined according to the Hand Pull Test method described herein.

Aspect 161. The foam article of any one of Aspects 149-160, wherein the layer has an Akron abrasion of less than 0.50 cubic centimeters lost, optionally less than 0.40 cubic centimeters lost, less than 0.30 cubic centimeters lost, less than 0.20 cubic centimeters lost, or less than 0.10 cubic centimeters lost as determined using the Akron Abrasion Test.

Aspect 162. The foam article of any one of Aspects 149-161, wherein the layer has an Akron abrasion of less than 500 milligrams lost, optionally less than 400 milligrams lost, less than 300 milligrams lost, less than 200 milligrams lost, or less than 100 milligrams lost as determined using the Akron Abrasion Test.

Aspect 163. The foam article of any one of Aspects 149-162, wherein the layer has a DIN abrasion of less than 0.30 cubic centimeters lost, optionally less than 0.20 cubic centimeters lost, less than 0.10 cubic centimeters lost, less than 0.05 cubic centimeters lost, or less than 0.03 cubic centimeters lost as determined using the DIN Abrasion Test.

Aspect 164. The foam article of any one of Aspects 149-163, wherein the layer has a DIN abrasion of less than 300 milligrams lost, optionally less than 250 milligrams lost, optionally less than 200 milligrams lost, optionally less than 150 milligrams lost, optionally less than 100 milligrams lost, optionally less than 80 milligrams lost, optionally less than 50 milligrams lost, or optionally less than 30 milligrams as determined using the DIN Abrasion Test.

Aspect 165. The foam article of any one of Aspects 149-164, wherein the layer has a dry dynamic coefficient of friction (COF) on a dry surface of greater than 0.5, optionally of greater than 0.7, greater than 0.8, greater than 0.9, greater than 1.0, as determined using the Dry Outsole Coefficient of Friction Test.

Aspect 166. The foam article of any one of Aspects 149-165, wherein the layer has a wet dynamic COF of greater than 0.25, optionally of greater than 0.30, greater than 0.35, greater than 0.40, or greater than 0.50, as determined using the Wet Outsole Coefficient of Friction Test.

Aspect 167. The foam article of any one of Aspects 149-166, wherein the foam article has a maximum load of about 100 N to about 4000 N when determined using the Cyclic Tensile test as described herein.

Aspect 168. The foam article of Aspect 167, wherein the foam article has a maximum load of about 100 N to about 4000 N when determined using the Cyclic Tensile test as described herein.

Aspect 169. The foam article of any one of Aspects 149-168, wherein the foam article has an energy efficiency of greater than or equal to about 50 percent when determined using the Cyclic Compression test as described herein.

Aspect 170. The foam article of Aspect 169, wherein the foam article has an energy efficiency of greater than or equal to about 60 percent when determined using the Cyclic Compression test as described herein.

Aspect 171. The foam article of Aspect 169, wherein the foam article has an energy efficiency of greater than or equal to about 70 percent when determined using the Cyclic Compression test as described herein.

Aspect 172. The foam article of Aspect 169, wherein the foam article has an energy efficiency of about 50 percent to about 97 percent when determined using the Cyclic Compression test as described herein.

Aspect 173. The foam article of any one of Aspects 149-172, wherein the foam article has an energy return of about 200 millijoules (mJ) to 1200 mJ when determined using the Cyclic Compression test as described herein.

Aspect 174. The foam article of Aspect 173, wherein the foam article has an energy return of about 400 mJ to 1000 mJ when determined using the Cyclic Compression test as described herein.

Aspect 175. The foam article of Aspect 173, wherein the foam article has an energy return of about 600 mJ to 800 mJ when determined using the Cyclic Compression test as described herein.

Aspect 176. The foam article of any one of Aspects 149-175, wherein the foam article has a split tear value of about 1.0 kilogram per centimeter to 4.5 kilogram per centimeter, about 1.6 kilogram per centimeter to 4.0 kilogram per centimeter, about 2.0 kilogram per centimeter to 4.0 kilogram per centimeter, about 2.0 kilogram per centimeter to 3.5 kilogram per centimeter, about 2.5 kilogram per centimeter to 3.5 kilogram per centimeter, about 0.07 kilogram per centimeter to 2.0 kilogram per centimeter, or about 0.8 kilogram per centimeter to 1.5 kilogram per centimeter, or about 0.9 to 1.2 kilogram per centimeter, about 1.5 kilogram per centimeter to 2.2 kilogram per centimeter; about 0.08 kilogram per centimeter to 4.0 kilogram per centimeter, about 0.9 kilogram per centimeter to 3.0 kilogram per centimeter, about 1.0 to 2.0 kilogram per centimeter, about 1.0 kilogram per centimeter to 1.5 kilogram per centimeter, or about 2 kilogram per centimeter using a split tear test as described herein.

Aspect 177. The foam article of any one of Aspects 149-176, wherein the foam article has a split tear value of greater than or equal to about 1.5 kg/cm, greater than or equal to about 2.0 kg/cm, or greater than or equal to about 2.5 kg/cm, when determined using a split tear test as described herein.

Aspect 178. The foam article of any one of Aspects 149-177, wherein the foam article has a specific gravity of less than or equal to 0.9.

Aspect 179. The foam article of Aspect 178, wherein the foam article has a specific gravity of from about 0.02 to about 0.22; of from about 0.03 to about 0.12; from about 0.04 to about 0.10; from about 0.11 to about 0.12; from about 0.10 to about 0.12; from about 0.15 to about 0.2; 0.15 to about 0.30; 0.01 to about 0.10; from about 0.02 to about 0.08; from about 0.03 to about 0.06; 0.08 to about 0.15; from about 0.10 to about 0.12; from about 0.15 to about 0.2; from about 0.10 to about 0.12; from about 0.1 to about 0.35; from about 0.12 to about 0.20; from 0.02 to about 0.22; from about 0.02 to about 0.20; from about 0.02 to about 0.18; or from of about 0.02 to about 0.16.

Aspect 180. The foam article of any one of Aspects 149-179, wherein the foam article has a stiffness of about 200 kilopascals to about 1000 kilopascals, for a cylindrical sample having a diameter of about 45 millimeters as determined using the Cyclic Compression Test.

Aspect 181. The foam article of Aspect 180, wherein the foam article has a stiffness of about 400 kilopascals to about 900 kilopascals, for a cylindrical sample having a diameter of about 45 millimeters as determined using the Cyclic Compression Test.

Aspect 182. The foam article of any one of Aspects 149-181, wherein the foam article has a change in displacement at max loading of about 1 millimeters to about 5 millimeters when measured on foam slabs having a thickness of about 1 centimeters, wherein the foam slabs are compressed for about 5000 cycles of compression from ON to 300 N and back to 0 N per cycle, using a 45 mm diameter cylindrical tupp as the compression head.

Aspect 183. The foam article of any one of Aspects 149-182, wherein the foam article has a change in displacement at max loading of about 2 millimeters to about 4 millimeters when measured on foam slabs having a thickness of about 1 centimeters, wherein the foam slabs are compressed for about 5000 cycles of compression from ON to 300 N and back to 0 N per cycle, using a 45 mm diameter cylindrical tupp as the compression head.

Aspect 184. The foam article of any one of Aspects 149-183, wherein the foam article comprises greater than about 90 weight percent of the thermoplastic copolyester based on the total weight of the thermoplastic elastomer composition.

Aspect 185. The foam article of Aspect 184, wherein the foam article comprises greater than about 95 weight percent of the thermoplastic copolyester based on the total weight of the thermoplastic elastomer composition.

Aspect 186. The foam article of Aspect 184, wherein the foam article comprises greater than about 97 weight percent of the thermoplastic copolyester based on the total weight of the thermoplastic elastomer composition.

Aspect 187. The foam article of Aspect 184, wherein the foam article comprises greater than about 98 weight percent of the thermoplastic copolyester based on the total weight of the thermoplastic elastomer composition.

Aspect 188. The foam article of Aspect 184, wherein the foam article comprises greater than about 99 weight percent of the thermoplastic copolyester based on the total weight of the thermoplastic elastomer composition.

Aspect 189. An article comprising the foam article made by the method of any one of Aspects 0-0, or the foam article of any one of Aspects 149-188.

Aspect 190. The article of any one of Aspects 189-234, wherein the article is an article of footwear.

Aspect 191. The article of any one of Aspects 189-234, wherein the foam article is a cushioning element in the article of footwear.

Aspect 192. The article of any one of Aspects 189-234, wherein the cushioning element is a component of a sole structure in the article of footwear.

Aspect 193. The article of any one of Aspects 189-234, wherein the foam article is a component of a sole structure in the article of footwear.

Aspect 194. The article of any one of Aspects 189-234, wherein the sole structure has a first side that is configured to be ground-facing when the sole structure is a component of an article of footwear, a second side opposed to the first side, and a sidewall extending at least partially between the first side and the second side; wherein the layer comprising the second polymeric material is disposed on one or more of the first side, the second side, or the sidewall.

Aspect 195. The article of any one of Aspects 189-234, wherein the sole structure is a midsole.

Aspect 196. The article of any one of Aspects 189-234, wherein the sole structure is a plate.

Aspect 197. The article of any one of Aspects 189-234, wherein the sole structure is a chassis.

Aspect 198. The article of any one of Aspects 189-234, wherein the sole structure is a bladder.

Aspect 199. The article of any one of Aspects 189-234, wherein the sole structure is a bladder, and the foam article is disposed on an exterior surface of the bladder.

Aspect 200. The article of any one of Aspects 189-234, wherein the sole structure is a heel counter.

Aspect 201. The article of any one of Aspects 189-234, wherein the sole structure comprises a shell component that at least partially encloses the foam article, wherein the shell component comprises the layer comprising the second polymeric material.

Aspect 202. The article of any one of Aspects 189-234, wherein the shell component encloses the foam article on the first side and the sidewall of the sole structure.

Aspect 203. The article of any one of Aspects 189-234, wherein the shell component is attached to the upper of the article of footwear.

Aspect 204. The article of any one of Aspects 189-234, wherein the sole structure further comprises an outsole component on the ground-facing side of the sole structure.

Aspect 205. The article of Aspect 204, wherein the outsole component comprises a thermoplastic elastomer (TPE) or thermoplastic vulcinazate (TPV).

Aspect 206. The article of Aspect 205, wherein the thermoplastic vulcinazate is cross-linked.

Aspect 207. The article of Aspect 205, wherein the thermoplastic vulcinazate is comprises a partially cross-linked rubber dispersed into a thermoplastic host phase.

Aspect 208. The article of Aspect 207, wherein the partially cross-linked rubber dispersed into a thermoplastic host phase comprises an ethylene propylene diene rubber in polypropylene (EPDM/PP), an alkyl acrylic copolymer rubber in a polyamide host (ACM/PA), a silicone rubber dispersed in thermoplastic copolyester, or combinations thereof.

Aspect 209. The article of any one of Aspects 189-208, wherein the outsole component comprises a thermoplastic elastomer (TPE).

Aspect 210. The article of Aspect 206, wherein the thermoplastic elastomer is selected from a copolyester, a thermoplastic polyurethane (TPU), a styrenic copolymer, an ethylenic copolymer, an ionomer, an acrylic copolymer elastomers, and combinations thereof.

Aspect 211. The article of Aspect 207, wherein the styrenic copolymer is selected from a styrene butadiene rubber (SBR), a styrene ethylene butadiene styrene (SEBS), a styrene ethylene propylene styrene (SEPS), and combinations thereof.

Aspect 212. The article of Aspect 207, wherein the ethylenic copolymer is selected from an ethylene-propylene copolymer, an olefinic block copolymer, and combinations thereof.

Aspect 213. The article of Aspect 207, wherein the olefinic block comprises poly(methyl methacrylate) blocks, acrylate blocks, poly(methyl methacrylate)-acrylate copolymeric blocks, and combinations thereof.

Aspect 214. The article of any one of Aspects 204-213, wherein the outsole component comprises a solid polymeric material that was formed without the addition of compressed gas, supercritical fluid or other blowing agent.

Aspect 215. The article of Aspect 214, wherein the outsole component has a durometer less than Shore A 90, than Shore A 85, or less than Shore A 80.

Aspect 216. The article of Aspect 214, wherein the outsole component has a durometer greater than Shore A 60 or Shore A 65.

Aspect 217. The article of Aspect 214, wherein the outsole component has a durometer less than Shore A 90, than Shore A 85, or less than Shore A 80; and wherein the outsole component has a durometer greater than Shore A 60 or Shore A 65.

Aspect 218. The article of any one of Aspects 204-217, wherein the outsole component comprises a thermoplastic elastomer (TPE) or thermoplastic vulcinazate (TPV); and wherein the outsole component has a density less than about 1.25 grams per cubic centimeter, about 1.1 grams per cubic centimeter, about 0.95 grams per cubic centimeter, or about 0.9 grams per cubic centimeter.

Aspect 219. The article of any one of Aspects 204-218, wherein the outsole component comprises a ground contact layer, print-on outsole, or other exterior feature; wherein the ground contact layer, print-on outsole, or other exterior feature is prepared using a fused deposition 3D printing process; and wherein the fused deposition 3D printing process comprises using a preformed filament comprising a thermoplastic elastomer (TPE) or thermoplastic vulcinazate (TPV).

Aspect 220. The article of Aspect 219, wherein the filament has a diameter of about 1.5 millimeters, 1.75 millimeters, 1.85 millimeters, 2.85 millimeters, or 3.0 millimeters.

Aspect 221. The article of Aspects 219 or 220, wherein the ground contact layer, print-on outsole, or other exterior feature has a durometer less than Shore A 90, than Shore A 85, or less than Shore A 80; and wherein the outsole component has a durometer greater than Shore A 60 or Shore A 65.

Aspect 222. The article of any one of Aspects 219-221, wherein the ground contact layer, print-on outsole, or other exterior feature has a density less than about 1.25 grams per cubic centimeter, about 1.1 grams per cubic centimeter, about 0.95 grams per cubic centimeter, or about 0.9 grams per cubic centimeter.

Aspect 223. The article of any one of Aspects 204-222, wherein the outsole component is injected molded.

Aspect 224. The article of Aspect 223, wherein the injection molding comprises the use of a compressed gas, a supercritical fluid, or a combination thereof.

Aspect 225. The article of Aspect 223, wherein the injection molding comprises the use of a chemical foaming agent.

Aspect 226. The article of Aspect 223, wherein the injection molding comprises the use of a compressed gas, a supercritical fluid, a chemical foaming agent, or a combination thereof.

Aspect 227. The article of any one of Aspects 189-234, wherein the outsole component exhibits a dry traction coefficient of friction of about 0.9, of about 1.0, or about 1.1 by methods as defined herein.

Aspect 228. The article of any one of Aspects 189-234, wherein the outsole component exhibits a wet traction coefficient of friction of about 0.3, about 0.4, or about 0.5 by methods as defined herein.

Aspect 229. The article of any one of Aspects 189-234, wherein the outsole component comprising TPE or TPV polymers exhibits abrasion resistance as defined per the DIN or rotary drum abrasion test of less than 250 milligrams lost per test, optionally less than 200 milligrams lost per test, and preferably less than 150 milligrams lost per test, or less than 100 milligrams lost per test, or less than 80 milligrams lost per test by methods as defined herein.

Aspect 230. The article of any one of Aspects 189-234, wherein the outsole component comprises a cured rubber.

Aspect 231. The article of any one of Aspects 189-234, wherein the outsole has a density of less than or equal to about 0.90 grams per cubic centimeter.

Aspect 232. The article of any one of Aspects 189-234, wherein the outsole has a density of less than or equal to about 0.85 grams per cubic centimeter.

Aspect 233. The article of any one of Aspects 189-234, wherein the outsole has a density of less than or equal to about 0.50 grams per cubic centimeter.

Aspect 234. The article of any one of Aspects 189-234, wherein the outsole has a density about 0.60 grams per cubic centimeter to about 0.90 grams per cubic centimeter.

Aspect 235. The article of any one of Aspects 189-234, wherein the outsole has a density about 0.60 grams per cubic centimeter to about 0.85 grams per cubic centimeter.

Aspect 236. The article of any one of Aspects 189-234, wherein the outsole has a density about 0.60 grams per cubic centimeter to about 0.80 grams per cubic centimeter.

Aspect 237. The article of any one of Aspects 189-234, wherein a side of the foam article is bonded to an upper.

Aspect 238. The article of any one of Aspects 189-234, wherein the upper comprises a polyester yarn, a polyester fiber, a thermoplastic polyurethane yarn, a thermoplastic polyurethane fiber, or combinations thereof.

Aspect 239. The article of any one of Aspects 189-234, wherein the side of the foam article bonded to an upper is bonded using an adhesive.

Aspect 240. The article of any one of Aspects 189-234, wherein the side of the foam article bonded to an upper is essentially free of an adhesive at a bond interface between the side of the foam article and the upper.

Aspect 241. The article of any one of Aspects 189-234, wherein the sole structure further comprises an outsole component on a ground-facing side of the outsole component.

Aspect 242. The article of any one of Aspects 189-234, wherein the outsole component comprises a cured rubber.

Aspect 243. The article of any one of Aspects 189-234, wherein the article comprises a side of the foam article bonded to an upper.

Aspect 244. The article of any one of Aspects 189-234, wherein the upper comprises a thermoplastic polyester yarn, a thermoplastic polyester fiber, a thermoplastic polyurethane yarn, a thermoplastic polyurethane fiber, a thermoplastic polyamide yarn, a thermoplastic polyamide fiber, or combinations thereof.

Aspect 245. The article of any one of Aspects 189-234, wherein the side of the foam article bonded to an upper is bonded using an adhesive.

Aspect 246. The article of any one of Aspects 189-234, wherein the side of the foam article bonded to an upper and is essentially free of an adhesive at a bond interface between the side of the foam article and the upper.

Aspect 247. The article of any one of Aspects 189-234, wherein the article is an article of apparel.

Aspect 248. The article of any one of Aspects 189-234, wherein the article is an article of sporting equipment.

Aspect 249. A method for manufacturing an article of footwear, the method comprising:
affixing a foam article and a textile element to each other;
wherein the foam article is a form article of any one of Aspects 54-148; or
wherein the foam article is a form article is made by the method one of Aspects 149-188.

Aspect 250. A method for manufacturing an article of footwear, the method comprising:
affixing an outsole to the midsole to a midsole;
wherein the outsole comprises an outsole thermoplastic copolyester; and
wherein the midsole comprises a form article of any one of Aspects 54-148, or a form article is made by the method one of Aspects 149-188.

Aspect 251. The method of Aspect 236, wherein the outsole thermoplastic copolyester comprises a thermoplastic copolyester of any one of Aspects 1-53.

Aspect 252. The method of Aspect 236, wherein the outsole thermoplastic copolyester is substantially free of a thermoplastic copolyester of any one of Aspects 1-53.

Aspect 253. The method of any one of Aspects 236-238, wherein outsole is substantially free of a foamed outsole thermoplastic copolyester.

Aspect 254. The method of any one of Aspects 236-238, wherein outsole comprises a foamed outsole thermoplastic copolyester.

Aspect 255. The method of any one of Aspects 236-240, wherein the midsole comprises a midsole foamed thermoplastic copolyester composition comprising a first polymeric component including at least one first thermoplastic copolyester, and the outsole comprises an outsole thermoplastic copolyester composition comprising a second polymeric component including at least one second thermoplastic copolyester, and wherein a concentration of an additive in the foamed thermoplastic copolyester composition differs from a concentration of the additive in the outsole thermoplastic copolyester composition by at least 10 weight percent, or a first concentration of the first polymeric component in the foamed thermoplastic copolyester composition differs from a second concentration of the second polymeric component in the outsole thermoplastic copolyester composition by at least 10 weight percent, or a chemical structure of the first at least one thermoplastic copolyester differs from a chemical structure of the second at least one thermoplastic copolyester, or a number average molecular weight of the first at least one thermoplastic copolyester differs from a number average molecular weight of the second at least one thermoplastic copolyester by at least 10 percent, or any combination thereof.

Aspect 256. The method of any one of Aspects 236-241, wherein the affixing comprises injection molding an outsole, and then injection molding the midsole directly onto the outsole.

Aspect 257. The method of any one of Aspects 236-241, wherein the affixing comprises thermally bonding the midsole to the outsole.

Aspect 258. A molding system for forming a foam article, the system comprising:
a barrel housing a screw configured to receive a molten polymeric material and form a mixture of the molten polymeric material comprising a thermoplastic elastomer and a blowing agent, and to adjust a position of the screw in the barrel to regulate a flowrate of the mixture out of the barrel;
a mold cavity configured to contain the mixture during foaming, mold the foamed mixture, and solidify the molded foamed mixture into the foam article;
an injection or extrusion device configured to receive the mixture and extrude or inject it into the mold cavity at an injection pressure and temperature; and
a temperature control and monitoring system configured to control the injection temperature or a foaming temperature at which the molten polymeric material is foamed within the mold cavity, or both.

Aspect 259. The molding system of Aspect 244, wherein the temperature control and monitoring system is configured to control the injection temperature of the mixture or the foaming temperature of the molten polymeric material or both within a temperature ranging from about the melting temperature of the thermoplastic elastomer to about 50 degrees C. above the tail temperature of the thermoplastic elastomer.

Aspect 260. The molding system of Aspect 244 or 245, further comprising a gas counter pressure assembly coupled to the mold cavity, wherein the gas counter pressure assembly is configured to regulate an amount of counter pressure gas flow into the mold cavity before, during or after extruding or injecting the mixture into the mold cavity, or during foaming of the molten polymeric material in the mold cavity.

Aspect 261. The molding system of any one of Aspects 244-246, further comprising a mold cavity venting system configured to regulate a rate of pressure loss due to gas flow out of the mold cavity.

Aspect 262. The molding system of any one of Aspects 244-247, wherein the system further comprises a runner system in fluid communication with the injection or extrusion device and the mold cavity.

Aspect 263. The molding system of Aspect 248, wherein the runner system is configured to control a temperature of the mixture as it flows through the runner.

Aspect 264. The molding system of Aspect 249, wherein the runner system is configured to heat the mixture as it flows through the runner.

Aspect 265. The molding system of any one of Aspects 244-250, wherein the system includes a pressure control assembly configured to control a pressure of the mixture as it enters the mold cavity.

Aspect 266. A method for operation of a molding system for forming a foam article, the method comprising:

forming a mixture of a molten polymeric material comprising a thermoplastic elastomer and a blowing agent in a barrel housing a screw;

adjusting a position of the screw in the barrel to regulate a flowrate of the mixture out of the barrel;

flowing the mixture from the barrel into a mold cavity;

extruding or injecting the mixture into the mold cavity at an injection pressure and an injection pressure;

foaming the molten polymeric material in the mold cavity at a foaming temperature, thereby forming a foamed molten polymeric material; and solidifying the foamed molten polymeric material in the mold cavity, thereby forming a foam article having a multicellular foam structure.

Aspect 267. The method of operation of Aspect 252, wherein the method further comprises monitoring and controlling the injection temperature of the mixture or the foaming temperature of the molten polymeric material or both within a temperature ranging from about the melting temperature of the thermoplastic elastomer to about 50 degrees C. above the tail temperature of the thermoplastic elastomer.

Aspect 268. The method of operation of Aspect 252 or 253, further comprising regulating an amount of counter pressure gas flowing into the mold cavity before, during or after extruding or injecting the mixture into the mold cavity, or during foaming of the molten polymeric material in the mold cavity.

Aspect 269. The method of operation of Aspect 252-254, further comprising releasing gas from the mold cavity at a controlled rate during the extruding or injecting or during the foaming.

Aspect 270. The method of operation of Aspect 252-255, further comprising controlling a temperature of the mixture as it flows through a runner into the mold cavity.

Aspect 271. The method of operation of Aspect 252-256, further controlling the injection pressure of the mixture as it enters the mold cavity.

Aspect 272. The method of operation of Aspect 252-257, wherein the molten polymeric material comprises a thermoplastic copolyester according any one of Aspects 1-53, or the method is a method of making a foam article according to any one of Aspects 54-148, or the foam article comprises a foam article according to any one of Aspects 149-188, or any combination thereof.

EXAMPLES

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Materials.

HYTREL 3078 and HYTREL 4068 were obtained from DuPont (Wilmington, Delaware, USA).

Processing Conditions.

Foam plaques were prepared according to the conditions shown in Table 1 below:

TABLE 1

| Material | Melt Temp (° C.) | Mold Temp (° C.) | Injection Speed (cc/sec) | Fill time (s) | MPP (Bar) | N$_2$ (%) | GCP (PSI) | GCP release |
|---|---|---|---|---|---|---|---|---|
| Hytrel 4058 | 210 | 54 | 100 | 2.5 | 175 | 0.5 | 600 | End of fill |
| Hytrel 3078 | 200 | 40 | 100 | 2.5 | 175 | 0.5 | 600 | End of fill |

Foam midsoles were prepared according to the conditions shown in Table 2 below:

TABLE 2

| Material | Melt Temp (° C.) | Mold Temp (° C.) | Injection Speed (cc/sec) | Fill time (s) | Cooling Time (s) | MPP (Bar) | N$_2$ (%) | GCP (PSI) | GCP release |
|---|---|---|---|---|---|---|---|---|---|
| Hytrel 4068 | 210 | 54 | 100 | 2.5 | 400 | 175 | 1.22 | 600 | End of fill |
| Hytrel 3078 | 200 | 40 | 100 | 2.5 | 400 | 175 | 1.5 | 600 | End of fill |

Foam plaques were prepared according to the conditions shown in Table 3 below.

TABLE 3

| No. | Polyester | Mold Temperature (degrees C) | Mold Temperature relative to peak temperature (degrees C) | Mold Temperature relative to tail temperature (degrees C) | Foam Quality |
|---|---|---|---|---|---|
| 1 | Triel ® 5400 | 160 | +5 | −16 | Good |
| 2 | Toyobo P-30B | 175 | 0 | −18 | Poor |
| 3 | Toyobo P-30B | 190 | +15 | −3 | Good |
| 4 | Toyobo P-30B | 205 | +30 | +12 | Coarse |
| 5 | Toyobo P-30B | 245 | +70 | +52 | Coarser |

Figure 10:
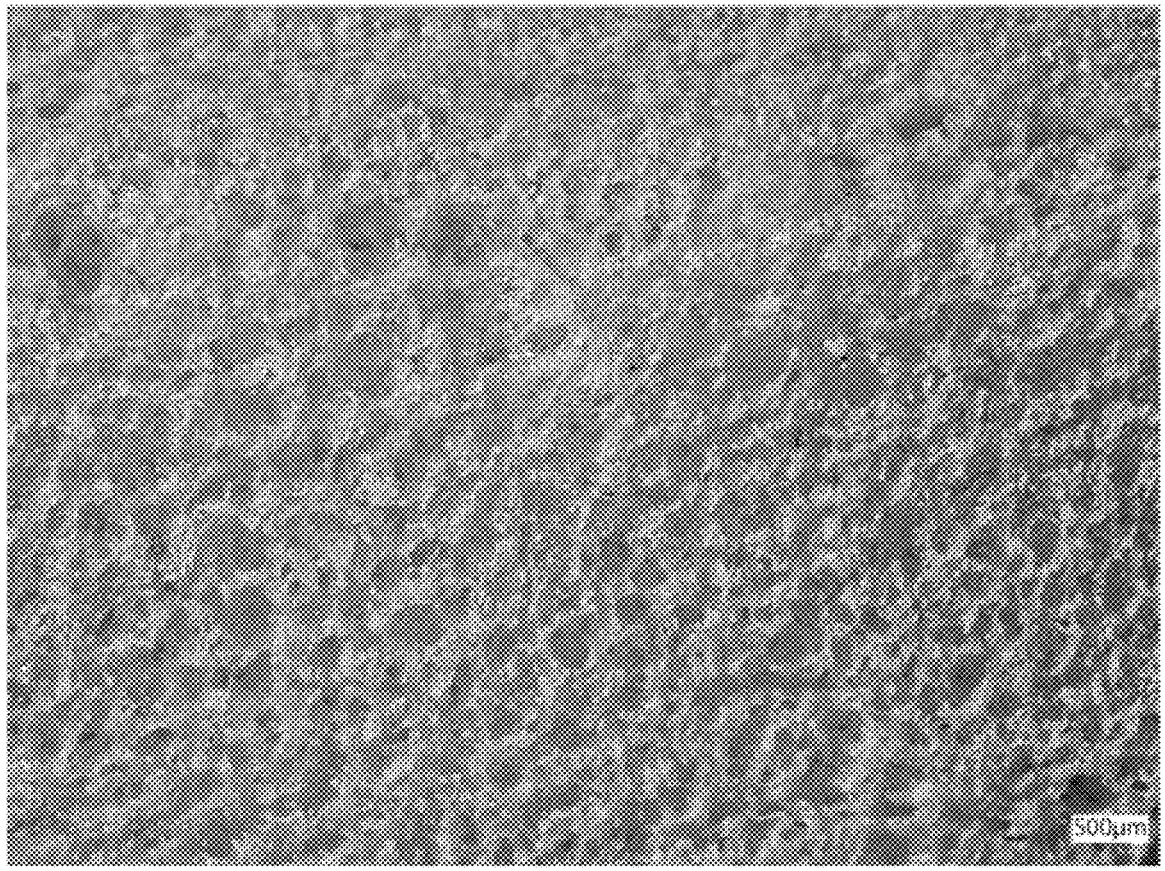
FIG. 10 shows a representative image of a cross-sectional view of a foam plaque prepared using a disclosed thermoplastic copolyester elastomer 160 degrees C. The image shows a scalar bar (500 micrometers).

Cross-sectional views of the foam plaques described above are shown in FIGS. 9A-9D (for Nos. 2-5 above) and FIG. 10 (for No. 1 above).

Example 1. Exemplary Data of Foam Plaques

Figure 6:
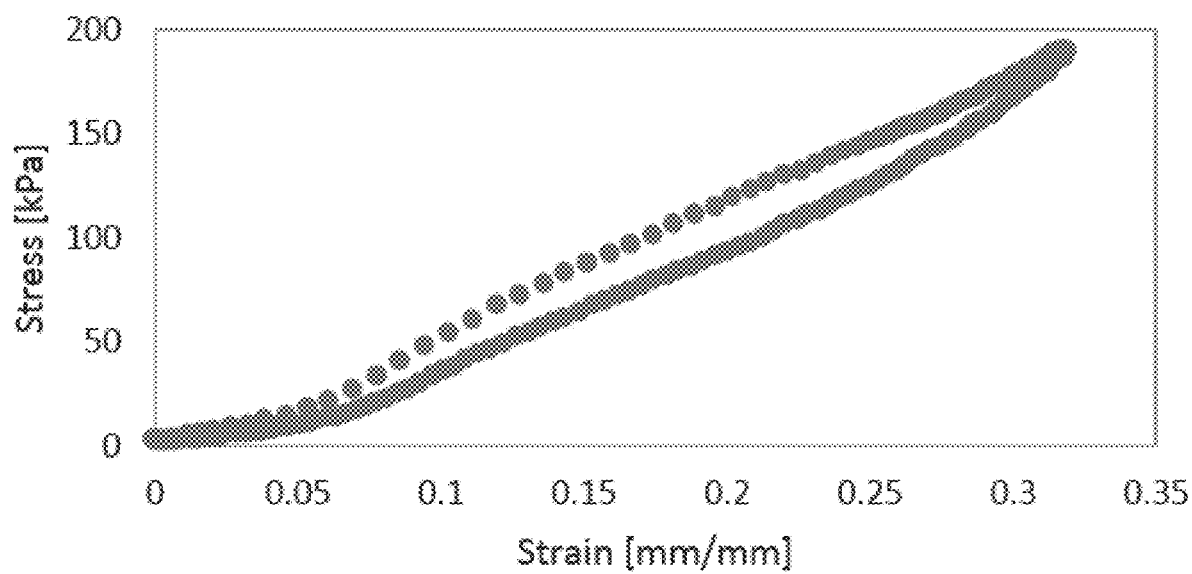
FIG. 6 shows representative compression data for representative foam plaques comprising a disclosed composition and prepared using a disclosed method.

Foam plaques were prepared as described above using HYTREL 4068. Exemplary compression data are shown in FIG. 6. The data were obtained by a cyclic compression testing protocol on a plaque in the form of a cylindrical tupp having the following dimensions: thickness—20 mm; diameter—44.86 mm. The compression data in FIG. 6 are a representative compression curve. The data obtained from these tests are summarized in Table 4 below.

TABLE 4

| Material | Average Modulus (kPa) | Average Stiffness (N/mm) | Max Strain | Efficiency (%) | Energy Return (mJ) |
|---|---|---|---|---|---|
| Hytrel 4068 | 554 | 80 | 0.377 | 87 | 397 |

The specific gravity for foam plaques, prepared as described herein above, was determined to be 0.16-0.28 for HYTREL 4068 and 0.17-0.26 HYTREL 3078.

The foam plaques described in Table 3 above were subjected to energy return analysis as described herein. The results are shown in Table 5 below.

TABLE 5

| No. | Polyester | Energy Return (mJ) |
|---|---|---|
| 1 | Triel ® 5400 | 2830 |
| 2 | Toyobo P-30B | 2050 |
| 3 | Toyobo P-30B | 2940 |
| 4 | Toyobo P-30B | 3150 |
| 5 | Toyobo P-30B | 2950 |

Example 2. Exemplary Data of Foam Midsoles

Foam midsoles were prepared as described above using HYTREL 4068. Compression data were obtained by a cyclic compression testing protocol using a footform as described above. The data obtained from these tests are summarized in Table 6 below.

TABLE 6

| Material | Average Modulus (kPa) | Average Stiffness (N/mm) | Max Displacement (mm) | Efficiency (%) | Energy Return (mJ) |
|---|---|---|---|---|---|
| Hytrel 4068 | N/A | 173 | 11.57 | 74 | 4078 |

The specific gravity for foam midsoles, prepared as described herein above, was determined to be 0.19-0.27 for HYTREL 4068 and 0.19-0.26 HYTREL 3078.

Example 3. Exemplary Hand Pull Data

A foam article was prepared comprising a first foam component and a second s component. The first foam component was an open-cell foam formed from a first thermoplastic copolyester composition comprising HYTREL 4068 which contained less than 1 weight percent of non-polymeric materials. The first thermoplastic copolyester composition was injection molded, foamed and bonded in place to the second solid component. The thermoplastic copolyester composition was foamed using the MUCELL process by forming a single-phase solution of carbon dioxide and the thermoplastic copolyester composition. The first thermoplastic copolyester composition was injection molded and foamed onto a preformed second component as described herein below. The second solid component was prepared as a solid plaque using a second thermoplastic copolyester composition, i.e., a second polymeric material comprising one of the four listed copolyesters shown in the table below (MP IN15074, HYTREL 3078, TRIEL 5202SU, and SP9339, which are further described in Table 8). The first foam component was bonded to the second foam component, i.e., a plaque comprising a solid second polymeric material, by injecting, foaming, and molding a single-phase solution of carbond dioxide and a thermoplastic copolyester composition comprising HYTREL 4068 onto the outsole plaque in an injection mold. Prior to placing the outsole plaque into the mold, one of the following treatments was used: a) no surface preparation was conducted on the surface of the outsole plaque onto which the foam was injected (i.e., control sample); b) the outsole plaque surface was wiped with methyl ethyl ketone prior to insertion into the mold; c) the outsole plaque surface was treated using a rotating cone open air plasma treatment immediately prior to insertion into the mold and injection of the foam composition, where the plaque surface was held 1 cm away from the emitting head, and the plaque was moved passed the emitting head at a rate of about 100-200 mm/sec; or d) the outsole plaque was heated using an infrared lamp for at least 30 seconds immediately prior to insertion into the mold and injection of the foam composition. The equipment used was a Plasmatreat OPENAIR-PLASMA System with an RD1004 head (Plasmatreat GmbH, Steinhagen, Germany).

Hand pull data were obtained using the Hand Pull Test as described herein above. The data obtained are shown in Table 7 below. The data in Table 7 indicate that good bonding of the foam to an outsole material can be achieved using a direct bonding process with little if any additional process steps prior to foaming and molding in place the first foam component.

TABLE 7

| Surface Prep of Foam Plaque | Outsole Polymer* | | | |
|---|---|---|---|---|
| | MP IN15074 | HY3078 | TRIEL 5202SU | SP9339 |
| No treatment | 1 | 2 | 3.5 | 2 |
| MEK wipe | 1 | 3 | 3 | 3 |
| Plasmatreat | 1.5 | 4.5 | 4 | 3.5 |
| IR pre-treatment | 1 | 4.5 | 4 | 4 |

*Values correspond to the following results in Hand Pull Test: 1-easy to peel adhesive failure;
2-adhesive failure, but some resistance;
3-4.5 cohesive foam failure, varying levels of foam skin failure;
and 5-unable separate)

Example 4. Exemplary Data of Second Polymeric Material Characterization—Coefficient of Friction—Polymer Samples Sample preparation, coefficient of friction, and other test procedures were carried out as described herein above. The coefficient of friction data for wood and concrete surfaces are shown in the table shown in FIGS. 11 and 12, respectively. The materials referred into FIGS. 11 and 12 are further described in Table 8 below.

TABLE 8

| Material Grade | Polymer type | Form | Supplier |
|---|---|---|---|
| Apilon 52 | TPU | Solid | API Plastics |
| BT 1030D | CoPe TPE | Solid | LG |
| Desmopan 8795A | TPU | Foam | Covestro |
| Ellastolan b70a | TPU | Solid | Lubrizol |
| Ellastolan SP9339 | TPU | Foam | BASF |
| Ellastolan SP9500 | TPU | Solid | BASF |
| Estane 2350-75a-030 | TPU | Solid | Lubrizol |
| Estane 58238 | TPU | Solid | Lubrizol |
| Estane t470a-3 | TPU | Solid | Lubrizol |
| HPF AD1035 | Ethlyenic TPE/Ionomer | Solid | DuPont |

TABLE 8-continued

| Material Grade | Polymer type | Form | Supplier |
|---|---|---|---|
| HPF AD1172 | Ethlyenic TPE/Ionomer | Solid | DuPont |
| Hytrel 3078 | CoPe TPE | Solid | DuPont |
| Hytrel 3078 | CoPe TPE | Foam | DuPont |
| Hytrel 3078 | CoPe TPE | Solid | DuPont |
| Hytrel 4068 | CoPe TPE | Foam | DuPont |
| Hytrel 4556 | CoPe TPE | Solid | DuPont |
| KP3340 | CoPe TPE | Solid | Kolon |
| KP3347 | CoPe TPE | Solid | Kolon |
| Kurarity LA2250 | Acrylic TPE | Solid | Kuraray |
| Kurarity LA4285 | Acrylic TPE | Solid | Kuraray |
| Monprene 12990 | SEBS TPE | Foam | Teknor Apex |
| Monprene 66070 | SEBS TPE | Solid | Teknor Apex |
| Monprene CP28160-01 | SEBS TPE | Solid | Teknor Apex |
| Monprene IN15056 | SEBS TPE | Solid | Teknor Apex |
| Monprene IN15074 | SEBS TPE | Solid | Teknor Apex |
| Monprene IN15074 | SEBS TPE | Foam | Teknor Apex |
| Monprene SP16074H | SEBS TPE | Solid | Teknor Apex |
| Monprene SP16975 | SEBS TPE | Solid | Teknor Apex |
| Santoprene 123-40 | TPV: EPDM/PP | Solid-Herringbone | Exxon |
| Santoprene 201-64 | TPV: EPDM/PP | Solid-Herringbone | Exxon |
| Santoprene 103-50 | TPV: EPDM/PP | Solid-Herringbone | Exxon |
| Sarlink 3160 | TPV: EPDM/PP | Solid | Teknor Apex |
| Sarlink 6755B | TPV: EPDM/PP | Solid | Teknor Apex |
| Sarlink 6755N | TPV: EPDM/PP | Solid | Teknor Apex |
| Septon blends w/PP (16-011-4) | SEBS/PP compound | Solid | Kuraray |
| Septon blends w/PP (16-051-1) | SEBS/PP compound | Solid | Kuraray |
| Septon blends w/PP (16-078-2) | SEBS/PP compound | Solid | Kuraray |
| Surlyn 8150 | Ethlyenic TPE/Ionomer | Solid | DuPont |
| Surlyn 8320 | Ethlyenic TPE/Ionomer | Solid | DuPont |
| Surlyn 9320 | Ethlyenic TPE/Ionomer | Solid | DuPont |
| Topgreen RH 1502-2 | CoPe TPE | Solid | FENC |
| Topgreen RH 1601-7 | CoPe TPE | Solid | FENC |
| TPSiV-50A | TPV: Silicone/Hytrel | Solid | DuPont |
| TPSiV-60A | TPV: Silicone/Hytrel | Solid | DuPont |
| Triel 5202SP | CoPe TPE | Solid | SamYang |
| Triel 5202SP | CoPe TPE | Foam | SamYang |
| Triel 5300 | CoPe TPE | Solid | SamYang |
| Triel 5401A | TPU | Solid | SamYang |
| Triel SY 5280 | CoPe TPE | Solid | SamYang |
| Tuftec P1500 | SEBS TPE | Solid | Asahi |
| Tuftec P5051 | SEBS TPE | Solid | Asahi |
| Zeotherm 100-70B | TPV: ACM/PA | Solid | Zeon Chemical |
| Zeotherm 100-80B | TPV: ACM/PA | Solid | Zeon Chemical |
| Zeotherm 110-70B | TPV: ACM/PA | Solid | Zeon Chemical |
| Zeotherm 130-90B | TPV: ACM/PA | Solid | Zeon Chemical |

Table 8, the abbreviations used therein have the following meaning: "TPU" means "Thermoplastic Polyurethane";
CoPe TPE means "Copolyester Thermoplastic Elastomer";
"Ethylenic TPE/Ionomer" means "Ethylenic Thermoplastic Elastomer/Ionomer";
"Acrylic TPE" means "Acrylic Thermoplastic Elastomer";
"SEBS TPE" means "Styrene-Ethylene-Budiadiene-Styrene Thermoplastic Elastomer";
"TPV/EPDM/PP" means "Styrene-Ethylene-Budiadiene-Styrene Thermoplastic Elastomer Thermoplastic Vulcanizate of Ethylene Propylene Diene Monomer Rubber and Thermoplastic Polypropylene";
"TPV: Silicone/Hytrel" means "Thermoplastic Vulcanizate of Silicone Rubber and Thermoplastic Copolyester";
and "TPV: ACM/PA" means "Thermoplastic Vulcanizate of Acryl Acrylate Copolymer Rubber and Thermoplastic Polyamide".

Example 5. Exemplary Data of Second Polymeric Material Characterization—Coefficient of Friction—Blown Outsole Samples Sample preparation, coefficient of friction, and other test procedures were carried out as described herein above. The coefficient of friction data for concrete surfaces are shown in the table shown in FIG. 13. The materials referred into FIG. 13 are further described in Table 8 above.

Example 6. Exemplary Data of Second Polymeric Material Characterization—Specific Gravity—Blown Outsole Samples Sample preparation and specific gravity test procedures were carried out as described herein above. The coefficient of friction data for concrete surfaces are shown in the table shown in FIG. 14. The samples approximated 'blown' rubber via physically foamed thermoplastic resins using added compressed gas or SCF. The materials referred into FIG. 14 are further described in Table 8 above.

Example 7. Exemplary Data for High Aspect Ratio Injection Cavity Mold

Figure 16A:
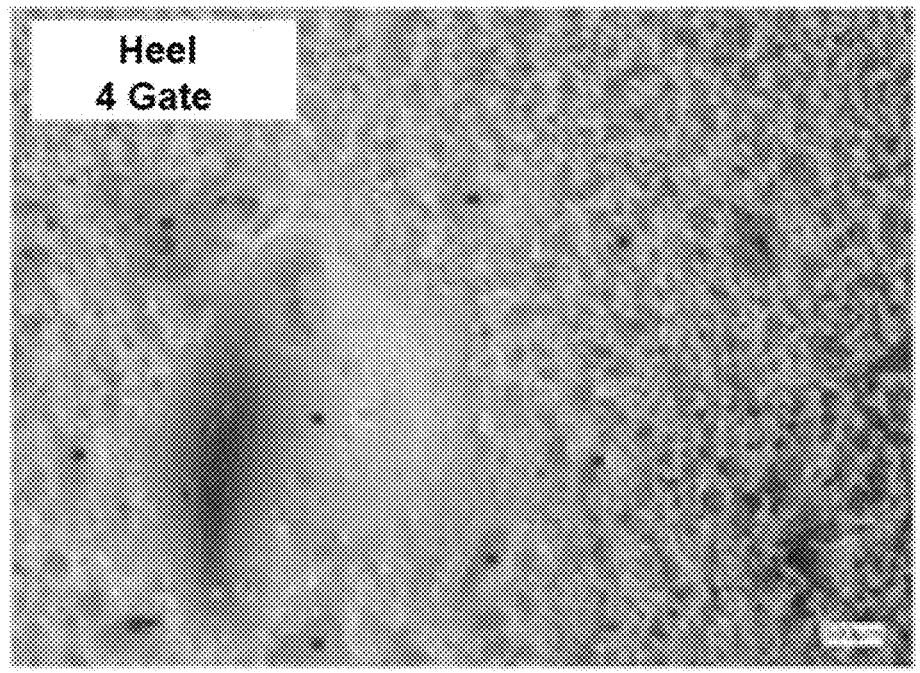
FIGS. 16A-16I shown representative images for molded components prepared using a four-gate configuration or a six-gate configuration.
Figure 16B:
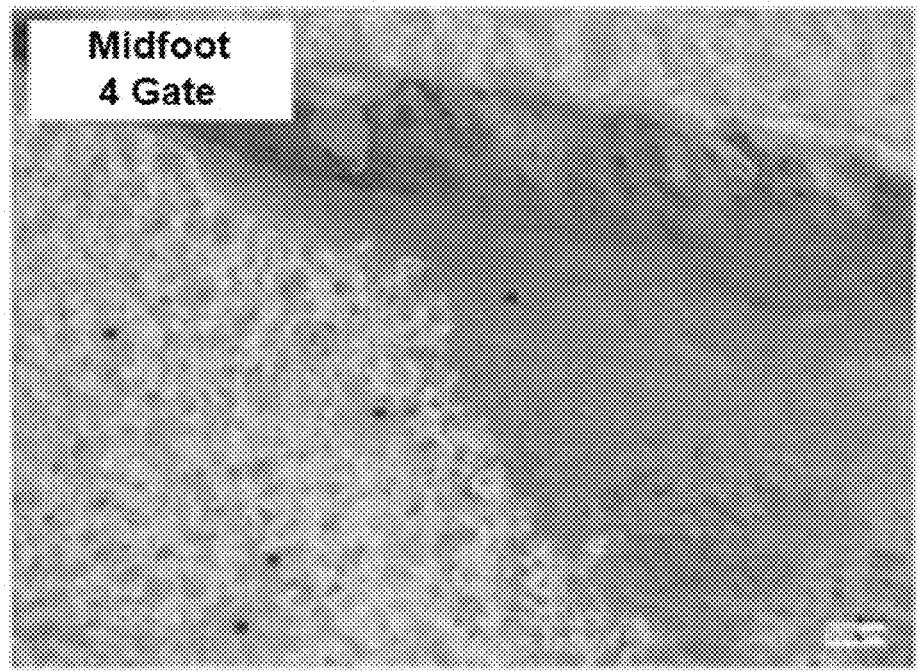
Figure 16C:
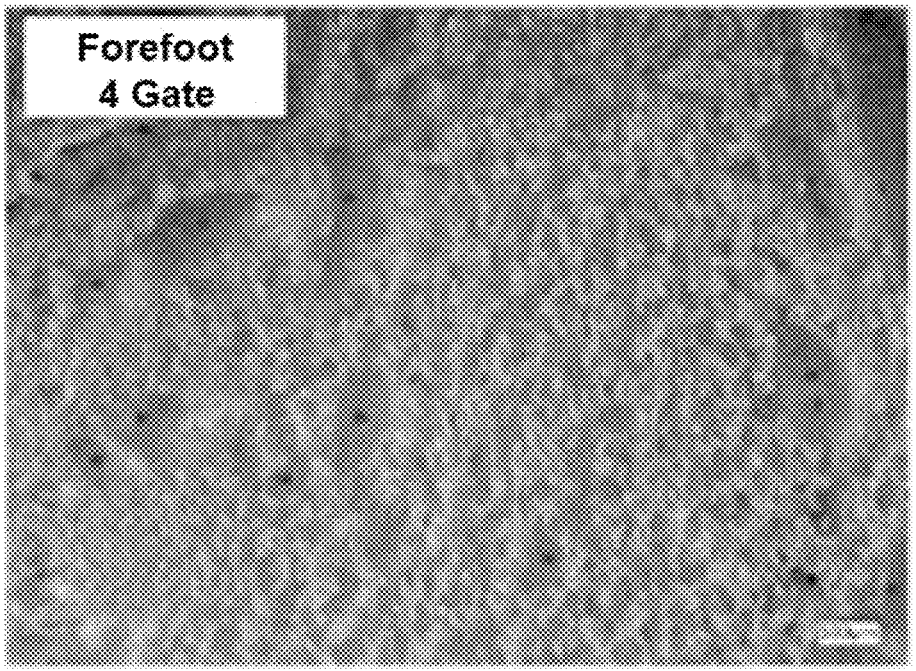
Figure 16D:
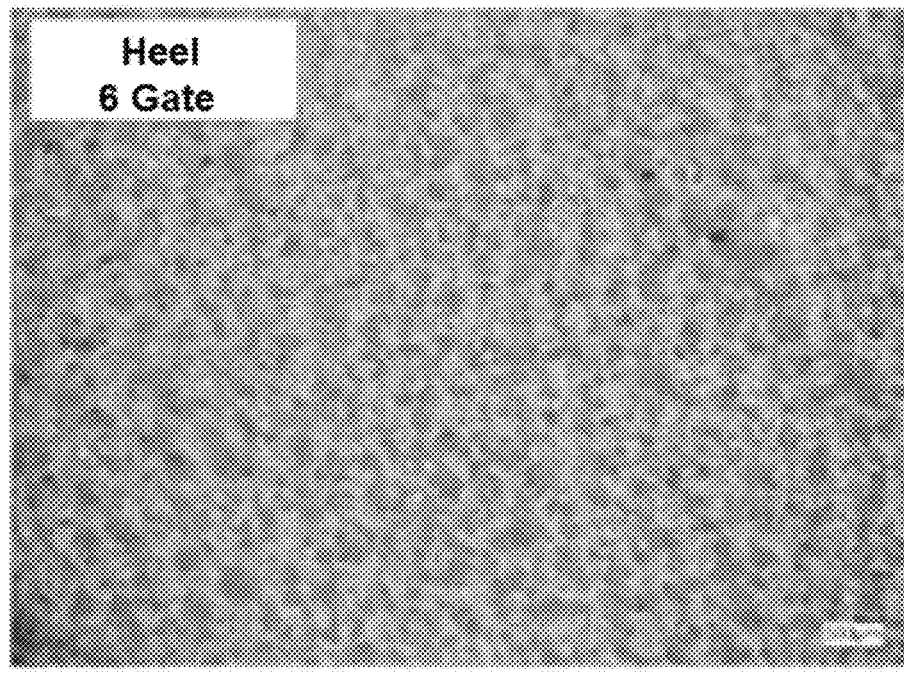
Figure 16E:
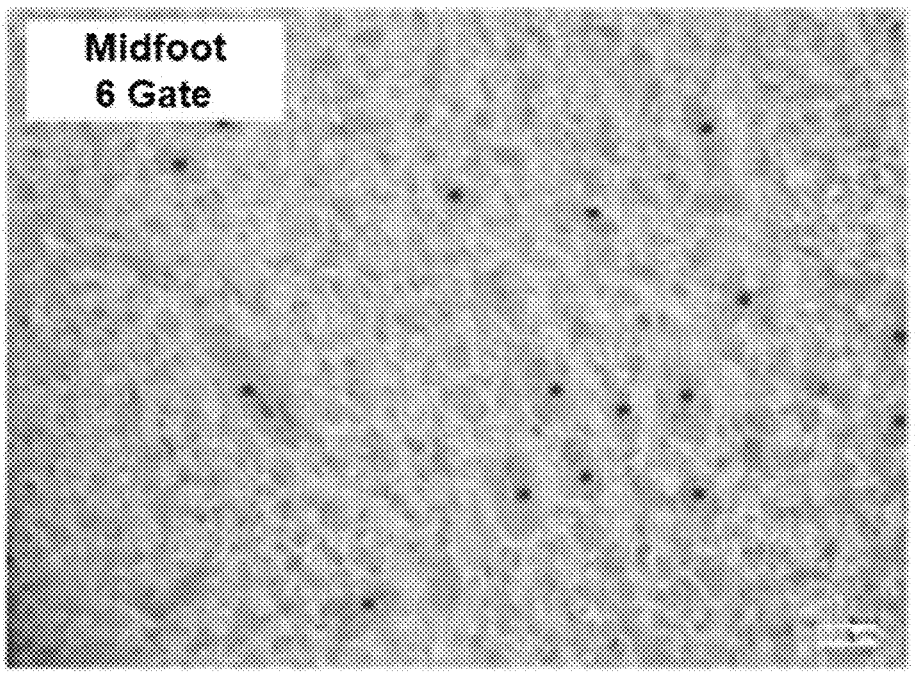
Figure 16F:
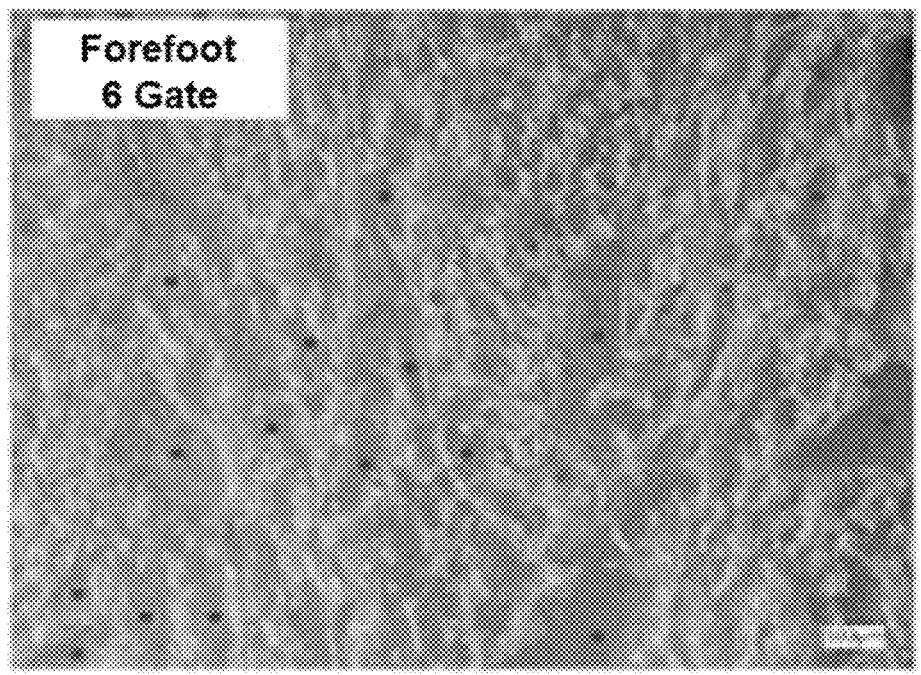
Figure 16G:
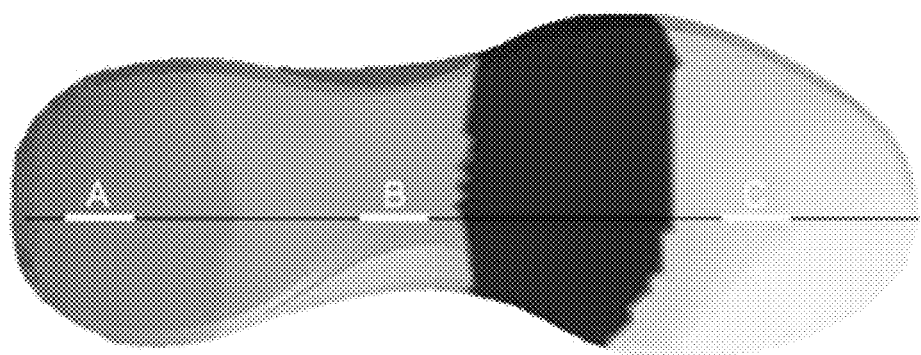
Figure 16H:
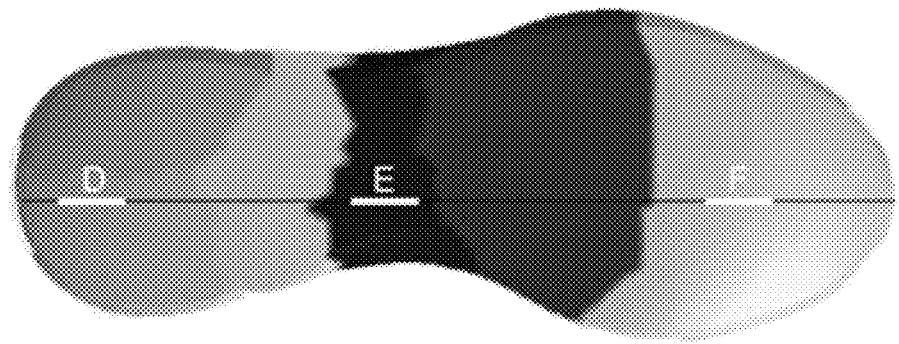
Figure 16I:
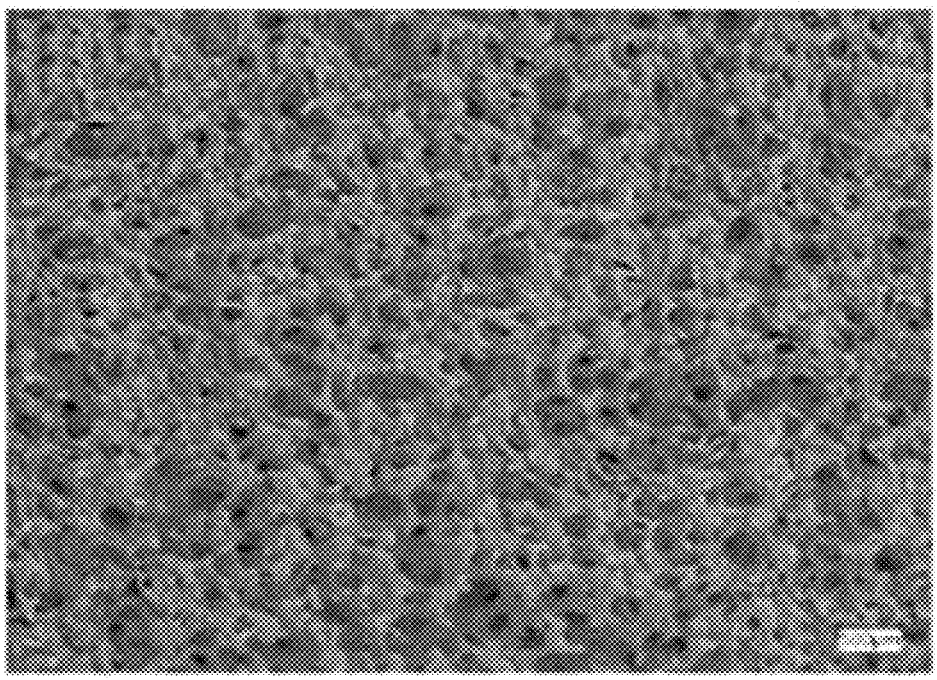

FIGS. 16A-16F compare foam microstructures between injected parts of the same overall shape but having different gate configurations such as a four-gate configuration as shown in FIG. 15A or as a six-gate configuration as shown in FIG. 15B. The different regions created by the four-gate versus six-gate configuration is shown in the images shown in FIGS. 16G and 16H, respectively. Each part was composed of the same material, has equivalent density, and was injected under the same conditions. As shown, FIGS. 16A-16C show photographic images of foam cross-sections obtained from the regions identified respectively as A, B, and C in the image for a component injection molded with the four-gate configuration shown in FIG. 16G and FIGS. 16D-16F show photographic images of foam cross-sections obtained from the regions identified respectively as D, E, and F in the image for a component injection molded with the four-gate configuration shown in FIG. 16H. FIG. 16I shows a representative defect free foam microstructure characteristic of either gating scenario. The images shown a considerable decrease in largest defect size and overall defect area for a part obtained using a six-gate configuration compared to a part of overall equivalent size, but molded using a four-gate configuration. Notably, there are marked differences in largest defect size ($\delta$) (where a defect is defined as any area with a single dimension >1 mm, indicated with red dots) and overall defect area ($\Delta$) between the image pairs when the AR is different. In all cases, the images corresponding to higher aspect ratio injection cavities have smaller defects and lower total defect area compared to the lower aspect ratio cavities. In areas absent of defects, the foam cells themselves have similar structure (I) regardless of gate configuration. Table 9 summarizes the aspect ratio (AR), maximum area for an individual defect ($\delta$), and total defect area ($\Delta$) for each image.

TABLE 9

|   | AR | $\delta$ [mm$^2$] | $\Delta$ [mm$^2$] |
|---|---|---|---|
| A | 2.8 | 30 | 40 |
| D | 3.9 | 1.2 | 2 |
| B | 2.7 | 85 | 90 |
| E | 7.5 | 1.7 | 10 |
| C | 5.2 | 1.7 | 10 |
| F | 5.2 | 2 | 10 |

For the foregoing calculations, the following definitions apply: (1) Volume for each gate—from the gate volume, the center of mass was calculated, and from the center of mass, the shortest distance to the surface of the gate's volume ($L_{min}$) and the longest distance to the surface of the gate's volume ($L_{max}$) were identified; (2) Aspect Ratio is ($L_{max}$)/($L_{min}$); and (3) Defect Measurement—a defect was defined as an area in a micrograph where a 1 mm line could be drawn without crossing a foam strut is defined as a defect and regions corresponding to defects are indicated with the indicated dots in FIGS. 16A-16F. The area of each defect was calculated by fitting a polygon consisting of an arbitrary number of edges to each area of interest. In Table 9, the defect with the largest area is given by δ and the sum of all the defect area is given by A.

It should be emphasized that the above-described aspects of the present disclosure are merely possible examples of implementations, and are set forth only for a clear understanding of the principles of the disclosure. Many variations and modifications may be made to the above-described aspects of the disclosure without departing substantially from the spirit and principles of the disclosure. All such modifications and variations are intended to be included herein within the scope of this disclosure.

What is claimed:

1. A method for making a thermoplastic elastomeric foam midsole for an article of footwear, the method comprising:
    forming a single phase solution of a blowing agent dissolved in a molten polymeric material comprising a thermoplastic elastomer, wherein the thermoplastic elastomer does not include a thermoplastic polyurethane, and the molten polymeric material does not include ethylene-vinyl acetate copolymer;
    injecting the single phase solution into a mold cavity, wherein the mold cavity is configured to mold a midsole for an article of footwear;
    physically foaming the single phase solution in the mold cavity, thereby forming a foamed molten polymeric material;
    solidifying the foamed molten polymeric material in the mold cavity, thereby forming a foam midsole having a multicellular foam structure, wherein the foam is a thermoplastic elastomeric foam; and
    removing the foam midsole from the mold cavity.

2. The method of claim 1, wherein, following removing the foam midsole from the mold cavity, cooling the foam midsole to about 25 degrees C., and equilibrating the foam midsole at about 25 degrees C. and about 1 atm of pressure, a volume of the equilibrated foam midsole is within plus or minus 5 percent of a volume of the mold cavity.

3. The method of claim 1, wherein the forming the single phase solution of the blowing agent dissolved in the molten polymeric material comprises infusing a solid resin comprising the polymeric material with the blowing agent to form infused resin, and melting the infused resin to form the single phase solution.

4. The method of claim 1, wherein the injecting comprises controlling a mold cavity temperature prior to injecting the single phase solution into the mold cavity.

5. The method of claim 1, wherein the method comprises applying a gas counter pressure to the mold cavity prior to injecting the single phase solution into the mold cavity to produce a pressurized mold cavity;
    injecting the single phase solution into the pressurized mold cavity wherein the pressurized mold cavity has a first pressure greater than atmospheric pressure; and
    physically foaming the single phase solution comprises decreasing the first pressure to a second pressure and initiating formation of gas bubbles by the blowing agent, thereby foaming the molten polymeric material.

6. The method of claim 5, wherein the gas counter pressure applied to the mold cavity is at least about 550 psi.

7. The method of claim 6, wherein the second pressure is atmospheric pressure; and wherein decreasing the first pressure to the second pressure comprises using a controlled rate of pressure decrease until the mold cavity has a pressure equal to atmospheric pressure.

8. The method of claim 7, wherein the controlled rate of pressure decrease is from about 10 psi per sec to about 600 psi per sec.

9. The method of claim 1, wherein the foaming occurs at a foaming temperature; and wherein the foaming temperature is from about the melting temperature of the thermoplastic elastomer to about 50 degrees C. above a tail temperature of the thermoplastic elastomer.

10. The method of claim 1, wherein the blowing agent is present in an amount of about 1% to about 3% or about 1% to about 5% by weight based on upon a total weight of the single phase solution.

11. The method of claim 1, wherein the thermoplastic elastomeric foam of the foam midsole is substantially free of a chemical blowing agent or a decomposition product thereof.

12. The method of claim 1, wherein the multicellular foam structure comprises less than 10 percent of cells having a closed cell microstructure.

13. The method of claim 1, wherein the multicellular foam structure has an average cell size of from about 100 microns to about 1 millimeter.

14. The method of claim 1, wherein the thermoplastic elastomer is a thermoplastic copolyester elastomer.

15. The method of claim 1, wherein the foam midsole has a split tear value of about 1.0 kilogram per centimeter to 4.5 kilogram per centimeter.

16. The method of claim 1, wherein the foam midsole has a specific gravity of from about 0.02 to about 0.22.

17. The method of claim 1, wherein the foam midsole has an energy efficiency of greater than or equal to about 60 percent when determined using the Cyclic Compression test.

18. The method of claim 1, wherein the foam midsole has an energy return of about 400 mJ to 1000 mJ when determined using the Cyclic Compression test as described herein.

19. The method of claim 1, wherein the foam midsole has a stiffness of about 200 kilopascals to about 1000 kilopascals, for a cylindrical sample having a diameter of about 45 millimeters as determined using the Cyclic Compression Test.

20. The method of claim 1, wherein the single phase solution is injected into the mold cavity at an injection temperature, the injection temperature being from about the melting temperature of the thermoplastic elastomer to about 50 degrees C. above a tail temperature of the thermoplastic elastomer.

* * * * *

UNITED STATES PATENT AND TRADEMARK OFFICE
CERTIFICATE OF CORRECTION

| | | |
|---|---|---|
| PATENT NO. | : 11,987,684 B2 | Page 1 of 7 |
| APPLICATION NO. | : 17/883039 | |
| DATED | : May 21, 2024 | |
| INVENTOR(S) | : Hossein A. Baghdadi et al. | |

It is certified that error appears in the above-identified patent and that said Letters Patent is hereby corrected as shown below:

In the Drawings

Sheet 10 of 20, Figure 11, Line 9:
Please replace "Monoprene IN 15056" with --Monprene IN 15056--

Sheet 11 of 20, Figure 12, Line 8 and Line 9:
Please replace "Ellastolan b70a" with --Elastollan b70a--; and
Please replace "Ellastolan SP9500" with --Elastollan SP9500--

Sheet 14 of 20, Figure 13, Line 8:
Please replace "Ellastolan SP9339" with --Elastollan SP9339--

Sheet 15 of 20, Figure 14, Line 4:
Please replace "Ellastolan SP9339" with --Elastollan SP9339--

In the Specification

Column 2, Line 25:
The line reading "tion shown in FIG. 16G. and FIGS. 16D-16F show photo-" should read --tion shown in FIG. 16G and FIGS. 16D-16F show photo- --

Column 2, Line 45:
The line reading "includes a second polymeric material which can one or more" should read --includes a second polymeric material which can be one or more--

Column 2, Line 49:
The line reading "elastomer or thermoplastic vulcanizate material. of the first" should read --elastomer or thermoplastic vulcanizate material of the first--

Signed and Sealed this
Twenty-eighth Day of January, 2025

Coke Morgan Stewart
*Acting Director of the United States Patent and Trademark Office*

Column 9, Line 20:
The line reading "has have a split tear of about 0.07 kg/cm to 2.0 kg/cm, or" should read --has a split tear of about 0.07 kg/cm to 2.0 kg/cm, or--

Column 9, Line 25:
The line reading "when using a foam for in an article of footwear or athletic" should read --when using a foam for an article of footwear or athletic--

Column 10, Line 12:
The line reading "Test described herein" should read --Test described herein.--

Column 13, Line 40:
The line reading "example the "MUCELL" process (Trexcel Inc., Royal Oak." should read --example the "MUCELL" process (Trexel Inc., Royal Oak.--

Column 19, Line 47:
The line reading "that injection cavities with multiple gates, the volume allo-" should read --that in injection cavities with multiple gates, the volume allo- --

Column 20, Line 8:
The line reading "the mold cavity shown in FIG. 15B has a higher aspect ratio" should read --the mold cavity shown in FIG. 15B has a higher aspect ratio in--

Column 23, Line 62:
The line reading "a second component can have an can have an Akron abrasion" should read --a second component can have an Akron abrasion--

Column 29, Line 45:
The line reading "65 wt; about 55 weight percent to about 65 weight percent;" should read --65 weight percent; about 55 weight percent to about 65 weight percent;--

Column 32, Line 22:
The line reading "weight percent; about 50 weight percent to about 65 wt;" should read --weight percent; about 50 weight percent to about 65 weight percent;--

Column 40, Line 19:
The line reading "the coated fiber as described herein and/or the an uncoated" should read --the coated fiber as described herein and/or an uncoated--

Column 42, Line 53:
The line reading "butylenediisocyanate (BDI), bisisocyanatocyclohexylmeth-" should read --butylene diisocyanate (BDI), bisisocyanatocyclohexylmeth- --

Column 43, Line 8:
The line reading "olyl, isooxazolyl, thiadiazolyl, oxadiazolyl, furanyl, quino-" should read --olyl, isoxazolyl, thiadiazolyl, oxadiazolyl, furanyl, quino- --

Column 43, Line 13:
The line reading "diisocyanate (TDI), TDI adducts with trimethyloylpropane" should read --diisocyanate (TDI), TDI adducts with trimethylolpropane--

Column 43, Line 28:
The line reading "diisocynates including HMDI, TDI, MDI, H12 aliphatics," should read --diisocyanates including HMDI, TDI, MDI, H12 aliphatics,--

Column 43, Line 38:
The line reading "HDI, and IPDI adducts with trimethyloylpropane (TMP)," should read --HDI, and IPDI adducts with trimethylolpropane (TMP),--

Column 44, Line 13:
The line reading "as poly( carboxybetaiiie (pCB) and ammonium phosphonates" should read --as poly carboxybetaine (pCB) and ammonium phosphonates--

Column 44, Line 30:
The line reading "hydrofuran (PTHF), polytetramethylene oxide (P $T_m$O), and" should read --hydrofuran (PTHF), polytetramethylene oxide (PTMO), and--

Column 45, Line 19:
The line reading "betaine, such as poly(carboxybetaine (pCB) and ammonium" should read --betaine, such as polycarboxybetaine (pCB) and ammonium--

Column 45, Line 31:
The line reading "example, 01-6 alkylene refers to an alkylene group having," should read --example, $C_{1-6}$, alkylene refers to an alkylene group having,--

Column 45, Line 42:
The line reading "such as poly(carboxybetaine (pCB) and ammonium phos-" should read --such as polycarboxybetaine (pCB) and ammonium phos- --

Column 45, Lines 48-49:
The lines reading "zolyl, imidazolyl, thiazolyl, tetrazolyl, oxazolyl, isooxazolyl, thiadiazolyl, oxadiazolyl, furanyl, quinolinyl, isoqui-" should read --zolyl, imidazolyl, thiazolyl, tetrazolyl, oxazolyl, isoxazolyl, thiadiazolyl, oxadiazolyl, furanyl, quinolinyl, isoqui- --

Column 46, Lines 2-3:
The lines reading "more zwitterionic groups (e.g., a betaine, such as poly( carboxybetaine (pCB) and ammonium phosphonate groups" should read --more zwitterionic groups (e.g., a betaine, such as polycarboxybetaine (pCB) and ammonium phosphonate groups--

Columns 47-48, Formula 14:
Replace

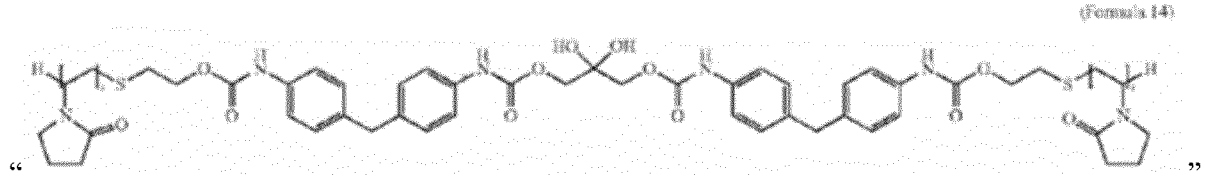

" "

with

(Formula 14)

--                                                                                              --

Columns 47-48, Formula 15:
Replace

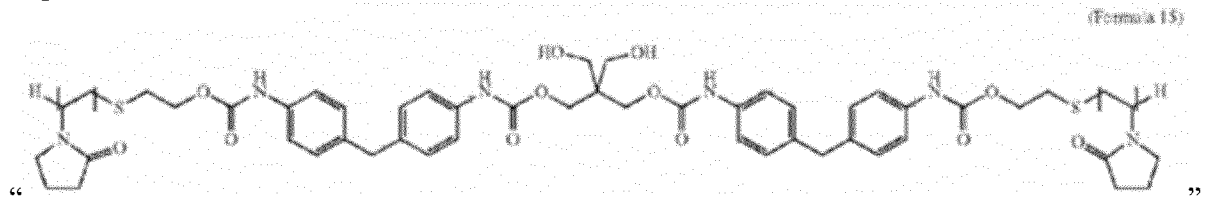

" "

with

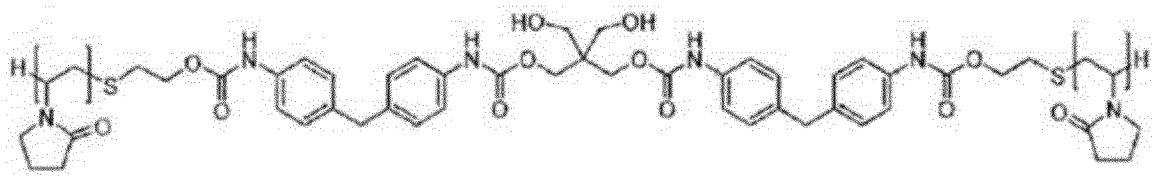

(Formula 15)

--                                                                                              --

Column 49, Line 58:
The line reading "Countryside, IL), and "ELASTOLLAN" (e.g., 9500, B70A;" should read
--Countryside, IL), and "ELASTOLLAN" (e.g., 9500, B70A,--

Column 50, Line 6:
The line reading "The second polymeric materi can include one or more" should read --The second polymeric material can include one or more--

Column 50, Line 9:
The line reading "Gimhae-si, Gyeongsangdam-do, Korea)." should read --Gimhae-si, Gyeongsangnam-do, Korea).--

CERTIFICATE OF CORRECTION (continued)
U.S. Pat. No. 11,987,684 B2

Column 50, Line 22:
The line reading "hard segments, and repeating blocks soft segments. The hard" should read --hard segments, and repeating blocks of soft segments. The hard--

Column 50, Lines 49-50:
The lines reading "plastic copolyamide can be formed from the polycodensation of a polyamide oligomer or prepolymer with a second" should read --plastic copolyamide can be formed from the polycondensation of a polyamide oligomer or prepolymer with a second--

Column 51, Line 16:
The line reading "$C_{4-25}$ amino acid, or a $C_{8-20}$ amino acid, or a $C_{8-15}$ amino" should read --$C_{4-25}$ amino acid, or a $C_{5-20}$ amino acid, or a $C_{8-15}$ amino--

Column 51, Formula 21:

Replace " 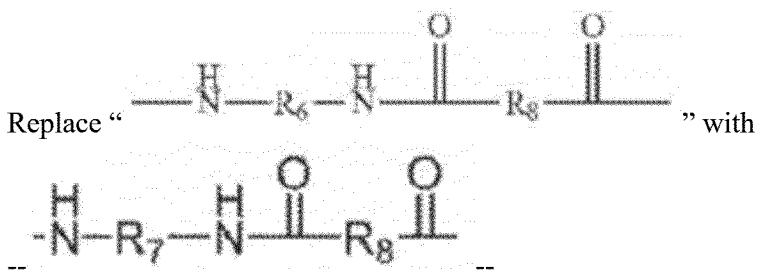 " with

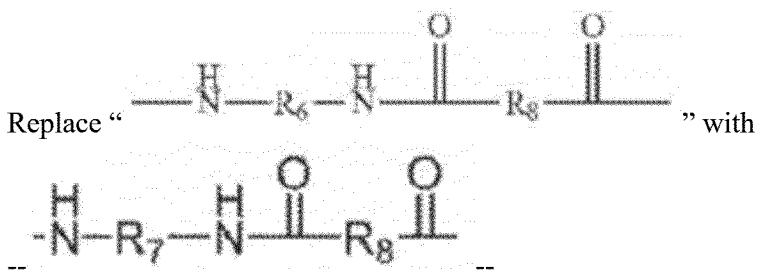

--

Column 52, Line 44:
The line reading "derived from the condensation of a, w-aminocarboxylic" should read --derived from the condensation of a, ω-aminocarboxylic--

Column 52, Line 57:
The line reading "or more a, w-aminocarboxylic acids and/or of one or more" should read --or more a, ω-aminocarboxylic acids and/or of one or more--

Column 52, Line 66:
The line reading "thalic acid, the sodium or lithium salt of sulphoisophthalic" should read --thalic acid, the sodium or lithium salt of sulfoisophthalic--

Column 53, Line 12:
The line reading "of less than 150 degrees centigrade. and advantageously" should read --of less than 150 degrees centigrade and advantageously--

Column 61, Lines 10-15:
The lines reading "Each occurrence of $R^1$ can be independently none, a substituted or unsubstituted $C_1$, $C_2$, $C_3$, $C_4$, $C_5$, $C_6$, $C_7$, or $C_8$ alkyl, or a substituted or unsubstituted $C_2$, $C_3$, $C_4$, $C_5$, $C_6$, $C_7$, or $C_8$ alkenyl. In some aspects, each occurrence of $R^1$ is none." should read --Each occurrence of $R^1$ can be independently none, a substituted or unsubstituted $C_1$, $C_2$, $C_3$, $C_4$, $C_5$, $C_6$, $C_7$, or $C_8$ alkyl, or a substituted or unsubstituted $C_2$, $C_3$, $C_4$, $C_5$, $C_6$, $C_7$, or $C_8$ alkenyl. In some aspects, each occurrence of $R^1$ is none.--

Column 62, Line 59:

CERTIFICATE OF CORRECTION (continued)
U.S. Pat. No. 11,987,684 B2

The line reading "mers include MONOPRENE IN5074, SP066070, and" should read --mers include MONPRENE IN5074, SP066070, and--

Column 65, Line 49:
The line reading "materials having one-dimensional structures such as of" should read --materials having one-dimensional structures such as--

Column 77, Line 3:
The line reading "(2)" should read --(1)--

Column 77, Line 5:

Replace " 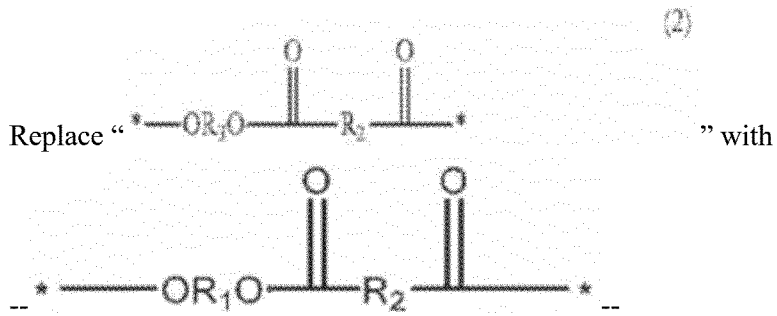 " with $$\text{--}*\text{---}OR_1O\text{---}\overset{O}{\underset{\|}{C}}\text{---}R_2\text{---}\overset{O}{\underset{\|}{C}}\text{---}*\text{--}$$

Column 85, Line 63:
The line reading "linked rubbers dispered into thermoplastic host phases, such" should read --linked rubbers dispersed into thermoplastic host phases, such--

Column 86, Line 2:
The line reading "copolyesters (e.g. so called TSiPVs)" should read --copolyesters (e.g. so called TSiPVs).--

Column 89, Line 51:
The line reading "about 5000 cycles of compression from ON to 300 N and" should read --about 5000 cycles of compression from 0 N to 300 N and--

Column 89, Line 59:
The line reading "about 5000 cycles of compression from ON to 300 N and" should read --about 5000 cycles of compression from 0 N to 300 N and--

Column 90, Line 67:
The line reading "thermoplastic vulcinazate (TPV)." should read --thermoplastic vulcanizate (TPV).--

Column 91, Line 2:
The line reading "plastic vulcinazate is cross-linked." should read --plastic vulcanizate is cross-linked.--

Column 91, Line 4:

CERTIFICATE OF CORRECTION (continued)
U.S. Pat. No. 11,987,684 B2

The line reading "plastic vulcinazate is comprises a partially cross-linked" should read --plastic vulcanizate is comprises a partially cross-linked--

Column 91, Line 51:
The line reading "elastomer (TPE) or thermoplastic vulcinazate (TPV); and" should read --elastomer (TPE) or thermoplastic vulcanizate (TPV); and--

Column 91, Line 63:
The line reading "thermoplastic elastomer (TPE) or thermoplastic vulcinazate" should read --thermoplastic elastomer (TPE) or thermoplastic vulcanizate--

Column 98, Line 2:
The line reading "phase solution of carbond dioxide and a thermoplastic" should read --phase solution of carbon dioxide and a thermoplastic--

Column 98, Table 8, Line 5:
The line reading "Ellastolan b70a TPU Solid Lubrizol" should read --Elastollan b70a TPU Solid Lubrizol--

Column 98, Table 8, Line 6:
The line reading "Ellastolan SP9339 TPU Foam BASF' should read --Elastollan SP9339 TPU Foam BASF--

Column 98, Table 8, Line 7:
The line reading "Ellastolan SP9500 TPU Solid BASF" should read --Elastollan SP9500 TPU Solid BASF--

Column 101, Line 12:
The line reading "the defect area is given by A." should read --the defect area is given by $\Delta$.--